US012607450B2

(12) United States Patent
Hart et al.

(10) Patent No.: US 12,607,450 B2
(45) Date of Patent: Apr. 21, 2026

(54) BULK GLASS INTERFEROMETER DESIGN WITH DISPERSION FOR COMPLEX CONJUGATE RESOLUTION AND RELATED ASPECTS

(71) Applicant: Leica Microsystems NC, Inc., Durham, NC (US)

(72) Inventors: Robert H. Hart, Deerfield, IL (US); Hansford Hendargo, Deerfield, IL (US)

(73) Assignee: LEICA MICROSYSTEMS NC, INC., Durham, NC (US)

( * ) Notice: Subject to any disclaimer, the term of this patent is extended or adjusted under 35 U.S.C. 154(b) by 147 days.

(21) Appl. No.: 18/585,109

(22) Filed: Feb. 23, 2024

(65) Prior Publication Data

US 2024/0288264 A1 Aug. 29, 2024

(30) Foreign Application Priority Data

Feb. 24, 2023 (EP) ..................................... 23158521
Mar. 7, 2023 (EP) ..................................... 23160573

(51) Int. Cl.
*G01B 9/02091* (2022.01)
*G01B 9/02056* (2022.01)

(52) U.S. Cl.
CPC ..... *G01B 9/02091* (2013.01); *G01B 9/02058* (2013.01)

(58) Field of Classification Search
CPC ............ G01B 9/02044; G01B 9/02083; G01B 9/02091; G01B 9/02058; G01B 2290/20;
G01B 9/02078; G06T 2207/10101; G06T 2207/20056; G06T 5/10; G06T 5/70; A61B 3/102; A61B 5/0066; A61B 5/0073; G01N 2290/15
See application file for complete search history.

(56) References Cited

U.S. PATENT DOCUMENTS

| | | | | |
|---|---|---|---|---|
| 8,686,371 B1 * | 4/2014 | Bernath | .................. | G01S 17/74 250/393 |
| 2002/0179866 A1 * | 12/2002 | Hoeller | .............. | G01B 9/02028 250/559.33 |
| 2011/0228379 A1 * | 9/2011 | Mason | ................... | G02B 5/124 65/102 |
| 2012/0140238 A1 * | 6/2012 | Horn | .................. | G01B 9/02077 356/479 |
| 2022/0236047 A1 | 7/2022 | Kamo | | |

OTHER PUBLICATIONS

R. Paschotta, article on "Group Delay Dispersion" in the RP Photonics Encyclopedia, 2008, https://doi.org/10.61835/bhj (Year: 2008 ).*

(Continued)

*Primary Examiner* — Kara E. Geisel
*Assistant Examiner* — Christina I Xing
(74) *Attorney, Agent, or Firm* — LEYDIG, VOIT & MAYER, LTD.

(57) ABSTRACT

A high-dispersion retroreflector includes filter glass transparent at least in near infra-red (NIR) wavelengths and configured to cause differential dispersion of incident broadband low-coherent light in the at least NIR wavelengths.

9 Claims, 21 Drawing Sheets

(56) References Cited

OTHER PUBLICATIONS

R. Paschotta, article on "Group Velocity Dispersion" in the RP Photonics Encyclopedia, 2008, https://doi.org/10.61835/9gj (Year: 2008).*

Schott, "your reliable solutions provider in the IR industry Infrared Chalcogenide Glass IRG 27" (Year: 2018).*

Schott, "Data Sheet Schott N-BK 7® 517642.251" (Year: 2014).*

Hofer, Bernd et al.; "Dispersion Encoded Full Range Frequency Domain Optical Coherence Tomography"; *Optics Express*; Jan. 5, 2009; pp. 7-24; vol. 17, No. 1; The Optical Society of America; Washington, DC., USA.

Hofer, Bernd et al.; "Fast dispersion encoded full range optical coherence tomography for retinal imaging at 800 nm and 1060 nm"; *Optics Express*; Mar. 1, 2010; pp. 4898-4919; vol. 18, No. 5; The Optical Society of America; Washington, DC., USA.

Schott North America, Inc .; "Infrared Chalcogenide Glass IRG 27—Specsheet"; Advanced Optics; Sep. 1, 2018; pp. 1-2; XP093076934; [Online] Retrieved from the internet: SCHOTT North America, Inc.; Duryea, PA, USA.

* cited by examiner

REAR ELEVATION

FRONT ELEVATION

Alternative view of Figure 3A

902 RECEIVE OCT IMAGE SIGNAL

904 OPTIONALLY PERFORM SIGNAL APODIZATION

906 PERFORM BASELINE SIGNAL SUBTRACTION

908 RESAMPLE WAVELENGTH DATA

910 GENERATE LINEAR WAVENUMBER IMAGE DATA

912 PROCESS THE LINEAR WAVENUMBER IMAGE DATA TO GENERATE OCT IMAGE

914 COMPUTE CCR RESULT FROM IMAGE DATA

916 OPTIONALLY PERFORM LOG SCALING OF THE RESULTING CCR IMAGE

918 OUTPUT RESULTING CCR IMAGE

900

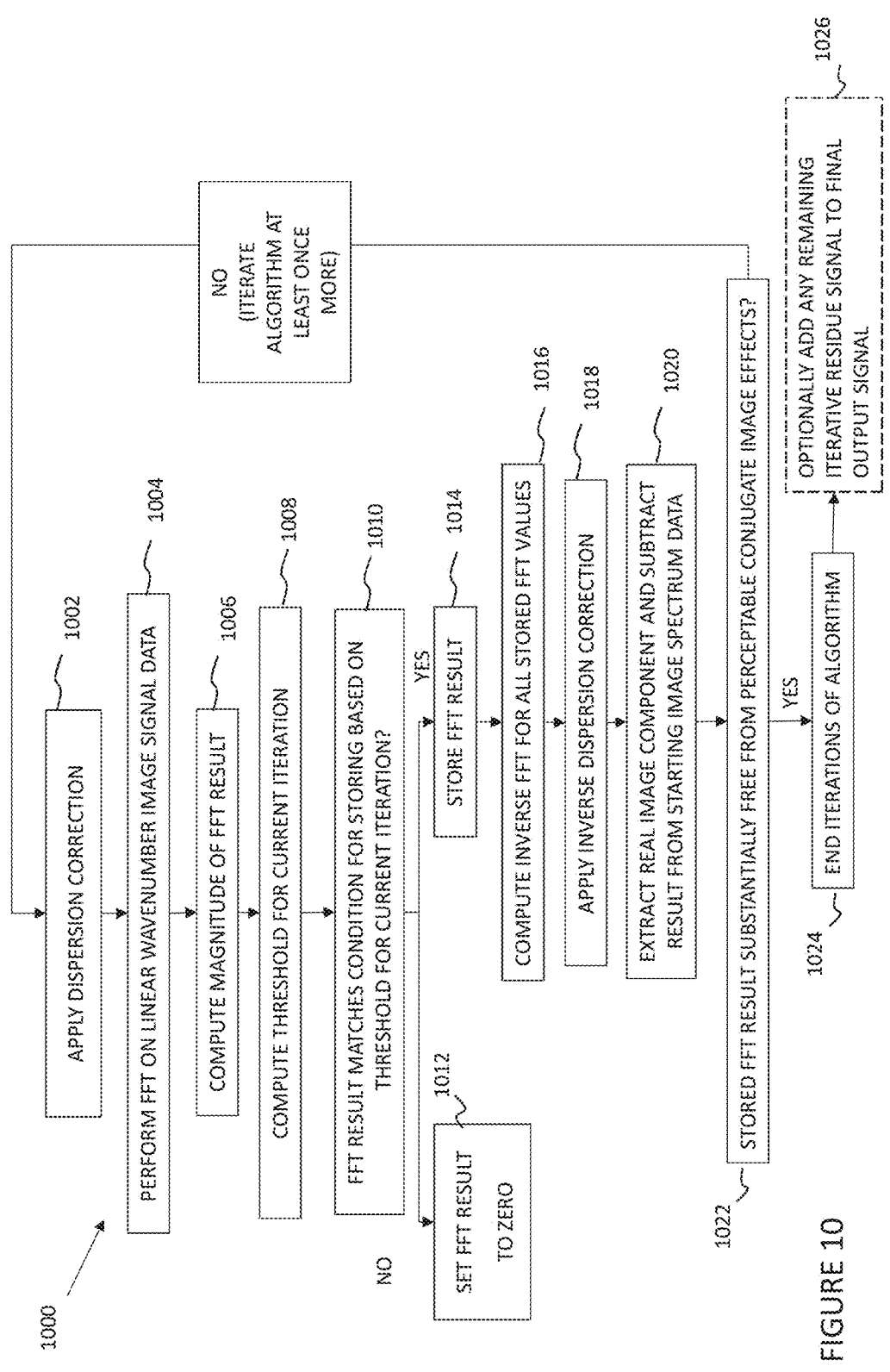

1000

1002 APPLY DISPERSION CORRECTION

1004 PERFORM FFT ON LINEAR WAVENUMBER IMAGE SIGNAL DATA

1005 COMPUTE MAGNITUDE OF FFT RESULT

1008 COMPUTE THRESHOLD FOR CURRENT ITERATION

1010 FFT RESULT MATCHES CONDITION FOR STORING BASED ON THRESHOLD FOR CURRENT ITERATION?

NO

1012 SET FFT RESULT TO ZERO

YES

1014 STORE FFT RESULT

1016 COMPUTE INVERSE FFT FOR ALL STORED FFT VALUES

1018 APPLY INVERSE DISPERSION CORRECTION

1020 EXTRACT REAL IMAGE COMPONENT AND SUBTRACT RESULT FROM STARTING IMAGE SPECTRUM DATA

1022 STORED FFT RESULT SUBSTANTIALLY FREE FROM PERCEPTABLE CONJUGATE IMAGE EFFECTS?

NO (ITERATE ALGORITHM AT LEAST ONCE MORE)

YES

1024 END ITERATIONS OF ALGORITHM

1026 OPTIONALLY ADD ANY REMAINING ITERATIVE RESIDUE SIGNAL TO FINAL OUTPUT SIGNAL

FIGURE 10

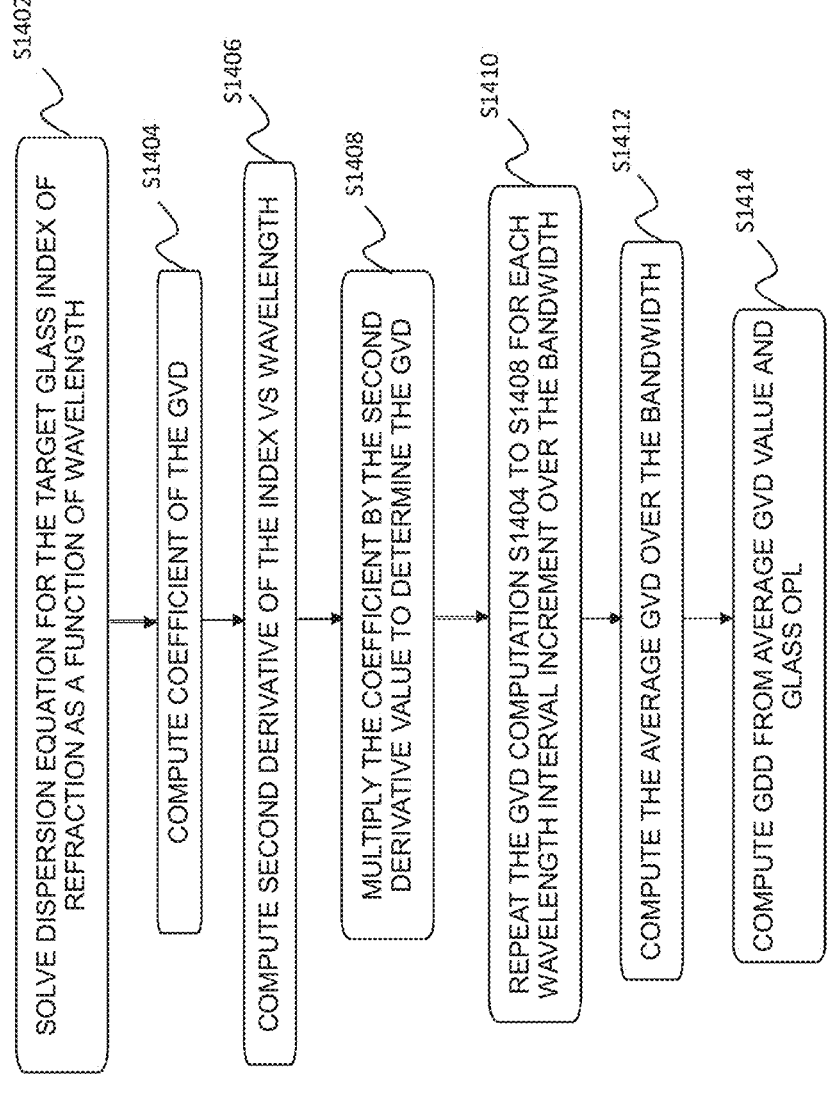

SOLVE DISPERSION EQUATION FOR THE TARGET GLASS INDEX OF REFRACTION AS A FUNCTION OF WAVELENGTH    S1402

COMPUTE COEFFICIENT OF THE GVD    S1404

COMPUTE SECOND DERIVATIVE OF THE INDEX VS WAVELENGTH    S1406

MULTIPLY THE COEFFICIENT BY THE SECOND DERIVATIVE VALUE TO DETERMINE THE GVD    S1408

REPEAT THE GVD COMPUTATION S1404 TO S1408 FOR EACH WAVELENGTH INTERVAL INCREMENT OVER THE BANDWIDTH    S1410

COMPUTE THE AVERAGE GVD OVER THE BANDWIDTH    S1412

COMPUTE GDD FROM AVERAGE GVD VALUE AND GLASS OPL    S1414

FIGURE 14

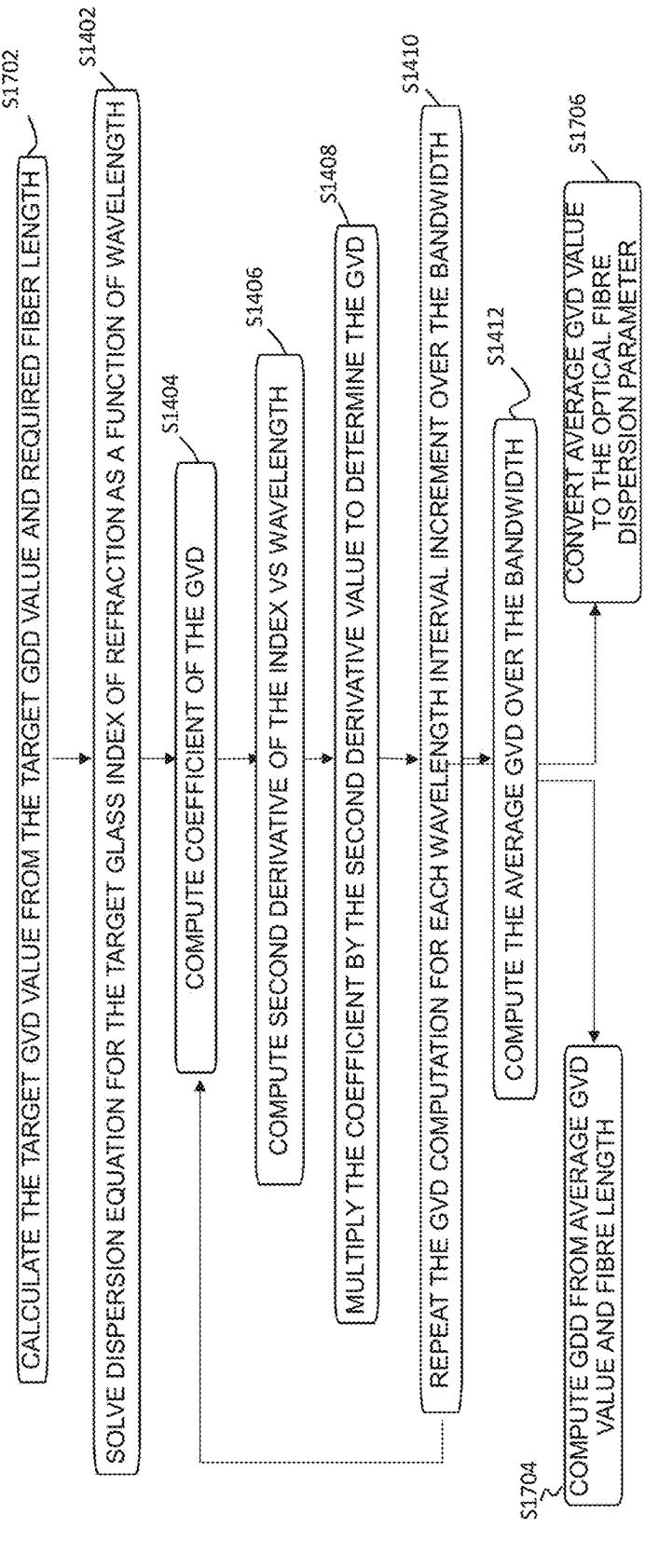

CALCULATE THE TARGET GVD VALUE FROM THE TARGET GDD VALUE AND REQUIRED FIBER LENGTH — S1702

SOLVE DISPERSION EQUATION FOR THE TARGET GLASS INDEX OF REFRACTION AS A FUNCTION OF WAVELENGTH — S1402

COMPUTE COEFFICIENT OF THE GVD — S1404

COMPUTE SECOND DERIVATIVE OF THE INDEX VS WAVELENGTH — S1406

MULTIPLY THE COEFFICIENT BY THE SECOND DERIVATIVE VALUE TO DETERMINE THE GVD — S1408

REPEAT THE GVD COMPUTATION FOR EACH WAVELENGTH INTERVAL INCREMENT OVER THE BANDWIDTH — S1410

COMPUTE THE AVERAGE GVD OVER THE BANDWIDTH — S1412

CONVERT AVERAGE GVD VALUE TO THE OPTICAL FIBRE DISPERSION PARAMETER — S1706

COMPUTE GDD FROM AVERAGE GVD VALUE AND FIBRE LENGTH — S1704

FIGURE 17

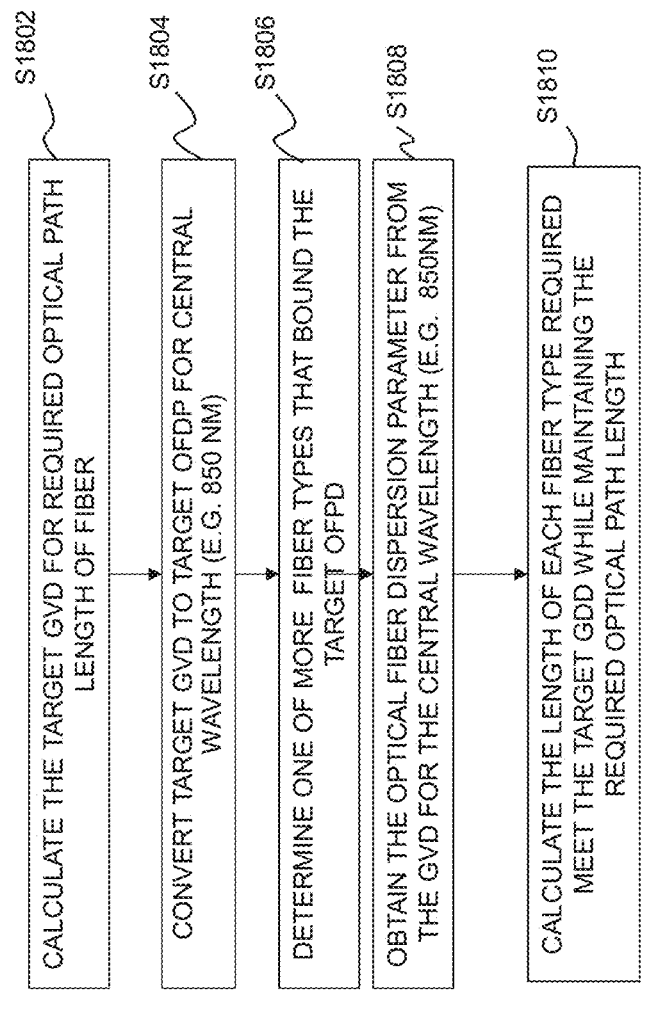

CALCULATE THE TARGET GVD FOR REQUIRED OPTICAL PATH LENGTH OF FIBER — S1802

CONVERT TARGET GVD TO TARGET OFDP FOR CENTRAL WAVELENGTH (E.G. 850 NM) — S1804

DETERMINE ONE OF MORE FIBER TYPES THAT BOUND THE TARGET OFPD — S1806

OBTAIN THE OPTICAL FIBER DISPERSION PARAMETER FROM THE GVD FOR THE CENTRAL WAVELENGTH (E.G. 850NM) — S1808

CALCULATE THE LENGTH OF EACH FIBER TYPE REQUIRED MEET THE TARGET GDD WHILE MAINTAINING THE REQUIRED OPTICAL PATH LENGTH — S1810

FIGURE 18

BULK GLASS INTERFEROMETER DESIGN WITH DISPERSION FOR COMPLEX CONJUGATE RESOLUTION AND RELATED ASPECTS

CROSS REFERENCE TO RELATED APPLICATIONS

This application claims benefit to the following European Patent Application Nos. EP 23158521.7, filed on Feb. 24, 2023, and EP 23160573.4, filed on Mar. 7, 2023, the entire disclosures of which are hereby incorporated by reference herein.

FIELD

The present disclosure relates to suppressing and/or removing residual complex conjugate image artefacts from 2D image scans.

BACKGROUND

Optical coherence tomography (OCT) is an imaging modality that uses the principles of low coherence interferometry to generate three-dimensional images of a sample. OCT systems are typically composed of a broadband light source, a reference and sample optical arm, and a detection arm consisting of either a spectrometer or a photodiode detector. Interference patterns of light reflected from the reference and sample arms are measured at the detector and electronically processed to generate a tomogram showing the relative positions of reflectors in the sample. Scanning the beam in the sample arm allows interrogation of different spatial locations, thus allowing for the construction of a 3D image of the sample.

Signal processing of the OCT signal requires several steps, one of which is a Fourier transform of the detected interference signal. Because the measured signal is real-valued, taking a Fourier transform results in a complex signal with identical positive and negative frequency components. This mirroring of data is known as the complex conjugate artefact and restricts the useable imaging range by half of what is theoretically possible. Techniques to remove or suppress the conjugate artefact are known as complex conjugate resolution (CCR) methods and can result in an immediate doubling of the imaging range in OCT. Known systems and methods for CCR are not practical for implementation in many situations however due to the expensive and complicated optical components that must be added to the OCT scanning system. Furthermore, multiple image acquisitions are required to generate the necessary phase information to remove the conjugate image. This slows imaging time, causing a reduction in system performance and is also very susceptible to motion in the sample, particularly when imaging live subjects.

Optical coherence tomography, OCT, is performed using an optical instrument which allows the generation of a cross-sectional image of biological tissue. It is possible to achieve axial (depth) resolutions well below 8 microns using monochromatic light having a constant phase difference. It is desirable accordingly if such OCT systems can be used to generate scans when probing living tissue (in vivo) in real-time as well as in other applications. As OCT scans cannot penetrate to a great depth they are particularly useful for probing skin tissues and in ophthalmology. Different OCT scan images are built up from many one-dimensional depth scans (A-scans) which are performed at several lateral positions to create a two-dimensional image (B-scan). By acquiring B-scans sufficiently closely and rapidly a volumetric image of a OCT probed sample tissue can be obtained.

Various technical issues present challenges however which affect how OCT scan images are developed in applications which may prevent real-time streaming of OCT scan images.

One such technical challenge is how to rapidly remove the presence of complex conjugate image artefacts in the OCT scan images. Known techniques dispersion mismatch between sample and reference arms in frequency-domain OCT systems can be used to iteratively suppress complex conjugate artefacts and increase the imaging range. A fast dispersion encoded full range DEFR algorithm that detects multiple signal components per iteration is disclosed in the paper by Hofer et al., "Fast dispersion encoded full range optical coherence tomography for retinal imaging at 800 nm and 1060 nm" Vol. 18, No. 5, Optics Express 4898 March 2010. However, although faster than earlier techniques known in the art, it is still relatively slow, around 5 to 10 seconds to process a single image, meaning that it is not suitable for live image processing applications such as complex conjugate image removal from OCT scan images generated in real-time during retinal eye surgery although much faster than the technique provided previously by Hofer, et al., in "Dispersion encoded full range frequency domain optical coherence tomography", *Optics Express,* 17(1), 2009. Both algorithms described by Hofer in these papers are very slow at processing the full range image, preventing its use in real-time applications. The algorithms Hofer et al describe moreover use a static selection of key processing parameters which requires manual optimization of the processing parameters for specific image datasets. This restricts the usage of this method when imaging different types of samples under different imaging conditions due to variability in signal strength and image sharpness.

SUMMARY

In an embodiment, the present disclosure provides a high-dispersion retroreflector. The high-dispersion retroreflector includes filter glass transparent at least in near infra-red (NIR) wavelengths and configured to cause differential dispersion of incident broadband low-coherent light in the at least NIR wavelengths.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 10 shows an example of an algorithm for generating a signal transform free from conjugate image effects according to some embodiments of the present invention;

FIG. 14 shows schematically an example of a method according to some embodiments of the present invention;

FIG. 17 shows schematically an example of another method according to some embodiments of the present invention;

FIG. 18 shows schematically an example of another method according to some embodiments of the present invention.

DETAILED DESCRIPTION

Figure 1:
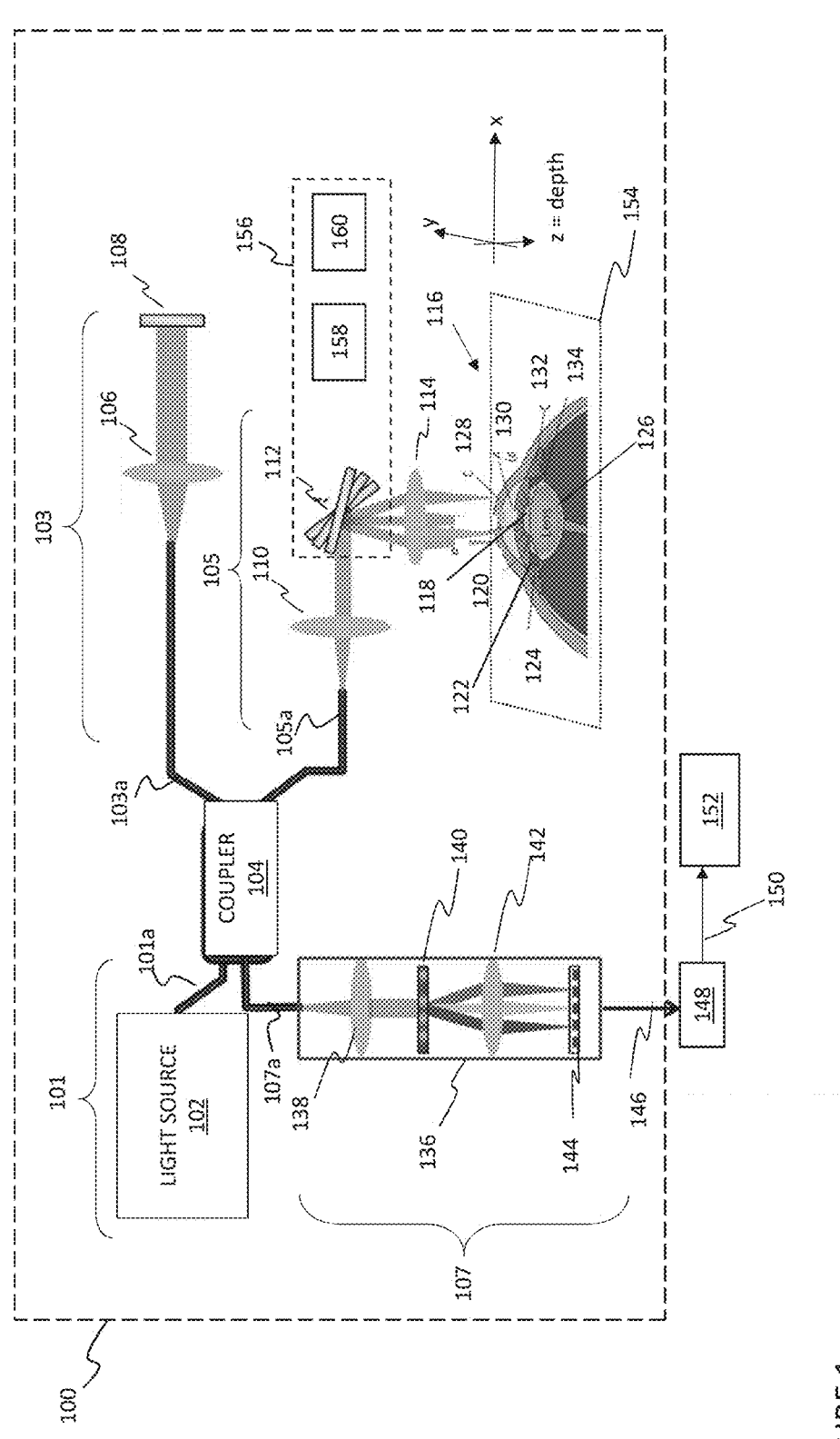
FIG. 1 shows schematically the basic principles of a spectral domain OCT system.

Examples of embodiments of the present invention can mitigate or obviate at least some of the limitations of the prior art by using high dispersion bulk filter glass in a retroreflector design and which maintain optical alignment in an OCT interferometer reference arm whilst seeking to improve complex conjugate resolution in OCT scanner applications. In particular, but not exclusively, some embodiments of the present invention may improve the ability of some of the disclosed methods for CCR being performed in real-time. For example, embodiments of the present invention can use dispersive bulk filter glass in the reference arm of an interferometer and related high-dispersion techniques to assist in the suppression and/or removal of residual complex conjugate image artefacts from 2D image scans, such as, for example, OCT scan images The following summary statements set out features, which may be preferred features in some embodiments of the present invention.

According to a first aspect of embodiments of the present invention a high-dispersion retroreflector comprises filter glass transparent at least in near infra-red (IR) wavelengths and configured to cause differential dispersion of incident broadband low-coherent light in at least near infra-red (NIR) wavelengths.

In some embodiments, the retroreflector is transparent over the same wavelength range differential dispersion occurs in, but in other embodiments, it may be transparent over a different range to the range of wavelengths over which differential dispersion occurs in.

In some embodiments, the median group delay dispersion of the filter glass ranges from 38000 (fs2) to 40000 (fs2).

In some embodiments, the median group dispersion velocity of the filter glass is a value in a range from 1100 fs2/mm to 1280 fs2/mm.

In some embodiments, the retro-reflector comprises glass having one of the following characteristics for incident light with a spectrum centred on 850 nm: a refractive index of 2.5129 for light with a wavelength of 850 nm; a group index of 2.7268 (ng) for light with a wavelength of 850 nm; a group velocity delay of 1120.75 fs2/mm; and a transparency of 95.7% for light with a wavelength of 850 nm.

In some embodiments, the retroreflector has a cone-shaped exterior and the interior of the cone comprises at least three mirrored facets collectively configured to perform retro-reflection of incident light.

Another, second aspect of embodiments of the present invention comprises, a bulk glass differential dispersion interferometer assembly for extended depth imaging in OCT the interferometer assembly comprising an automated path length opto-mechanical assembly which includes a first, fixed, retroreflector located at one end of the optical-path, a second, adjustable, retroreflector co-located with a fixed high-dispersion retroreflector on a mount which is moveable to form an adjustable optical-path in the interferometer assembly, wherein the high-dispersion retroreflector comprises filter glass transparent at IR wavelengths and configured to cause differential dispersion at NIR wavelengths between broadband low-coherent incident light.

In some embodiments, the interferometer assembly comprises a probe arm of an OCT scanning system and the high-dispersion retroreflector is configured to cause differential dispersion at, NIR wavelengths between broadband low-coherent incident light returned from a reference arm and the probe arm of the OCT system.

In some embodiments, the interferometer is configured to output light for complex conjugate resolution of the incident OCT light.

In some embodiments, the median group delay dispersion of the filter glass material ranges from 38000 (fs2) to 40000 (fs2).

In some embodiments, the wherein median group dispersion velocity of the filter glass material is a value in a range from 1100 fs2/mm to 1280 fs2/mm.

In some embodiments, the high-dispersion retroreflector (1500) comprises glass having one of the following characteristics for incident light with a spectrum centred on 850 nm: a refractive index of 2.5129 for light with a wavelength of 850 nm; a group index of 2.7268 (ng) for light with a wavelength of 850 nm; a group velocity delay of 1120.75 fs2/mm; and a transparency of 95.7% for light with a wavelength of 850 nm.

In some embodiments, the high-dispersion retro-reflector may comprise IRG27 glass as manufactured by Schott_IRG, for example.

In some embodiments, the first retroreflector (1604) and the second retroreflector (1602) comprises glass having the following characteristics for incident light with a spectrum centred on 850 nm: a refractive index of 1.5098 for light with a wavelength of 850 nm; a group index of 1.5249 (ng) for light with a wavelength of 850 nm; a group velocity delay of 40.13 fs2/mm; and a transparency of 99.8% for light with a wavelength of 850 nm.

In some embodiments, the first and second retroreflector may comprise BK7 glass as manufactured by Schott, for example.

In some embodiments, the high-dispersion retroreflector has a cone shaped exterior, wherein the interior of the cone comprises at least three mirrored facets collectively configured to perform retro-reflection of incident light.

Another, third, aspect of embodiments of the present invention comprises an OCT apparatus configured to perform real-time OCT, the apparatus comprising an illumination arm including at least an optical light source for OCT, a reference arm; an OCT probe arm via which an OCT probe beam is emitted; and a data or output arm via which returned OCT light passes and is output as a signal to be processed by an image processor, and at least one dispersive retroreflector in the reference arm or OCT probe arm in according to the first aspect or any of its embodiments disclosed herein.

In some embodiments, the dispersion between the reference and probe arms is variable and set above a minimum threshold for separation of a complex conjugate image from a OCT image output for display.

In some embodiments, the OCT apparatus further comprises at least one additional dispersive component provided in one of the reference arm or the OCT probe arm.

In some embodiments, the at least one additional dispersive component is located in the reference arm and comprises a dispersive optical fibre.

In some embodiments, at least one additional dispersive component is located in the reference arm and comprises a dispersive glass window, wherein either a physical path length of the reference arm is configured to compensate for the dispersive widow or the physical path length of an opposite OCT probe arm is lengthened to compensate for the dispersive widow.

In some embodiments, the OCT apparatus comprises a bulk glass differential dispersion interferometer assembly for extended depth imaging in optical coherence tomography, OCT, the interferometer assembly comprising an automated path length opto-mechanical assembly.

In some embodiments, the OCT apparatus of the third aspect includes an OCT scanner adapter according to any of the embodiments disclosed herein.

In some embodiments, the at least one dispersive optical component is provided in the OCT probe arm comprise one or more of a dispersive optical fibre, a dispersive dichroic mirror, a dispersive OCT objective lens, and a dispersive OCT field lens.

In some embodiments, the image processor may perform a computer-implemented image processing CCR method for removing complex conjugate image data from image data, for example, in real-time, using dispersion which comprises: receiving an image signal comprising image data including complex conjugate image data (902), performing a baseline signal subtraction (906); resampling the resulting wavelength data to generate linear wavenumber image data (908, 910), processing the linear wavenumber image data to generate a complex conjugate resolved, CCR, result using at least one iteration of a CCR image processing algorithm, generating a CCR image computed from the CCR result, and separating the CCR image from the received OCT image data to remove the complex conjugate image data.

In some embodiments, the CCR image processing algorithm using an adjustable threshold for each iterative step.

Advantageously, by adjusting the threshold for each iterative step, it is possible to generate the CCR image more rapidly.

Advantageously, the initial threshold may be determined for each individual scan image, for example, by applying an initial threshold based on a histogram of the frequencies vs. amplitude obtained from a Fourier transform of the image. The initial threshold may be set then on a percentile of the histogram being above a particular value.

Another benefit of the disclosed image processing methods is that the processing parameters are selected based on properties of the original image and so can be optimally chosen to select the adaptive threshold levels before a method of image processing according to one of the disclosed embodiments performs any iterative complex conjugate resolution processing. In other words, in some embodiments a prediction of what the optimal threshold should be for every image is provided.

Instead of selecting a range of different static thresholds and repeatedly processing OCT scan images so as to select each static threshold based on the final image results what should be optimal thresholds for each iteration, embodiments of the method of image processing using the CCR algorithm according to embodiments of the present invention can dynamically adjust the threshold in each threshold.

Secondly, the ability to do all this in real-time (<30 ms) allows real-time video processing through a combination of processing methods, use of a dedicated GPU, and selection of the dispersion parameters of the system.

In some embodiments, the algorithm according to embodiments of the present invention is implemented using dedicated processor(s) or processing circuitry. For example, the algorithm may be implemented using a graphics processing unit, GPU, in some embodiments. In some embodiments, the method is performed in real time.

For example, images may be generated in less than 30 milliseconds using some embodiments of the present invention. This allows the CCR image to be used in OCT systems for applications such as surgery, for example, eye surgery, in some embodiments of the present invention where it is important that the image is produced in real-time without undue delay as a surgical procedure is performed.

In some embodiments, the generated CCR image data computed from the CCR results comprises magnitude and/or phase data of the resulting CCR image.

In some embodiments, the method further comprises performing a log scaling of the resulting CCR image. This may help with visualizing the data if this has a range spanning several orders of magnitude.

In some embodiments, processing the linear wavenumber image data to generate a complex conjugate resolution result comprises performing a plurality of iterations of a CCR image processing algorithm comprising: applying a dispersion correction, performing a signal transform, for example, a Fourier transform such as a fast Fourier transform (FFT) on the linear wavenumber image signal data; computing the magnitude of a result of performing the signal transform on the linear wavenumber image signal data; computing a variable threshold for each iteration of the algorithm, for each signal transform result value having a magnitude which does not match a condition for storing based on the threshold for the current iteration, setting the signal transform result to zero, for each signal transform result value having a magnitude which matches the condition for storing based the threshold for the current iteration, storing the signal transform result, computing the inverse signal transform, for example, an inverse FFT, for all stored signal transform results, applying an inverse dispersion correction, and extracting the real image component and subtracting the result from starting image spectrum data.

Whilst the signal transform may comprise a Fourier transform which breaks up the input signal into sinusoidal components with discrete frequencies in some embodiments, some embodiments of the image processing methods disclosed herein may instead use an alternative signal transform such as a suitable wavelet transform.

In some embodiments, matching a condition for storing the signal transform result, in other words, a frequency component of the input signal having an amplitude for a given frequency bandwidth, comprises either of matching or exceeding the computed, variable, storage condition threshold amplitude value for storing that frequency component of the OCT scan image data.

In some embodiments, matching a condition for storing the signal transform result comprises exceeding the computed (variable) storage condition threshold value.

Advantageously, as the storage condition threshold is not static, some embodiments of the present invention may provide better, automatic, optimization of the processing parameters for specific image datasets.

Advantageously, the variable storage condition threshold in some embodiments allows different types of samples to be imaged under different imaging conditions due to variability in signal strength and image sharpness.

In some embodiments, after the final iteration has been performed, the method further comprises optionally adding any remaining iterative residual signal to the final output signal.

In some embodiments, the algorithm is performed for each A-scan after which the A-scans are stacked to generate a B-scan of a tissue sample or other object of interest being scanned.

In some embodiments, a number of iterations are performed of the CCR algorithm to extract the real image component and subtract the result from the starting image spectrum data for that iteration until the stored signal transform result values comprise a complex-valued image free from any noticeable conjugate image artefacts.

In some embodiments, the method further comprises performing signal apodization. This is an optional processing parameter set by a user which helps to condition the input signal to have zero values at each end to help reduce edge artefacts when performing signal transform in an image processing algorithm according to embodiments of the present invention.

In some embodiments, the computed variable threshold is based on an empirically derived formula.

In some embodiments, the variable threshold is computed using a derived formula.

In some embodiments, the variable threshold is computed using thresholds based on image properties such as a histogram-based intensity distribution.

Advantageously, this enables the variable threshold to be a dynamically adjusted threshold based on one or more image properties of the current image. Such properties can change with optical alignment of the sample or other dynamic imaging conditions.

In some embodiments, the method is implemented using a graphics processing unit capable of processing an image in less than 30 milliseconds.

In some embodiments, the image data is OCT image data and the method further comprises outputting an OCT image based on the received image data with the complex conjugate image data removed.

In some embodiments, the output OCT image has no perceivable complex conjugate image when displayed.

According to another, second, aspect of embodiments of the present invention an OCT apparatus configured to perform real-time OCT comprises: an illumination arm including at least an optical light source, a reference arm, an OCT probe arm via which an OCT probe beam is emitted; and a data arm via which returned OCT light passes to be processed by an image processor (148) configured to perform a method according to the first aspect and/or at least one of its embodiments disclosed herein.

In some embodiments of the OCT apparatus, the reference and probe arms is above a minimum design threshold for separate of a complex conjugate image from a OCT image output for display.

In some embodiments of the OCT apparatus, the OCT apparatus further comprises at least one dispersive component provided in one of the reference arm or the probe arm.

In some embodiments of the OCT apparatus, the at least one dispersive components in the reference arm comprises one of dispersive optical fibre, a dispersive glass window in the reference arm, wherein a physical path length of the reference arm is configured to compensate for the dispersive widow or the physical path length of an opposite OCT probe arm is lengthened to compensate for the dispersive widow; and one or more dispersive retroreflectors in the reference arm, wherein the amount of dispersion is determined by the optical path length through the dispersive retroreflectors.

In some embodiments of the OCT apparatus, the at least one dispersive optical component is provided in the OCT probe arm comprises one or more of: a dispersive optical fibre, a dispersive dichroic mirror, a dispersive OCT objective lens, and a dispersive OCT field lens.

According to another aspect of embodiments of the present invention a computer program product comprising computer code which when loaded from memory and executed on one or more processors or processing circuitry of an apparatus is configured to cause the apparatus to implement a method disclosed herein . . . .

According to another aspect of embodiments of the present invention, an image processor comprises one or more processor(s) or processing circuitry comprising a graphics processing unit, wherein the image processor is configured to execute computer code which, when executed, causes the image processor to implement a complex conjugate resolution method according to any one of the embodiments disclosed herein.

Advantageously, the OCT scanner system may include an example embodiment of a MEMS scanning mirror assembly as disclosed herein within an OCT scanner adapter 206 for a microscope. The OCT scanner adapter 206 system design has a configuration which is compact in the sense that the optical design of the MEMS scanning mirror allows for an optical channel formed by microscope optics and an attached OCT scanner objective lens to require an optimally short housing stack height and is laterally compact as the optical path probe light follows within the scanning mirror assembly block is less than 40 mm supporting high scan rates with a resolution of 6 microns or less in the resulting OCT image.

This is useful when eye surgery requires the surgeon to use the microscope or similar device to generate an enlarged image of the area of operation using microscope optics so that the surgeon is able to better see the area being operated on whilst still keeping the patient within the surgeon's arm's reach. In other words, some embodiments of the OCT scanner system design disclosed herein result in a combined stack height of the microscope and attached OCT scanner adapter 206 which is far shorter than previously possible. The design better balances the design constraints and allows a surgeon to view an area being scanned by the OCT scanner via an eye piece or eye pieces of the microscope and keep the area being scanned in the focal plane of the microscope optics whilst still allowing the surgeon to physically reach the scanned area to perform a surgical operation.

Other aspects of the compact design provide additional benefits. For example, the design of the scanning mirror assembly reflects the beam used for feedback on the scanning mirror position in a different optical plane from that used by the OCT probe beam, and the optical path the reference beam used to determine the position of the scanning mirror is advantageously configured to reduce the likelihood of returned light from the feedback arm contaminating the mirror position reference beam or its optical source or contaminating the OCT probe beam.

The above aspects and/or examples disclosed herein above and later below may be suitably combined with each other as would be apparent to anyone of ordinary skill in the art.

The detailed description set forth below provides examples of embodiments of the present invention which are explained in sufficient detail to enable those skilled in the art to put the present invention into practice.

There are two forms of OCT scanning, time-domain OCT (TD-OCT) and spectral domain OCT (SD-OCT). SD-OCT uses spectral interrogation of the spectrum at the OCT interferometer output.

FIG. 1 schematically shows the principles of operation of an example spectral domain optical coherence tomography, SD-OCT, interferometer scanner system 100 which comprises some examples of embodiments of the present invention.

In the example SD-OCT system 100 illustrated in FIG. 1, the SD-OCT system 100 may be used to generate optical coherence tomograms of in-vivo tissue samples 116, such as of a human eye, by using an OCT light scanning beam to probe within the tissue sample 116.

It will be apparent that the system 100 is illustrated in FIG. 1 schematically and is not drawn to scale. The position of various components and their relative sizes of the SD-OCT system 100 shown in FIG. 1 do not necessarily reflect their real or relative positions or sizes in example embodiments of the present invention.

In the following, references to an OCT scan image or image data may refer to a one-dimensional A-scan or to a two-dimensional B-scan comprising a plurality of A-scans or to a volumetric scan image comprising a plurality of B-scans where appropriate as would be apparent to someone of ordinary skill in the art.

As illustrated in FIG. 1, SD-OCT system 100 comprises a low coherence broadband optical scanning light source 102. Scanning light source 102 is suitably connected to a coupler 104 configured to split light from the light source 102 into a OCT light reference beam which follows an optical path 103*a* along reference arm 103 and an OCT light probe or scanning beam which follows an optical path 105*a* along OCT probe arm 105. OCT light returned along the reference and probe arms 103, 105 will have different phase shifts which generates interference when the returned light is recombined at the coupler 104. The combined light signal is output from the coupler along detection or output arm 107 and the light interference pattern is detected using a spectrometer 136. The output light signal 146 from spectrometer 136 is then processed by an image processor 148, for example, to apply a Fourier transform to the output light signal 146, which generates OCT scan data which can then be displayed on a suitable display 152.

The different phase shifts between the reference arm returned OCT light and the OCT returned from the probe arm which result in the interference pattern detected, arise because the OCT light is returned from one or more different structures at different depths on or within the scanned tissue sample 116. In some embodiments, the scanned tissue sample may instead comprise a different type of object of interest 112 to an in-vivo tissue sample located in an area of the human body.

The phase shift which generates the interference is affected by the different depths at which the OCT light is returned by structures within the sample scanned. The interference from the phase shift allows the signal output 146 of the spectrometer 136 to be used to generate images known as tomographs which provide a visual indication of the depth of one or more such structures in the scanned or probed area and their location in the scanned or probed area.

In some embodiments of the SD-OCT system 100 shown in FIG. 1, the broadband OCT light source 102 has a central wavelength of 860 nm over a bandwidth of 100 nm. In some embodiments, more than one light sources 102 is used to provide the broad-band low coherence OCT scanning light over a desired bandwidth.

The probe OCT beam is returned after it has been back-scattered or reflected or otherwise returned from any structures at a certain depth in the area 116 including the tissue sample being scanned. In some embodiments, one or more or all of the optical paths 101*a*, 103*a*, 105*a*, 107*a*, are provided using suitable single-mode optical fibres and may include one or more sections where a beam following the optical fibre travels in free space.

In the embodiment of the SD-OCT system 100 illustrated schematically in FIG. 1, the reference beam emerges from the coupler 104 and passes along the reference arm 103 via a collimator lens 106 before it is reflected by a translating reference mirror 108 and returned towards coupler 104 along the reference arm 103. The optical path 103*a* along the reference arm 103 and the optical path 105*a* along the probe arm 105 towards the focal plane 154 illuminating the sample or other object of interest being scanned are configured with equivalent optical path lengths. Based on the detected interference between the returned reference beam light and the returned OCT probe beam light when recombined at coupler 104, the depth(s) of any structure(s) within the sample that have back-scattered or reflected or otherwise returned the probe beam light can be determined by outputting the detected interference signal 146 to an image processor 148.

In some embodiments, the interference between the returned reference beam and returned OCT probe beam light which occurs along the output arm 107 is measured using a suitable spectrometer 136 such as that shown in FIG. 1 to determine the depth of the cross-sectional image being scanned. Other embodiments of the OCT system 100 may use other techniques to measure interference and generate output signal 146.

In some embodiments of the OCT system 100, one or more or all of the optical paths 101*a*, 103*a*, 105*a*, 107*a*, comprise suitable single-mode optical fibres and/or include one or more sections where an outward or inward (relative to the coupler 104) OCT beam following an optical fibre travels in free space.

In some embodiments of the present invention, although the optical path lengths followed by the reference beam and probe beam are matched, the dispersive properties of the optical fibre each beam travels along are configured to differ to improve the removal of a complex conjugate image from the OCT image output and so improve the image quality of the OCT scan image and the speed at which a complex conjugate resolved OCT scan image is obtained.

In some embodiments, the term OCT scan is used herein to refer to a B-scans and volumetric scan images of the tissue area (also referred to herein as a tissue sample) 116 which are generated using the spectral domain, SD-OCT scanner system 100.

In the example shown schematically in FIG. 1 of spectral-domain OCT, the broadband light source 102 generates an OCT probe beam which illuminates an area of tissue 116 which is scanned by the OCT probe beam over a range of near-infra red wavelengths.

The spectrometer 136 shown in FIG. 1 comprises a collimating lens 138 via which returned light passes through a grating 140 to generate a spectrally dependent interference pattern. The interference pattern is focused via an objective lens 142 on line camera 144 and the image signal representing the interference pattern form the output 146 to a suitable image processing system 148. However, another suitable type of interference detector in the output arm 107 may be used in alternative embodiments.

The spectrometer 136 of the embodiment of the SD-OCT system 100 shown in FIG. 1 measures spectral interference in the returned OCT light beam by measuring intensity modulations in the returned light as a function of frequency. The rate of variation of intensity over different frequencies is indicative of the location of the different reflecting layers in the samples.

The OCT probe beam follows an optical path 105a from the coupler 104 along the OCT probe branch 105 of the coupler 104 after which it enters an OCT scanner 164. The example OCT scanner 164 shown in FIG. 1 comprises a collimating lens 110, a scanning mirror assembly 310 (shown in FIGS. 3A and 5 for example described later below) including a scanning mirror 112 having a reflective surface 334 (see FIG. 3A or FIG. 5 for example) which deflects the OCT scanning beam out of the scanner 164 via objective lens 114 towards a focal plane 154 in the scanning area 116. The scanning mirror assembly 310 includes a mirror positioning system including a secondary light source 158 which is also reflected by a scanning mirror 112 of a scanning mirror assembly towards the sample area 116 being scanned. The scanning mirror assembly includes a mirror positioning system 156 comprising a light source 158 for detecting the mirror position and a mirror position detector, PSD 160. The OCT scanner 164 also comprises an objective lens 114 which focusses the OCT scanning beam on a focal plane 154 in the area of the tissue or sample 116 being scanned.

The scanning mirror 112 may comprise a microelectro-mechanical system, MEMS, scanning mirror which is moved angularly by a mirror mover. The movement of the scanning mirror 112 moves the OCT probe beam across the sample or other object of interest being scanned and the resulting interference pattern generated is used to generate an OCT B-scan image from the system output 156 . . . .

The movement of the mirror mover is performed under the control of a controller 162. The controller 162 may be located in scanning mirror assembly which includes the scanning mirror 112 or located remotely from it.

The mirror position system 156 shown in FIG. 1 comprises an optical angular displacement mirror position measurement system 156. This provides feedback on the mirror position to a controller and in some embodiments enables closed loop control of the MEMS based scanning mirror position in some embodiments.

As the scanning mirror 112 is moved in use of the OCT scanner 164 by the mirror mover mechanism under the control of the controller 162 to guide the OCT beam along a scan path. After reflection by the mirror 112, the OCT probe beam passes through a telecentric objective lens 114 which focusses the OCT probe beam at different locations in a focal plane 154 at the sample tissue 116 which is being scanned. As shown schematically in FIG. 1, the focal plane 154 is illustrated as lying in a notional x-y plane, with depth information being provided orthogonally along the z-axis.

The telecentric objective lens 114 via which the probe beam passes to reach sample 116 and via which returned probe beam light also passes is shown in FIG. 1 with three example emerging telecentric beams which focus on different locations within the focal plane 154, which lies in the x-y plane as shown in FIG. 1. Each of the example emerging telecentric beams results from a different position of the scanning mirror assembly 112, in other words, FIG. 1 is showing schematically by way of example only three sequential tele-centric beam positions. This is to show schematically how, as a B-scan or volumetric scan progresses, the telecentric OCT scanning or probe beam is moved to illuminate different areas.

The scanned area comprises a sample of tissue 116. In FIG. 1 this comprises tissue of an eye 116 which may be an in vivo or in vitro tissue sample. Other types of human or animal tissue may be scanned in vivo or in vitro in other uses of the OCT scanner system where a OCT scan image may be useful to visualise internal structures at a various depths in the tissue.

For example, as shown in FIG. 1, eye 116 is shown schematically and comprises a pupil 118, surrounded by an iris 120, behind which sits a posterior chamber 122 and zonal fibres 124 and in front of which are the lens of the eye 126 and cornea 128. FIG. 1 also shows the anterior chamber 130 of the eye as well as the ciliary muscle 132 and suspensory ligament 134 which may all be scanned using an OCT-system such as OCT system 100 and shown as internal structures in an tomogram presented on a display 152.

The likelihood of a successful outcome from a surgical procedures performed on tissue such as the human eye, or the eye of another creature, where there is very limited access may be improved by using OCT. The OCT system 100 may be used in some embodiments to create images based on two or three-dimensional scans of region of an eye 116 as it is being operated on and these can be presented in real-time to the person performing the operation. This can allow the depth of any procedure being performed is better understood as the surgery takes place. Providing this depth information for an area subject to a surgical procedure in real-time may help a surgeon avoid making an incision which is too deep (which may damage underlying tissue unnecessarily) or one which is too shallow (in which case the operation may not be a success and/or the tissue being operated on may take longer to heal).

As is shown schematically in FIG. 1, the interference signal output 146 of the spectrometer 136 of the OCT system 100 is subject to post-processing by an image processor 148. For example, the signal output 136 may be image processed using a Fourier transform or other suitable signal transform on the OCT scan. This may initially generate a warped OCT scan image which may then be subject to additional image processing to de-warp the OCT image before the OCT scan image 150 is output to a suitable display 152. Some embodiments of the OCT scanner system 100 may also use image processing to remove complex conjugate artefacts to enhance the depth range of the images obtained.

Display 152 may be part of the apparatus hosting the SD-OCT system 100 performing the image processing or a different apparatus. Some example embodiments of the present invention generate a series of OCT scan images 148 using an OCT probe light beam sufficiently quickly to provide a live-stream video comprising OCT scan images 150 on display 152. Display 152 may be a near-eye display in some embodiments. In some embodiments display 152 may be a large display system comprising a plurality of displays to present information both to the surgeon and/or to others in the operating theatre. A display 152 may be integrated into the SD-OCT system 100 or be external to it.

One or more of the components shown in FIG. 1 forming the OCT scanning system 100 may be housed separately from the optics forming the OCT scanner apparatus 164. By separating out the OCT scanner optics the OCT scanner 164 may have a more compact form-factor. A more compact OCT scanner 164 can be better positioned in close proximity to the sample areas being scanned.

Figures 2A, 2B:
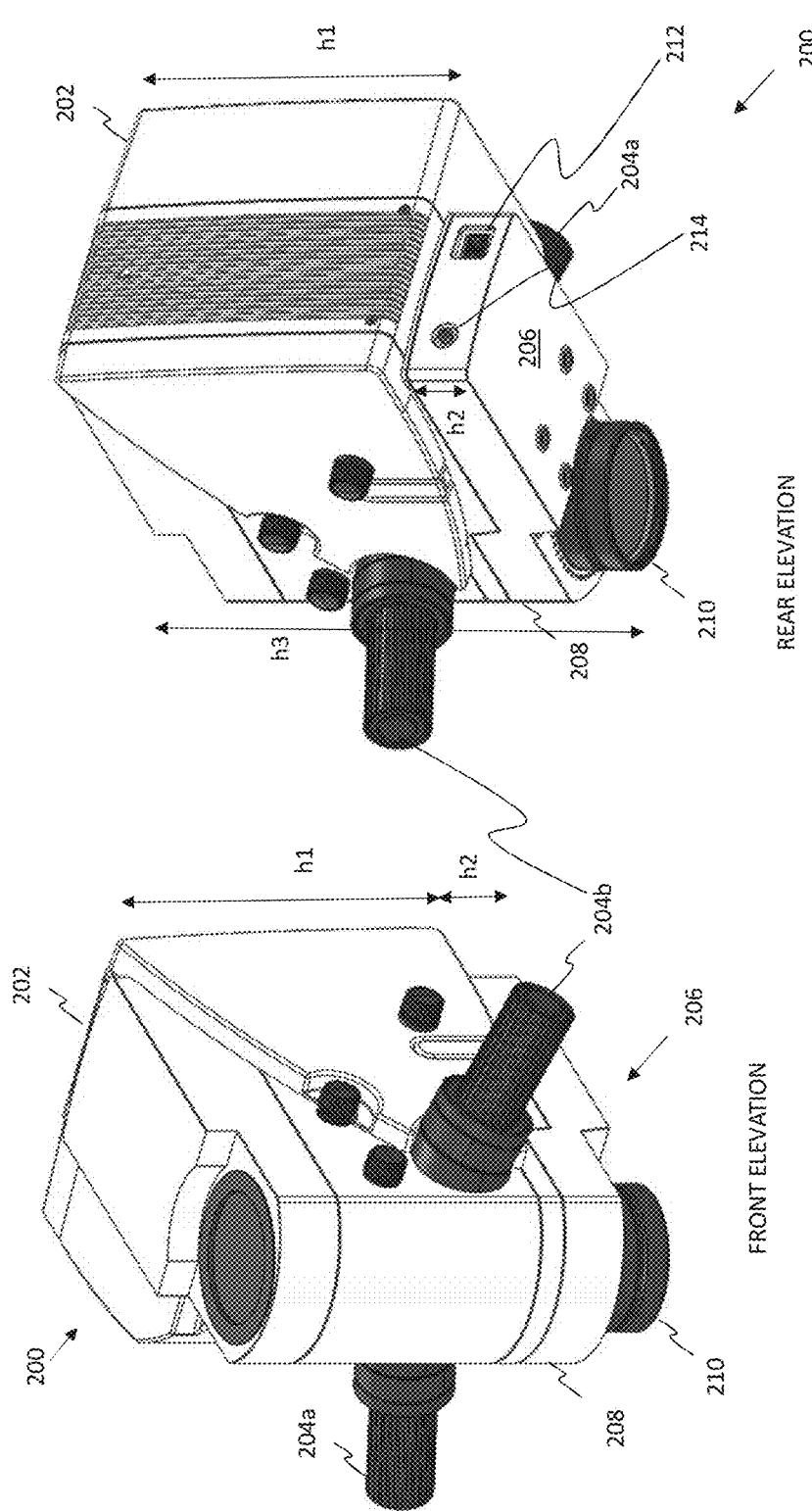
FIGS. 2A and 2B show schematically front and rear perspective views of an OCT scanner adapter 206 for a microscope according to some embodiments of the present invention.

In some embodiments, the OCT scanner system 100 comprises an OCT scanner 164 provided as an adapter for a microscope, for example, the OCT scanner adapter 206 for the microscope 200 shown schematically in FIGS. 2A and 2B. In some embodiments, the microscope 200 comprises a surgical microscope suitable for use during surgical procedures. The housing 202 of the microscope 200 has an undercarriage configured to accept one or more microscope accessories in some embodiments, which allows an OCT scanner adapter 206 to be attached to the under carriage of the microscope housing. The OCT scanner adapter optics objective lens 114, may then also function as the microscope objective lens 210 (see also FIGS. 3A, 3B, and 4 of the drawings).

Example(s) of Microscope System with an OCT Scanner Adapter

FIGS. 2A and 2B show schematically front and rear perspective views of an OCT scanner adapter 206 for a microscope, in other words of an OCT scanner microscope accessory 206, according to some embodiments of the present invention. The term OCT scanner adapter is herein to refers to a OCT scanner adapter microscope accessory. References to the OCT scanner adapter may also refer to an apparatus including an integrated OCT scanner adapter in some embodiments of the present invention.

Figure 3A:
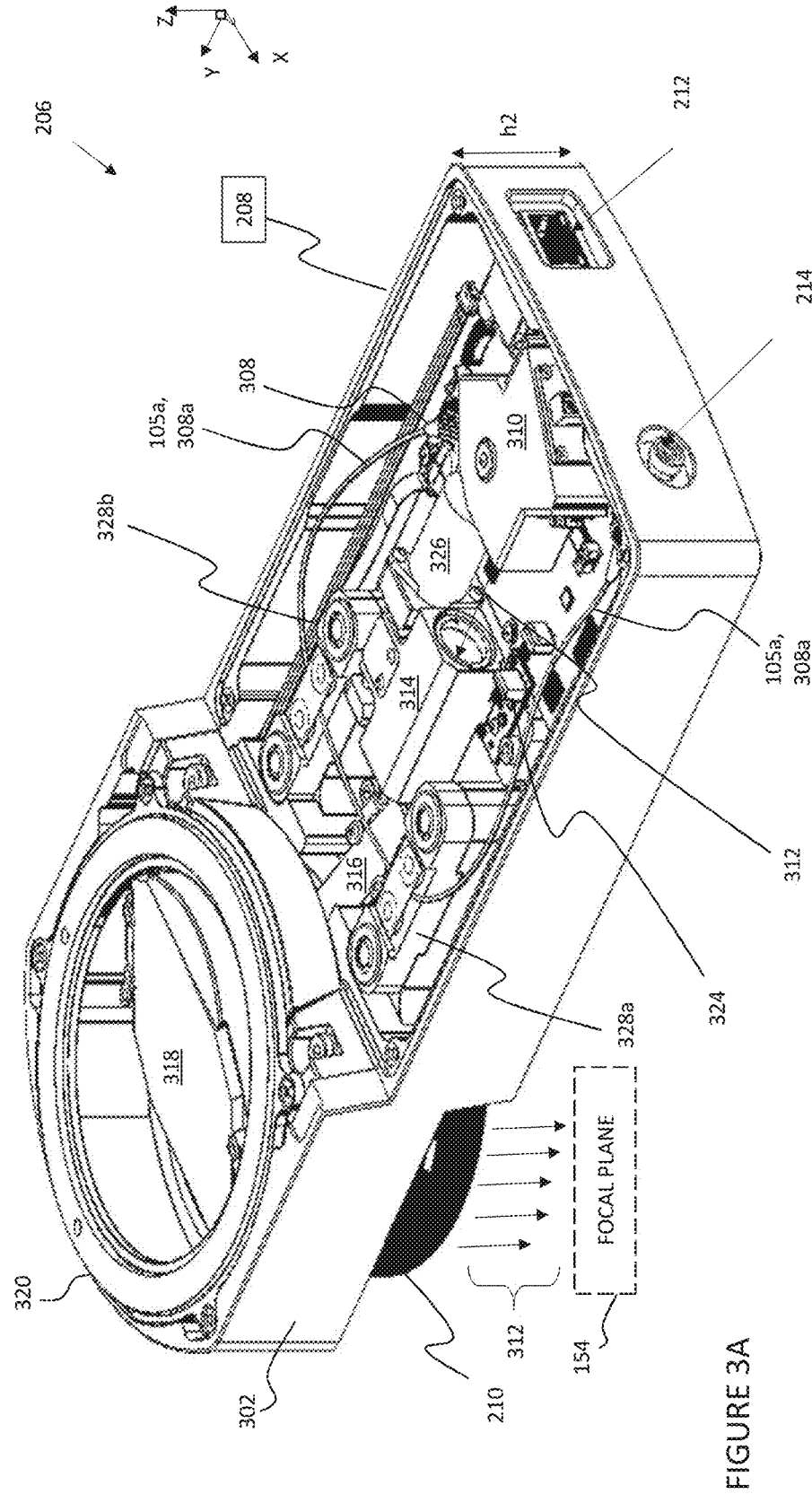
FIGS. 3A and 3B show schematically various views of the components of an example of an OCT scanner adapter 206 according to some embodiments of the present invention.
Figure 3B:
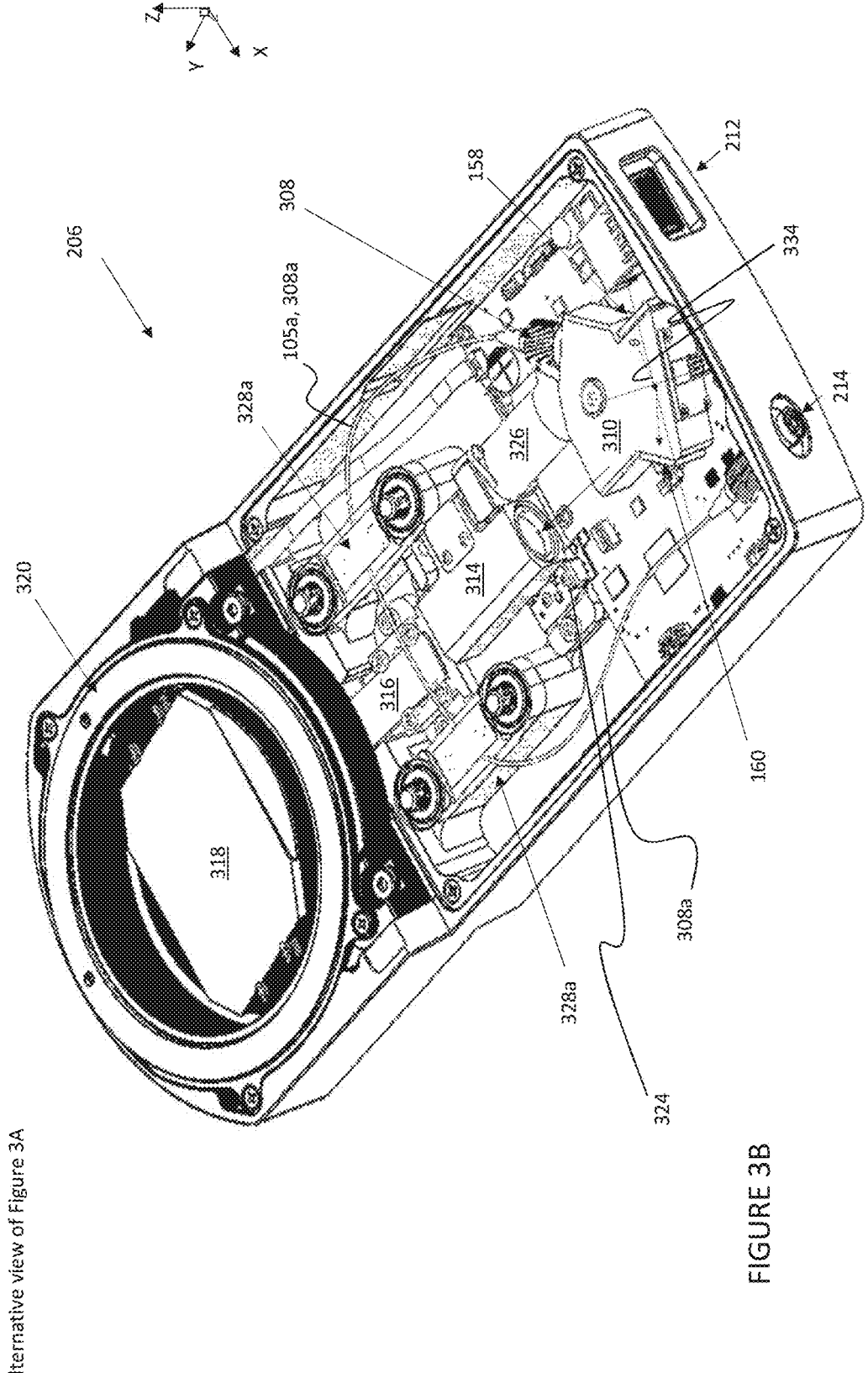
Figure 4:
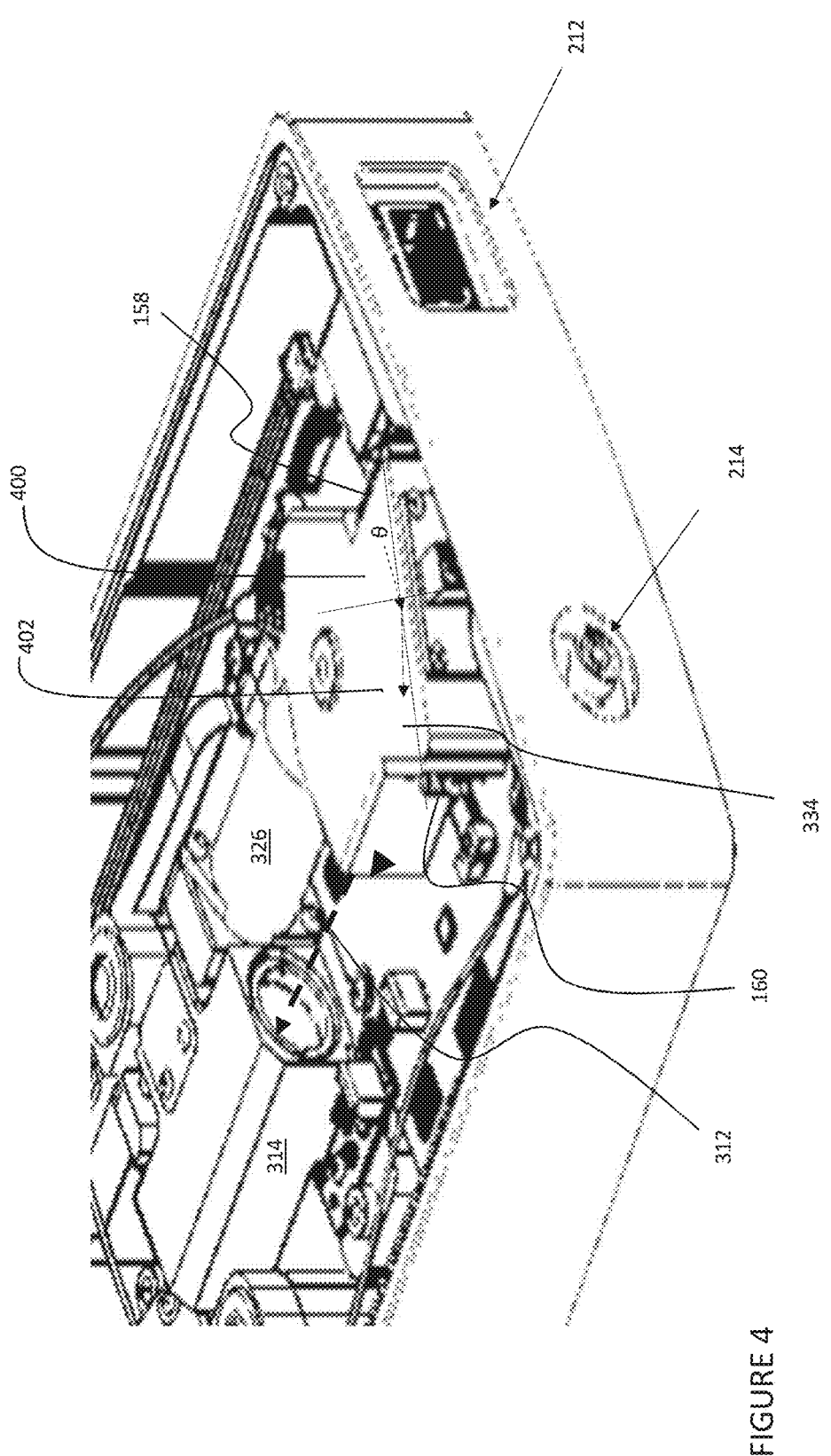
FIG. 4 shows an enlarged view of the OCT scanner adapter 206 shown in FIGS. 3A and 3B.

FIGS. 2A and 2B show how the OCT scanner adapter 206 of FIGS. 3A, 3B and 4 may be fitted to the undercarriage of microscope 200. The OCT scanner adapter 206 microscope accessory may be retrofitted to a microscope 200, for example, by removing any existing microscope accessories from the attachment points located on the undercarriage of the microscope and using their microscope attachment points to instead attach the OCT adapter 206 to the undercarriage of the microscope 200. Once suitably fixed in place, the form factor of the OCT scanner adapter aligns the objective lens 210 with at least one of the optical channels of the microscope optics, for example, a rear channel or a channel used by a microscope camera. In some embodiments, the undercarriage of the OCT adapter may also provide attachment points for accessories to be added.

In some embodiments, the OCT scanner adapter 206 has a form factor which is vertically compact so that it does not add too much height h2 to the microscope height h1 that it is attached to in use. By reducing the additional vertical height h1 of the OCT scanner adapter 206, the case of access to the scanned area during use of the scanner when generating cross-sectional images of the scanned area 116 whilst the microscope is concurrently used is improved. The OCT scanner adapter 206 is also laterally compact. This means that when attached to the microscope 200 it does not unduly hinder surgical access to the area of tissue being scanned which allows a surgical procedure to be performed at the same time.

In the description below, reference is made to height in the context that an OCT scanner adapter 206 will be used to scan a tissue sample 116 from a location above the tissue sample, such as may result when the OCT scanner adapter 206 is mounted to the undercarriage of the surgical microscope 200.

Some embodiments of the OCT scanner 206 described herein may retain a similarly compact form factor and be used in other contexts. Moreover, the OCT scanner 206 may be provided in some embodiments integrated into another apparatus such as microscope 200. In some embodiments, OCT scanner 206 may be distributed as an optional accessory for such apparatus such that it may be distributed and sold independently of the microscope it is later attached to when in use. Accordingly, unless the context clearly prohibits it, references to height may apply equally to other dimensional directions of the OCT scanner which are substantially or approximately orthogonal to the plane of the OCT objective lens and any apparatus to which the OCT scanner is attached and the orientation of the OCT scanner and microscope stack may differ also depending one or more of a patient orientation and configuration of microscope optics and eyepiece location.

In other words, reference to height in the context of overall "height" is merely based on the assumed orientation of the OCT scanner and microscope relative to a supine patient that when surgery is being performed on the patient. Whilst a patient is supine, a surgeon may access the area being operated on below an embodiment of an OCT scanner adapter 206 according to the present invention whilst at the same time having physical access to the eyepiece of the microscope 200 to which the OCT scanner 206 is attached. This geometric configuration may be varied in some embodiments depending on the configuration of the microscope optics and/or orientation of the patient and/or location of the area being operated on. Accordingly, in the description below references to the height and/or combined stack height of the microscope and OCT scanner adapter 206 may also refer to other dimensions of the microscope and OCT scanner adapter 206 which act as a constraint on the form factor of the OCT scanner where this would be apparent to someone of ordinary skill in the art.

Returning now to FIGS. 2A and 2B, microscope optics housed in a microscope housing 202 form an optical channel providing a view of an area below an objective lens 210 of an OCT scanner adapter 206. In some embodiments, the objective lens 210 provided by the OCT scanner adapter 206 for the microscope 200 comprises objective lens 114 of the OCT scanner system 100 shown schematically in FIG. 1. References to objective lens 210 in the description may accordingly refer to the objective lens 114 of an OCT system 100 which includes a different type of OCT scanner 164 unless the context clearly limits the reference to use of the OCT scanner as an adapter or accessory for a microscope.

In the example embodiment of the OCT scanner adapter 206 shown in FIG. 2A, the OCT scanning optical design has a compact form factor that adds the least possible additional height h2 to the height h1 of the microscope optics housing 202.

Also shown in FIGS. 2A and 2B are microscope handles 204a, b, which help position the microscope 200 above the area to be scanned (and viewed). The OCT scanner adapter 206 comprises a housing 208 which is fixed to the under carriage of the microscope 200 as shown. However, as mentioned above, in some embodiments, the OCT scanner adapter 206 may have a different configuration and/or orientation in use. Such different configurations and/or orientations of the OCT scanner adapter 206 in use may also implement the compact principles of the OCT scanner design disclosed herein.

FIG. 2B shows a different, rear elevation, view of the OCT scanner adapter 206 shown in FIG. 2A. The rear elevation view shows a data and/or power port 212, for example, an RSJ45 Ethernet port or USB port, and an optical port 214. Port 212 supplies power to the OCT scanner adapter 206 and in some embodiments may comprise a Power over Ethernet port.

OCT scanning light is returned from the OCT scanner adapter 206 via the optical port 214 in some embodiments to the interferometry components of a OCT scanning system 100 such as that shown in FIG. 1.

For example, in the embodiment of FIG. 1, the returned OCT light from sample 116 passes back via objective lens 210, 114 and is output along the optical fibre 308a via the optical port 214. The optical fibre 308a and the optical path through the mirror lens assembly and other optical components of the OCT scanner adapter 306 which lie along the optical path followed by the OCT scanning beam towards the sample being scanned accordingly form part of the probe arm 105 of the FD-OCT system 100.

After emerging and illuminating the sample tissue 116 being scanned, OCT light is reflected, back-scattered or otherwise returned. The returned OCT light then passes back through the coupler 104 where it interferes with light returned from reference arm 103. The returned OCT and reference beams then propagate along output arm 107 to spectrometer 136 which outputs the OCT and reference beam light interference signal 136 for image processing in order to generate the OCT imaging data 146 which is presented on display 152.

In some embodiments of the present invention, such as, for example, that shown in FIGS. 1, 2A and 2B, the returned OCT light is exported from the OCT scanner adapter 206 via the optical port 214 to the coupler 104 via which it passes on to spectrometer 136 of the spectral OCT system 100.

The OCT scanner housing 208 including the objective lens 210 adds height h2 to the height h1 of the microscope 200 in the embodiment shown in FIGS. 2A and 2B. The additional stack height introduced by attaching the OCT scanner adapter 206 to the microscope housing 202 H2 is minimised by using an optical design for the OCT scanner optical components inside the OCT scanner adapter 206 according to embodiments of the present invention.

For example, some embodiments of the optical component design of an OCT scanner adapter 206 may have the optical design which is shown schematically in FIGS. 3A, 3B, 4 and 5A and 5B . . . . This optical design lifts the OCT beam emerging from the scanning mirror assembly 310 by a minimal amount up out of the plane of the objective lens 114, 210 before the OCT emerges via the objective lens 114, 120. This allows the additional stack height h2 of the OCT scanner adapter to be less than 40 mm and in some embodiments the additional stack height h2 is 36 mm or less.

It will be appreciated that FIGS. 2A and 2B are not to scale, and that the x-y-z axis shown in the Figures is schematic and illustrative only of the general front and rear perspective views. As shown in FIGS. 2A and 2B, the microscope housing body stack height is h1, and is aligned with the Z axis, whereas the microscope housing base and the OCT scanner adapter 206 is predominantly aligned with the X-Y horizontal plane. The under-carriage mounted OCT scanner system stack height h2 is also aligned with the Z-axis. This results in the full stack height h3 of the body of microscope which houses the microscope optics combined with the under-carriage mounted OCT scanner being determined by h1 and h2. Preferably the combined height h3 of h1+h2=h3 is sufficiently short so that the microscope can be positioned to allow its operation by a user who is also performing surgery on or through an area including the focal plane of the microscope objective lens 210 via which the OCT beam which emerges from the microscope. The OCT optical design allows h2 to be minimised to 36 mm whilst still maintaining a suitable exit beam diameter of, for example, 10.6 mm in some embodiments and still having a stack height of 36 mm or less.

Accordingly, by using an optical design for the scanning mirror assembly optics according to embodiments of the present invention, the combined stack height h3=h1+h2 can be made much shorter than was possible with previous optical design configurations . . . .

By reducing the stack height as much as possible, the microscope can be better positioned for surgery. For example, it may be positioned far enough from an in-focus tissue sample to allow access to the tissue sample being operated on by a user yet close enough to conform with typical human physical form factors. In other words, the OCT adapter height h2 is preferably reduced as much as possible to allow conventional operation of the microscope by the user who is also performing the surgical operation, whilst the microscope is optically focused on a focal plane over the tissue sample using the microscope objective lens 210 of the OCT scanner adapter 206 via which the OCT probe beam is emitted onto the tissue sample.

Some embodiments of the OCT scanner adapter 206 microscope accessory shown in FIGS. 2A and 2B include a scanning mirror assembly 310 (described in more detail below) having a compact optical design which allows h2 to be minimised to 36 mm or less.

For example, in some embodiments, and as describer later below referring to FIGS. 3A, 3B and 4, the OCT scanner adapter 206 comprises an ultra-compact large numerical aperture micro-electro-mechanical system, MEMS, based two-dimensional, 2D, scanning mirror assembly 310 which uses a point source 158 for determining a position of the reflective mirror surface 334 in its optical design using a position sensitive detector 160.

Some embodiments of the OCT scanner assembly using the PSD 160 are able to support very high-speed scan rates, for example, 36000 A-scans per second or higher, where an A-scan is a depth scan at a point in the tissue. Each B-scan is formed from multiple adjacent A-scans of which can be used to generate an image with depth information for the area being scanned in the form of a slice through the sample being scanned to show structures at different depths along the slice. In other words, a B-scan provides information about structures in the z-direction or depth direction along a single linear traversal of the tissue sample, for example, a linear scan along a line definable in x-y coordinates such as those shown schematically in FIG. 1. Some embodiments of the OCT assembly allow very high-resolution images, for example, 400 B-scans per second, to be generated in real-time across the full field of view (FoV) being scanned, which may be for example, a 20 mm×20 mm area or larger. By performing a series of B-scan sufficiently quickly and close to each other across the sample, a three-dimensional volumetric or composite scan can then be formed of the area being scanned and presented on a display 152.

Figure 5A:
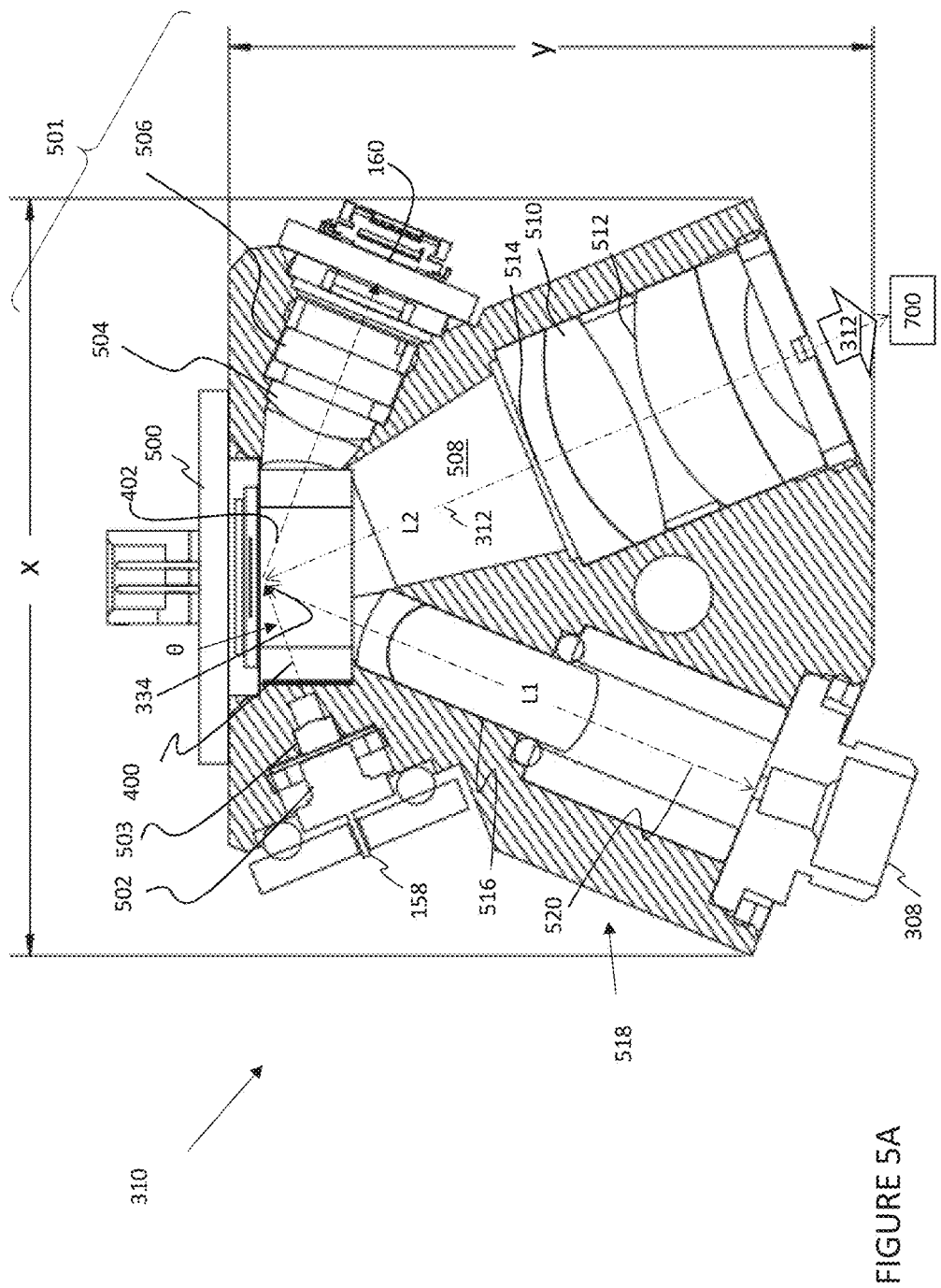
FIG. 5A shows schematically an example of a MEMS scanning mirror assembly optical design according to some embodiments of the present invention.
Figure 5B:
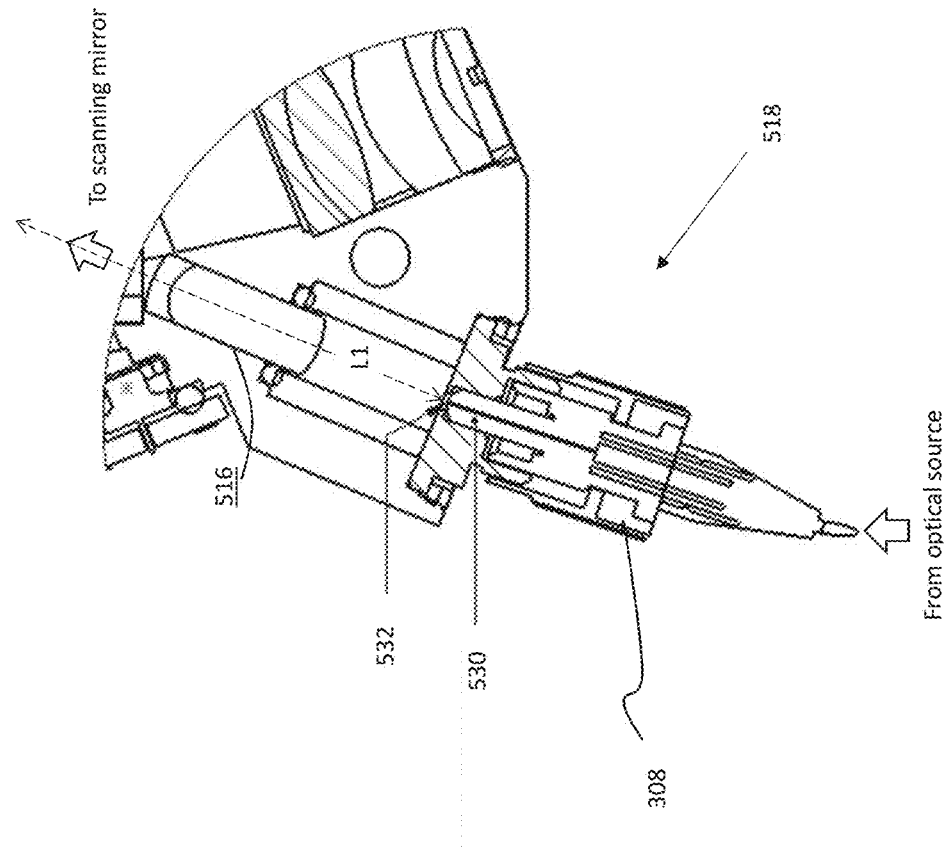
FIG. 5B shows schematically more detail of the input arm 518 of FIG. 5A.

The embodiment of the scanning mirror assembly shown as an optical block 310 in FIGS. 3A to 3B, 4, and in more detail in FIGS. 5A and 5B comprises various optical components which are arranged in an optical design configured to reduce the height h2 and lateral footprint of the OCT scanner adapter 206.

Figure 6:
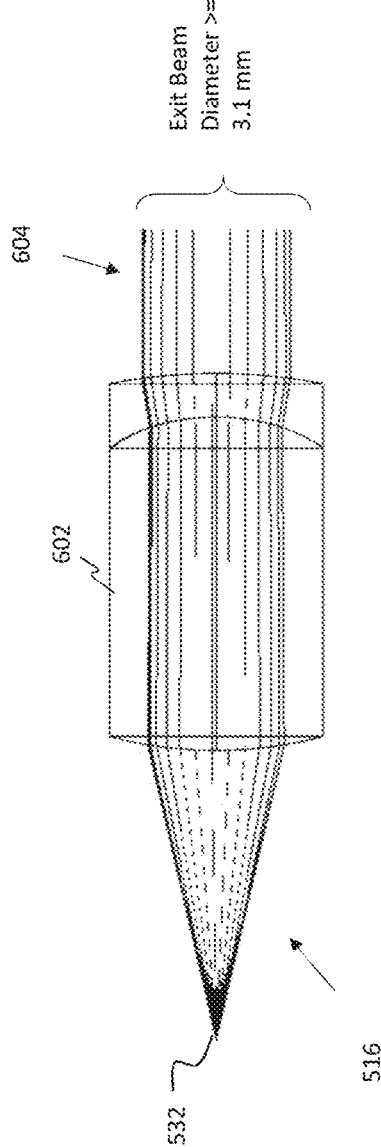
FIG. 6 shows schematically an example of a collimating lens assembly of the input arm of FIG. 5A.

Some embodiments of the optical design of the scanning mirror assembly specify one or both of a minimum and a maximum exit beam diameters for one or more optical components. For example, the beam diameter of the OCT beam input via the optical fibre 308A when it exits the collimating lens assembly 516, shown as collimating lens 602 in FIG. 6, is preferably above a threshold diameter of 3.1 mm, and the beam diameter from the collimating lens may have a 3.3 mm exit pupil diameter in some embodiments. Other design constraints may be dependent on the exit pupil diameter of the OCT beam from the collimating lens. For example, in some embodiments, the collimated OCT beam exits the collimating lens assembly with an exit pupil diameter of at least 3.1 mm, possibly as large as 3.3 mm, and have less than (about) a ½ wave (rms) wave front error.

Another exit beam diameter which is selected for is the beam diameter of the OCT beam 312 that exits from the focusing lens assembly 314 of the OCT scanner adapter 206 which then is incident on the fold mirror 316. The focusing lens 314 expands the OCT scanning or probe beam diameter to 10.6 mm to set the OCT system numerical aperture and ultimately the resolution for the OCT scanner system based on the focal length of the OCT microscope objective lens 210. For the case of the 175 mm working distance (not focal length) objective lens 210, the lateral resolution is 30 µm, in other words, the resolution is better than 33 line pairs per millimetre. This can be contrasted with the 6 micron, 166 line pairs per mm, resolution at the intermediate image plane located at the exit of the OCT objective lens assembly 510, 512.

In some embodiments, the maximum FoV which a user can set for a scan is a 20 mm by 20 mm area using a suitable user interface, for example, a user interface of an apparatus implementing the image processing system 148 shown in FIG. 1 of the figures which includes or is connected to display 152. In some embodiments, the user interface is configured so that a user can adjust a location of an OCT scan FoV within a 25 mm box although a full FoV of an OCT scan image remains a 20 mm×20 mm area.

Embodiments of the present invention which are used for surgical procedures and other use contexts requiring real-time image processing may use a high-dispersion configuration of the OCT system 100 with the OCT scan adapter 206.

The term real-time as used herein, refers to processing delays which are imperceptible, for example, 60 ms or less, and delays of around 30 ms or less are also achievable in some embodiments. The design incorporates a high angle of incidence at the scanning mirror to reduce the compound angle coupling when performing a 2D scan of a sample with both high lateral optical resolution and a telecentric image plane.

The following description of the optical design of the scanning mirror assembly 310 shown in FIGS. 3A, 3B, 4 and 5A incorporates a high angle of incidence at the scanning mirror reflective surface 334 to reduce the compound angle coupling when performing a 2D scan of a sample to enable the OCT scans to be performed with both a high lateral optical resolution and a telecentric image plane. Each OCT-scan comprises a large number of one-dimensional scans, A-scans, which provide depth information at a point in the area (e.g. of the sample) being scanned. Several A-scans are stacked together to create a two-dimensional image, referred to herein as a B-scan. A B-scan provides a slice through the scanned area showing depth information along the path of the A-scans. A plurality of B-scans traversing the scanned area may provide a volumetric scan in three-dimensions of the scanned area.

The scanning mirror assembly 310 includes a moveable reflective surface 334 comprising a micro-electro-mechanical system having a suitably large numerical aperture. The term "large numerical aperture" here refers to a clear aperture of the reflective surface 334 which is preferably greater than about 4 mm in diameter. The term "clear aperture" means the range of angles which can be imaged via the aperture without any supports or clips or other forms of retaining elements getting in the way. The larger the diameter of the clear aperture of the scanning mirror reflective surface 334, the slower the scan rate as the probe beam then covers a larger diameter. Whilst a MEMS mirror with a clear aperture of around 7 mm is already known in the art, even with optical feedback, such known MEMS mirrors with large clear apertures are not capable of scanning at an acceptable rate for real-time imaging applications such as are required for OCT when performing optical surgery. In some embodiments, the scanning mirror has a 5 mm clear aperture. In some embodiments, a 4.2 mm clear aperture diameter scanning mirror assembly is used which enables scans to be performed at a sufficiently high rates for the SD-OCT system shown in FIG. 1 to be used for real-time surgical applications.

In OCT, the axial and lateral properties are decoupled. Lateral resolution is defined by the objective and focusing media in front of the sample. Axial properties of the interferometry are defined by the coherence properties of the OCT scanning light source and also how, after being returned from the sample, the returned OCT signal is sampled at the detector. The OCT axial resolution is dependent on the spectral bandwidth of the OCT scanning light source and the centre wavelength. Axial imaging depth defines the axial range which is covered in a B-scan. It is also defined by the maximum fringe frequency that can be detected as the maximum frequency of an interference spectrum is what decodes the maximum depth scanned.

An A-scan, is an amplitude depth scan along one-dimension, usually referred to as the z-axis, through a sample, a B-scan is a lateral scan in two-dimensions across a sample formed by a series of A-scans. In other words, for each sample point, the spectrally dependant interferometric fringe pattern created by the back reflection from the reference mirror of the OCT interferometer and the back reflection from the sample is recorded as an A-scan. Multiple A-scans are made to generate other scans such as B-scans which allow a complete depth profile of the sample reflectivity at the beam position to be generated.

In some embodiments, the open aperture diameter is 4.2 mm or above.

In some embodiments, the OCT scanner adapter 206 includes a high speed OCT MEMS based mirror scanning assembly 310 which uses a position sensitive detector system 160 to provide a control loop feedback for controlling the positioning of the OCT beam during the scan. The control loop feedback has a technical benefit in that it allows the OCT scanner to generate more B-scans per second of the object of interest being scanned. In other words, the control feedback loop provided in some embodiments of the present invention allows suppression of ringing behaviour and resonant behaviour caused by a step change in driving voltage at the end of a scan line.

Example(s) of OCT Microscope Adapter Design

FIG. 3A shows schematically an example embodiment of a MEMS microscope OCT scanner adapter 206 according to the present invention which is suitable for mounting to the under-carriage of the microscope 200 shown in FIGS. 2A an 2B as it has been configured with optical components which seek to optimally reduce the lateral and vertical footprints whilst maintaining suitable optical quality characteristics for OCT applications.

In FIG. 3A, the illustrated example embodiment of the OCT scanner adapter 206 comprises several components contained within or mounted on an adapter housing 208. The adapter housing 208 comprises the data/power port, 212 for example an Ethernet power over Ethernet port or high-speed USB port or the like.

An optical port 214 is also provided for OCT scanning light to be input and output from the OCT scanner adapter 206. An optical fibre 308a connected to the optical port 214 feeds in OCT light from the coupler 104 shown in the OCT scanning system 100 of FIG. 1 to the scanning mirror assembly optical block 310 shown in FIG. 3A via optical fibre connector 308. The returned OCT light travels back along via optical fibre 308a to the coupler 104 shown in FIG. 1. The optical fibre 308a is accordingly part of the optical path 105a shown in the OCT scanning system 100 of FIG. 1 via which OCT probe light illuminates the sample to be scanned and via which OCT light returned from the sample is output towards the coupler 104 of the OCT scanning system 100 shown in FIG. 1. The optical fibre 308a has a suitable numerical aperture, preferably 0.14, to allow OCT light in the near-infra red region to propagate along it in a single mode.

OCT Light from the OCT light source 102 follows an optical path 101a along the illumination arm 101 to the coupler 104 and then takes optical path 105a along the probe arm 105 in FIG. 1 of which the optical fibre 308a forms part. The OCT light following the optical fibre 308a is injected into the scanning mirror assembly optical block 310 via OCT data connection fibre connector 308 and then follows the OCT arm 518 (see FIG. 5A) of the MEMS scanning mirror assembly 310.

In some embodiments, the optical fibre connector 308 via which OCT light is input to the MEMS mirror block 310 is a fibre connector to angle polished connector.

The optical block housing the MEMS scanning mirror assembly 310 also houses the optical components of the optical angular displacement mirror position measurement system 156 for the scanning mirror assembly, shown in FIG. 1 as mirror position measurement system 156. The controller 162 (see FIG. 1) is used for adjusting the reflective surface 334 of the scanning mirror 112 shown in FIG. 1 using a mirror mover mechanism of the MEMS scanning mirror assembly 310. The controller 164 may be implemented within the OCT scanner adapter 206 or provided remotely, in which case control signals may pass to the mirror mover in the MEMS scanning mirror assembly 310 via the data port 212 of the OCT scanner adapter 206.

The same mirror reflective surface 334 in the scanning mirror assembly housed in optical block 310 reflects both the input OCT beam and a mirror positioning reference beam from a different source (see FIG. 5A described below for more detail) in some embodiments. As would be apparent to anyone of ordinary skill in the art, however, it is possible for separate mirrors mounted on the same tilt-axis to be used in other embodiments, providing this is done in a manner that does not adversely affect the stack height h2 of the OCT scanner adapter 206.

The OCT light following the optical path 105a received via OCT data connection fibre 308 is reflected in a different optical plane at the reflective surface 334 to the optical plane at which light from the light source of the angular displacement mirror measurement system 156 is reflected.

The reflected OCT beam then follows an optical path through the OCT scanner adapter 206 from which it emerges via the microscope objective lens 210 to probe the object of interest, for example, a tissue sample such as the in-vivo eye tissue shown schematically in FIG. 1. Other types of objects of interest may range from tissue samples for ophthalmology and areas such as dermatology, dentistry, angiography, cardiology, as well as other tissue samples for diagnostics of diseases including cancer.

The OCT light which is reflected, back-scattered or otherwise returned from structures within the tissue sample then follows a return path 105a back through the scanning mirror assembly of the optical block 310 and along optical fibre 308a. The returned OCT light then exits the OCT scanner adapter 206 via optical port 214 and is fed into the OCT system 100 where it is combined and interferes with light returned from reference arm 103 at coupler 104. The resulting interference pattern is detected in the OCT system 100 of FIG. 1 by a spectrometer 136 which generates image data which can then be image processed in order to obtain a tomogram image indicating the scanned structures in the tissue located within the scan FoV.

In the example embodiment of the OCT adapter 206 shown in FIG. 3A, the OCT probe beam 312 is output from the optical block which houses the MEMS OCT scanning mirror assembly 310 and travels towards a fold mirror 316 which lifts the OCT beam by a minimal amount out of its optical plane towards beam splitter 318. The beam splitter 318 reflects the incident OCT beam towards the objective lens assembly 210 of the OCT scanner adapter 206 which also acts as an objective lens for the microscope optics housed in microscope 200 when the OCT scanner adapter 206 is attached the microscope 200. The OCT probe beam emerges from the objective lens 210 as a telecentric beam focused on focal plane 154 in the tissue being scanned, which as shown lies in the x-y plane shown schematically in FIG. 1. The resulting returned OCT light may be used to generate an OCT A-scan which provides depth information orthogonal to the focal plane 154, in other words, in the z-direction as shown in FIG. 1. Movement of the reflective mirror surface 334 moves the location of the telecentric beam across the focal plane 154 in the area being scanned 116 and allows OCT B-scan images to be generated.

In FIG. 3A, the OCT scanner adapter 206 is configured so that the objective lens 210 can be used as an objective lens by microscope optics as well as by the OCT scanner system 100. A light-proof gasket 320 is provided around the aperture formed in the OCT scanner adapter 206 via which the OCT objective lens 210 is aligned with and extends the optical channel formed by the microscope optics of microscope 200.

The configuration of the fold mirror 316, the beam splitter 318, and the objective lens assembly 210 of the OCT scanner adapter 206 are collectively designed so that OCT beam is lifted out of the plane it follows through the scanning mirror assembly by only a small amount, in order to be able to exit via objective lens 210. The amount of lift required is affected by the tilt-angles for the beam splitter and the fold mirror and beam entry geometry. The additional height h2 that the OCT scanner adapter 206 adds to the height of the microscope is accordingly also minimised by using this optical design. For example, in some embodiments the OCT scanner adapter housing 302 adds 40 mm or less to the overall height h1 of the microscope housing 202. In some embodiments, the additional height h2 is 36 mm or less. This can be achieved with a lift of, or around, 27 mm in some embodiments using suitable tilt-angles for the beam-splitter and fold mirror.

In some embodiments, and as shown in the example embodiment of FIG. 3A, the OCT probe beam 312 exits the optical block housing the scanning mirror assembly and travels through free space first to a focusing lens assembly 314 which allows the focal plane of the image being scanned to be adjusted. This adjusts the focus of the scan at different depths. The focusing lens assembly 314 is driven by a motor 326 and also comprises a travel limiter or stop 324. In some embodiments, the focusing mechanism provided by the focusing lens assembly 314 of the adapter can be adjusted to control the OCT focal plane with a +30 mm range which allowing a range of depths in the sample to be focused on for a scan. The OCT focal plane can be adjusted over the +/−30 mm range and may be optimized for the best SNR during initial image acquisition. This is different and should not to be confused with the technique of shifting the focus at the A-scan rate which is used to extend the depth of focus within the sample. The focusing lens assembly 314 moves more slowly than is required for the A-scan sampling and unless the system detects a large motion in the sample it will not be adjusted without user intervention.

In some embodiments, and as shown in FIG. 3A, the OCT scanner adapter 206 is attached to the microscope 200, using fixations, for example, screws, which are provided in recesses of mounts 328a and 328b and which can be extended out of the mounts 328a, 328b into the undercarriage of the microscope 200 into corresponding receiving apertures or holes, preferably threaded holes in the undercarriage of the microscope 200 so as to fixedly engage the OCT scanner adapter 206 with the microscope. In some embodiments where the OCT scanner adapter 206 functions as a microscope accessory the OCT scanner adapter 206 may also comprise receiving apertures or holes at corresponding locations in its base to the locations of receiving holes or apertures in the undercarriage of the microscope 200. By having the same or similar fixation locations in the base of the OCT scanner adapter microscope accessory 206 as the fixation locations in the microscope undercarriage, different types of microscope accessories which would otherwise be attached to the undercarriage of the microscope 200 can instead be attached to the undercarriage of the OCT adapter. In other words, in some embodiments the OCT scanner adapter 206 is configured to attach to the undercarriage of the microscope as a microscope optics accessory. Some embodiments, of the OCT scanner adapter microscope accessory 206 allow the OCT scanner adapter accessory 206 to have another microscope accessory attached to the base of the OCT scanner adapter.

FIG. 3B shows an alternative view of the OCT scanner adapter 206 of FIG. 3A. In FIG. 3B, however, the location of the optical source or emitter 158 of the mirror positioning light beam 400, shown in FIG. 4, which illuminates the scanning mirror is more visible along with as is the location of a position sensitive detector, PSD, 160 of the optical angular displacement measurement system 156 in the optical block 310.

Also shown schematically in FIG. 3B is an example angle of incidence θ of the mirror positioning illumination beam 400, shown in FIG. 4, at the reflective surface 334 the MEMS scanning mirror which after reflection forms the mirror positioning reference beam which travels towards the PSD 160.

It will be appreciated that the angle of incidence and the locations of the beam paths shown in the drawings are for illustrative purposes only and not to scale.

The design of the MEMS scanning mirror assembly is configured so that the illuminating mirror positioning light beam 400, shown in FIG. 4, is reflected in a different optical plane by a reflective surface 334 of the scanning mirror to form a reference beam 402 which passes along a positioning reference arm of the OCT scanning mirror assembly 310 from the optical plane in which the same reflective surface 334 reflects the incident OCT scanning or probe beam 312, shown in FIGS. 4 & 5A. The scanning mirror assembly is also configured so that returned positioning light is reflected by the mirror in another optical plane different from the optical plane of reflection of the OCT outwards and returned beams and different from the optical plane in which the incident mirror positioning beam is reflected so that it causes minimal interference with either OCT beams or the incident mirror positioning beam or the optical source for the mirror positioning beam.

FIG. 4 of the accompanying drawings, this shows schematically an enlarged view of the OCT scanner adapter 206 of FIGS. 3A and 3B. In FIG. 4, the mirror position illuminating beam 400 (shown as a dash dash dash line) from the point light source 158 is incident at the reflective surface 334 of the OCT scanning mirror 500, shown in FIG. 5A, with an angle of incidence, AOI, shown as 0. The mirror position reflected beam 402 (shown as a dash dot dash line in FIG. 4) is reflected towards the PSD 160 where it is detected. For the sake of clarity, returned light from the incident beam at PSD 160 is disclosed but not shown in FIG. 4.

The OCT scanner optical components shown in FIGS. 3A to 4 are arranged so that OCT light emerging from the optical plane of the scanning mirror assembly is lifted by only a small amount out of that optical plane by folding mirror 316 towards the beam splitter 318. Beam splitter 318 allows light via the microscope optics to be transmitted and returned to the microscope optics whilst also reflecting the OCT probe beam to the same focal plane 154 as the microscope light. By optimally positioning the beam-splitter and the fold mirror relative to the objective lens 210, it is possible to reduce the height the OCT probe beam must be lifted by the fold mirror before it is reflected by the beam splitter 318 out through the objective lens 210.

In some embodiments, the fold mirror lifts the OCT beam by 27 mm mm out of the optical plane of the scanning mirror assembly.

Example(s) of Scanning Mirror Assembly Optical Design

FIG. 5A of the accompanying drawings shows schematically an example of an optical design for a two-dimensional, 2D, scanning mirror assembly such as, for example, the 2D scanning mirror assembly housed in the optical block 310 shown in FIGS. 3A, 3B and 4.

The optical design of the 2D scanning mirror assembly is suitable for use in other types of OCT scanners such as OCT scanner 164 in FIG. 1 as well as the OCT scanner adapter 206. The scanning mirror assembly 310 shown in FIG. 5A has an optical design which may be used for other applications than OCT which use scanning light requiring mirror positioning.

In other words, the 2D scanning mirror assembly optical design of FIG. 5A does not need to be limited to OCT applications or apparatus such as those shown in FIGS. 1-4 of the accompanying drawings in all of its embodiments. It may be beneficially implemented in any other types of light scanning apparatus where a compact lateral optical plane is beneficial.

Some example embodiments of the micro-electro-mechanical system, MEMS, two-dimensional scanning mirror assembly 310 shown in FIG. 5A have an optical design comprising a moveable MEMS scanning mirror having a reflective surface 334, a connector 308 to a point light source for a scanning light beam, for example, as shown an optical fibre 308a connected via an optical fibre connector 308 and the end of the optical fibre 308a (see FIG. 5b) then acts as the point light source for the light beam.

The scanning mirror assembly optics also comprises a collimating lens assembly 516 for the light introduced via the connector 308. Collimating lens assembly 516 is configured to output light from the point light source with an exit beam diameter above a threshold exit beam diameter towards the reflective surface suitable for a desired scanning application. After reflection at the reflective surface 334 of the scanning mirror 112, the scanning light beam passes via an objective lens assembly 510, 512 to exit the scanning mirror assembly.

The reflective surface 334 is configured to reflect an incident collimated light beam to form a scanning beam, for example, an OCT probe beam if the point light source provides OCT light, which exits the mirror assembly via an objective lens 510 and field lens 512 (collectively also referred to as the objective lens assembly 510, 512) as a telecentric beam 312 towards a telecentric image plane 154. The optical design of the components in the scanning mirror assembly is configured to ensure the scanning beam is able to perform a scan with a resolution better than a resolution threshold.

The optics of the scanning mirror assembly are configured to provide a total track length, L, for the path from the point light source, for example, from the end-face of the optical fibre or fibre ferrule (see also FIG. 5B), to the telecentric image plane (700) of less than about 40 mm to help keep the lateral dimensions X of the scanning mirror assembly small enough to allow the OCT scanner housing 308 to be below a desired lateral footprint in its design. For example, as shown in FIG. 5, the width X of the scanning mirror assembly is preferably below 41 m, for example, it may be 40.6 mm or less in some embodiments. The optical design is also configured to keep the depth Y as shown in FIG. 5A also as small as possible, for example, Y may be 35 mm or less, and may be as short as 34.5 mm or less in some optical designs.

The total track length, L, is accordingly kept as short as the optical design layout permits to reduce the lateral and depth footprints X and Y to the smallest possible in some embodiments so that the housing of a scanner comprising the scanning mirror assembly 310 can be similarly provided with a small footprint . . . .

By keeping the lateral footprint X as small as possible, side access to the area being scanned is improved which is particularly beneficial when the scanning mirror assembly 310 is a scanning mirror assembly for an OCT scanner adapter 206 which is a surgical microscope accessory as this may improve access to the area being surgically operated on whilst the microscope it is attached to is in use.

In some embodiments of the scanning mirror assembly, the threshold for the exit beam diameter from the collimating lens 516 is at least 3 mm, and preferably at least 3.1 mm. By having an exit beam diameter of at least 3.1 mm, the scanner benefits from a better lateral resolution than a small exit beam diameter allow In some embodiments of the scanning mirror assembly, the threshold for the telecentric beam resolution at the telecentric image plane 700 is better than 6 microns. In other words, the scan image can resolve features in the sample being scanned which are smaller than 6 microns.

In some embodiments, the scanning mirror 112 may be moved, for example by a controller 162, The scanning mirror assembly may be configured in some embodiments to move about its optical axis and scan over +/−5 degrees in some embodiments.

In some embodiments of the scanning mirror assembly, the numerical aperture of the optical fibre and the focal length of the collimating lens together determine the a suitable threshold for the exit beam diameter of the collimated beam from the collimating lens to at least 3.1 mm into achieve the designed resolution at the focal plane. The combination of focal lengths of a scanning mirror objective lens and a scanning mirror field lens via which the probe beam exits the mirror assembly determines the total track length, L, which is preferably less than 40 mm or thereabouts.

In some embodiments, for example, where the scanning mirror assembly is being used for OCT purposes, the optical fibre has a numerical aperture of 0.14. The optical fibre which feeds in light to the scanning mirror assembly by acting as a point light source may have another suitable numerical aperture value in other embodiments of the scanning mirror assembly providing the numerical aperture allows sufficient light to be fed into the scanning mirror assembly for another context of use along a single mode optical fibre 308a.

In some embodiments of the scanning mirror assembly, the objective lens 510 comprises a F2.7 Biconvex doublet lens and the field lens 512 comprises a F19 positive/negative meniscus doublet field lens.

In some embodiments of the scanning mirror assembly, the optical path difference, OPD, of the telecentric probe beam output by the scanning mirror assembly has a radius of curvature is greater than 100 mm.

In some embodiments of the scanning mirror assembly, the telecentric beam is telecentric to better than an incident angle of 0.03 degrees at the telecentric image plane.

In some embodiments of the MEMS scanning mirror assembly, the reflective surface 334 of the MEMS scanning mirror comprises a large-aperture gold-coated silicon mirror bonded to an underlying mechanical structure.

The embodiment of the scanning mirror assembly 310 design illustrated schematically in FIG. 5A may be implemented as an optical block in an OCT scanning system such as the OCT scanning system 100 shown in FIG. 1. For example, in some embodiments, the scanning mirror assembly is implemented as an optical block having the X, Y footprint shown in FIG. 5A in a compact OCT scanner adapter 206 for a microscope, such as the optical block which houses the scanning mirror assembly 310 shown in FIGS. 3A, 3B and 4.

As mentioned above, however, the scanning mirror assembly 310 shown in FIGS. 5A and 5B has an optical design which can be used in a range of different use contexts in other types of scanner systems. In some embodiments, the mirror assembly shown in FIGS. 5A and 5B is provided as scanning mirror assembly for an OCT apparatus such as that shown in FIGS. 3A to 3B and receives light injected by optical fibre 308a. In other embodiments a different point light source may be used instead of the optical fibre 308a which acts a point light source for an OCT light beam as shown in FIGS. 3A, 3B, 4, 5A and 5B.

In some embodiments, the mirror assembly 310 may be provided in an OCT scanner adapter 206 which is used as an OCT scanning accessory for a microscope. 200 The microscope may comprise a surgical microscope in some embodiments and the scanning mirror assembly 310 may be used to generate OCT scans of a sample tissue area being surgically operated on at a sufficiently high rate to allow live OCT tomographs to be generated of the sample tissue area whilst the surgical operation is on-going.

In some embodiments, the SD-OCT scanning system shown in FIG. 1 includes a. OCT scanner adapter 206 comprising a scanning mirror assembly 112, 310 having the optical design shown in FIGS. 5A and 5B and as described herein.

In some embodiments, the scanning mirror assembly 310 is configured so that OCT light returned from the sample along the OCT probe arm 105 has a lateral optical resolution equal or higher than 6 μm, in other words, the resolution is better than 166 line pairs per mm.

In some embodiments, the scanning mirror assembly 310 comprises a MEMS 2-D scanning mirror assembly which includes at least: a moveable MEMS scanning mirror having a reflective surface 334, an optical fibre 308a connected via an optical fibre connector 308 and configured to act as a point light source for an OCT beam illuminating the reflective surface 334, a collimating lens assembly 516 configured to output OCT light from the point light source with an exit beam diameter of at least 3.1 mm towards the reflective surface 334. The reflective surface 334 is configured to reflect both an incident collimated OCT light beam to form an OCT probe beam and a mirror positioning reference beam. The OCT probe exits the mirror assembly as a telecentric beam towards a telecentric image plane with a resolution of at most 6 microns. The optics of the scanning mirror assembly 310 are configured to provide a total track length, L, from a) an end-face of a fibre ferrule providing the point light source inserted in the optical fibre connector to b) the telecentric image plane of less than 40 mm and preferably less than 36 mm in some embodiments. An objective lens assembly 510, 512 is provided in a probe arm of the scanning mirror assembly to focus the telecentric OCT beam via the OCT scanner (microscope) lens 114, 210 in some embodiments.

The scanning mirror assembly 310 has an optical design which includes the reflective surface 334 of the MEMS mirror being configured so that an incident mirror positioning beam is reflected in a separate optical plane to the optical plane in which an incident OCT scanning beam is reflected. In this manner, the scanning mirror assembly may be also used with a mirror positioning system such as an angular tilt mirror positioning system shown schematically in FIG. 1 of the drawings.

As mentioned above, some embodiments of the MEMS based scanning mirror assembly shown in FIGS. 5A and 5B and described herein are implemented in an OCT scanner 206 such as that shown in FIGS. 3A,3B and 4, as part of the SD-OCT scanning system shown in FIG. 1. Some embodiments of the present invention accordingly comprise a OCT scanner system 100 comprising the OCT scanner 206 including a micro-electro-mechanical system, MEMS, two-dimensional scanning mirror assembly 310 having a compact optical design according to the present invention.

In some embodiments of the MEMS scanning mirror assembly 310, the scanning mirror 112 is mounted on an underlying mechanical structure or support 500 as shown in FIG. 5A which provides a mirror moving mechanism to allow the mirror surface 334 to pivot about its optical axis under the control of controller 162.

In some embodiments, the reflective surface 334 of the MEMS scanning mirror assembly comprises a large-aperture gold-coated silicon mirror bonded to the underlying mechanical structure 500.

The angular displacement measurement system 156 shown in FIG. 1 is implemented in the embodiment of the MEMS mirror assembly of FIG. 5A, by a light source 158 which comprises a suitable optical point source, for example, a laser diode 502. The optical point source generates a light beam, referred to herein as a mirror positioning light beam 400 (shown by the dashed line in FIG. 5A) which passes through a collimating lens 503 such that a collimated mirror positioning beam 400 is incident on the scanning mirror surface 334 with an angle of incidence θ.

The angular displacement measurement system 156 is used to determine the angular position of the MEMS, scanning mirror assembly 310 relative to the incident mirror positioning beam 400 as this allows the mirror position for an incident light beam to be determined when performing a scan and adjusted as the scan progresses. The OCT scan (e.g. a B-scan or volumetric scan) is performed by moving the mirror using the controller 164 in accordance with any scan parameters for a particular scan configuration (these can be input by a user and/or automatically determined for a particular type of scan in some embodiments).

The position of the moveable MEMS mirror surface 334 may be controlled in some embodiments using a suitable angular position controller using closed loop control based on the feedback from a position sensitive detector 160 which detects the reflected mirror positioning beam 402.

In some embodiments, the scanning mirror assembly 310 described above with reference to FIGS. 3A, 3B, 4, 5A and 5B includes the position sensitive detector 160 which is configured to send feedback mirror position data to a controller 162 configured control the position of the MEMS scanning mirror surface when a scan is performed. However, in some embodiments of the compact OCT scanning mirror assembly 310 of the drawings, the controller is housed remotely. For example, it may be housed elsewhere within the OCT scanner adapter 206 in some embodiments. Alternatively it may be housed with other system components of the OCT scanner system 100 or hosted on a different platform having a user interface to allow the input of scan parameters in some embodiments. Control signals may be sent from a remote controller 162 via a suitable data connection such as data port such as 212 in some embodiments.

In some embodiments, the mirror positioning light source illuminates the reflective surface of the mirror assembly for the optical mirror position feedback channel with an angle of incidence, θ, above 62 degrees, preferably 67.5 degrees, from the normal to the plane of the reflective mirror surface 334.

In some embodiments, the OCT light source illuminates the reflective surface of the mirror assembly for the OCT light channel with an angle of incidence, θ, below 28 degrees, preferably 22.5 degrees, from the normal to the plane of the reflective mirror surface 334.

In some embodiments, the minimum usable aperture at the reflective mirror surface is at least 4 mm, which is particularly useful when the mirror assembly is incorporated in OCT scanner apparatus, such as the compact OCT scanner 206 microscope accessory used for surgical applications.

In some embodiments of the present invention, the OCT apparatus may use closed loop feedback for controlling the scanning mirror position in some embodiments. The use of closed loop feedback may be useful in embodiments where a high scan rate is required such as where a live video or other form of image sequence of OCT scans is required. The use of closed loop feedback supports OCT scans being generated at a high-rate with low lag for time-sensitive applications, such as when OCT scans are provided to guide surgical procedures as it allows the mirror to be moved fast enough and precisely enough to achieve high scan rates and/or high scan resolutions (in other words, high OCT image B-scan or volumetric scan resolutions). In some embodiments, however, an open loop control may be provided.

The present invention seeks to address at least some of the design constraints which are present when designing OCT systems for surgical microscopes. For example, one design constraint is that smaller diameter scanning mirror surfaces are better suited to achieving higher scan rates. The numerical aperture relates to resolution. A clear aperture, i.e., mirror diameter, relates to scan size in that the underlying mechanical structure of the MEMS is the same so a small diameter mirror can such as 2 mm diameter can tilt farther before hitting the MEMS base (up to +/−7 degrees) where-as large diameter mirrors such as 7.5 mm diameter can only tilt +/−1.5 degrees before hitting the base. This means that whilst a smaller diameter mirrors could be used and scan a larger area, this would be at the cost of resolution.

In some embodiments, the threshold for the exit beam diameter of the OCT light beam is based on a numerical aperture of the optical fibre and the focal length of the collimating lens assembly.

In some embodiments, the two-dimensional scanning mirror assembly is configured to reflect a mirror positioning beam of light (400) incident at the reflective surface (334) in a first optical plane towards a position sensitive detector (160) configured to generate information on an angle of tilt of the scanning mirror reflective surface (334

In some embodiments of the optical angular displacement measurement system 156 of the scanning mirror assembly 310 shown in FIG. 5, the mirror positioning light from light source, 158 is collimated first by a suitable collimating lens assemble 503 to form a collimated illuminating light beam 400 which is incident at the reflective mirror surface 334. The collimated illuminating light beam 400 (represented schematically by the short dash dash dash line in FIGS. 3B, 4 and 5A) is then incident on the reflective MEMS mirror surface 334 with an AOI=θ and is reflected to form a mirror position reference beam 402 (shown by the longer dash dot dash line in FIGS. 3B, 4 and 5A) which travels along a mirror positioning reference arm 501 of the scanning mirror assembly towards PSD 160 via a PSD lens assembly 504 and, in some embodiments, via an optional neutral density filter 506.

The mirror positioning beam 400 may, however, be reflected back or otherwise returned by the PSD 160 towards the reflective surface 334 of the MEMS mirror (the reflected beam is disclosed but not shown in FIG. 5A). This is unwanted as such returned light can contaminate the illuminating positioning beam and/or the input OCT light beam. Other issues with stray light reflectance in the mirror position detector system include the detected spot position being wrong if there is any stray light on the PSD 160, the diode behaviour may change if reflected light enters the diode cavity, and this can cause intensity fluctuations in the position detector beam which the PSD will detect as changes in position.

To prevent returned reflective elements of the positioning beam being reflected by the MEMS mirror assembly 310, some embodiments of the present invention include additional components such as a light trap. The light trap is suitably configured and located suitably to reduce any reflected mirror positioning reference beam light from re-entering the emitter for the mirror positioning beam and/or contaminating the returned probe beam 312 before it reaches the interferometer.

As mentioned above, some embodiments of the MEMS based scanning mirror assembly shown in FIGS. 5A and 5B have reflective surface(s) is (are) is designed so that OCT light input via the OCT light coupler 308 is reflected from another region of the MEMS mirror surface 334 that the mirror positioning reference beam 402 and the OCT scanning or probe beam are reflected in different optical planes.

The OCT scanning or probe beam reflected by the MEMS mirror surface 334 of the scanning mirror assembly 310 after reflection passes along an optical path through an OCT objective lens 510 and an OCT field lens assembly 512 which outputs the OCT beam as a telecentric beam into free space towards fold mirror 316. As shown in the embodiments of FIGS. 3A and 3B, and 4, before the beam is incident on fold mirror 318 which lifts the beam out of the optical plane of the scanning mirror assembly it passes via focusing lens assembly 314. In some embodiments this allows the OCT focal plane to be focused with a +/−30 mm range, in other words, a range of different depths can be focused on in the scan area. However the focusing lens optics may be omitted in some embodiments of the OCT scanner.

The fold mirror 316 lifts the OCT scanning (or probe) beam out of the plane of its optical path through the scanning mirror assembly by reflecting the incident OCT scanning or probe beam towards a beam-splitter 318. The beam-splitter reflects the OCT scanning or probe beam out of the OCT scanner adapter 206 microscope objective lens 210 towards a focal plane 154 for scanning a tissue or similar object of interest, which may be an in-vivo tissue sample or in-vitro sample. The beam-splitter 318 also allows the OCT illuminated area being scanned to be viewed via microscope optics housed in the microscope 200.

In some embodiments, and as shown in FIGS. 3A and 3B, the OCT probe beam 312 is input to the optical block by traveling along optical path 105a within optical fibre 308a and enters the scanning mirror optical block 310 via OCT data connection fibre input 308. The OCT scanning or probe beam 520 then passes via collimating lens 516 towards the scanning mirror reflective surface 334. The mirror surface 334 reflects the OCT beam via a probe arm 508 out of the optical block containing the scanning mirror assembly 310 at which point it travels in free space towards the fold mirror 316.

As shown in the embodiment of the OCT adapter shown in FIGS. 3A and 3B and 4, the OCT scanning or probe beam 312 is focused before it reaches the fold mirror 316 by passing through a focusing lens assembly 314. The focusing lens assembly is driven by a motor 336 which adjusts the position of the focusing optics to allows a range of focal depths to be achieved when performing a scan. In some embodiments, the focal range can vary from +/−30 mm.

The returned OCT light is reflected via the MEMS scanning mirror surface 334 back along the OCT arm 518 of the scanning mirror assembly 310 back towards the coupler of the OCT system 100 shown in FIG. 1.

In the scanning mirror assembly 310, the input OCT light beam is input via the optical fibre connector 308 from the end face 532 of optical fibre 308a passes at the optical fibre ferrule 530 (see also FIG. 5B) through an OCT collimating lens 516 towards the scanning mirror assembly. The track length, in other words the measurable physical distance of the path taken from the end-face 532 to the surface of the scanning mirror is shown in FIGS. 5A and 5B as L1.

FIG. 5A also shows the track length L2 from the scanning mirror surface to the telecentric image plane 700. The total track length L=L1 and L2 is preferably less than or equal to a track length design threshold of 40 mm.

FIG. 5B is an enlarged view of FIG. 5A showing more clearly the location of the optical fibre ferrule 532 and optical fibre end-face 530 at which the optical fibre 308a acting as a point light source injects OCT light into the mirror scanning system 310. The OCT light passes from the end face 532 of the fibre to collimating lens 516 and the collimated illuminating OCT beam is then incident at the reflective surface 334 of the MEMS scanning mirror which reflects it towards the OCT probe arm 105 (as shown in FIG. 1) or 508 as shown in FIG. 5A.

In the return direction, which is disclosed but not shown in FIG. 5A or 5B for clarity, returned OCT light passes along the OCT arm 518 (see also the description of FIG. 6) and through the collimating lens 516 in the other direction before travelling out via the OCT data connection fibre 308 along optical fibre 308a before leaving the OCT scanner adapter 206 via optical port 214.

In some embodiments, the OCT scanner is implemented using an OTS (off the shelf) MEMS (microelectromechanical system) in which the MEMS scanning mirror reflective surface 334 is provided by large aperture protected gold coated silicon mirror bonded to the underlying mechanical structure 500 of the optical block 310. The OCT scanner 206 formed by such a design provides a simplified and miniaturized optical system which has the same optical performance as much larger galvanometer scanning mirror type systems known in the art for use in intraoperative OCT systems.

In some embodiments, the optical block design of the OCT MEMS mirror assembly 310 includes a 2D scanning mirror assembly and a complimentary optical angular displacement measurement system 156 for measuring the position of the MEMS mirror system.

The mirror positioning system which measures the angular displacement of the scanning mirror reflective surface 334 comprises a mirror positioning light source 158 and a position sensitive detector, PSD, 160. The PSD may comprises a PSD lens assembly 504 and a neutral density filter 506 as well as the PSD 160. An example of a suitable PSD detector is a Hamamastu S5991 4 mm×4 mm active area position sensitive detector . . . .

In some embodiments, the angular optical displacement measurement system 156 is provided in the same optical block as the MEMS scanning mirror assembly 310. The optical angular displacement measurement system 156 is used in some embodiments to provide closed loop control of the MEMS scanning mirror position. The closed loop control can be provided by measuring the angle of incidence θ using the PSD 160 and providing information indicating the mirror position derived from this to a controller which allows the controller to more accurately control the tilt angle of the scanning mirror reflective surface 334 as a scan is performed.

This closed loop feedback can allow much high B scan rates to be performed. For example, at least 400 B-scans per second can be achieved as a maximum scan rate at full angular deflection in relation to the maximum field of view, FoV using closed loop control for a 4.2 mm diameter clear aperture mirror 112.

In embodiments without closed loop control i.e., open loop scanning, a low pass filter may be used to prevent the MEMS scanning mirror moving device from reaching its natural frequency excitation state where the MEMS scanning mirror moving device may become resonate by uncontrolled oscillation (which in turn can damage the MEMS scanning mirror moving device). In embodiments where open loop scanning is implemented, the maximum scan rate may be approximately 50 B-scans per second which can be contrasted with the rates achievable by closed loop control. With closed loop control in some embodiments, the scan rates which can be achieved using an example embodiment of the MEMs scanning mirror assembly 310 according to the present invention is approximately 400 Hz or higher.

In some embodiments, the optical components of the MEMS scanning mirror assembly 310 are configured collectively provide a predetermined system numerical aperture for a desired system optical resolution through the microscope objective lens 210. In other words, in some embodiments, the MEMS scanning mirror system components are suitably configured to enable the diameter of the collimated OCT beam 312 output along OCT data connection fibre 308 to match a desired minimum system optical resolution after it has passed out through the microscope objective lens 210.

In some embodiments, all air to glass interfaces within the OCT scanner adapter 206 are designed with convex surfaces to minimize any back reflections from the OCT beam as it propagates through the optical system.

FIG. 6 shows an example embodiment of an OCT collimator lens, also referred to herein as an OCT collimator lens assembly, 516 such as the collimator lens 516 shown in the OCT arm 518 of the optical block including the scanning mirror assembly 310 shown in FIG. 5 of the drawings. The OCT collimator lens 516 is provided along the OCT arm 518 of the scanning mirror assembly optical block 310. In FIG. 6, the OCT light fed into the collimating lens assembly 602 via the optical fibre ferrule end 532 emerges as a collimated OCT output beam 604 having a collimated beam diameter of at least 3.1 mm. The collimated OCT beam then travels towards and is reflected from the scanning mirror reflective surface 334. Returned OCT light follows the reverse path through the scanning mirror assembly and is focused via the collimating beam towards the end of the optical fibre 308a which gathers the returned light and the returned OCT light can then propagates back towards a coupler 104 of an interferometer system such as OCT system 100 shown in FIG. 1.

A suitable example of an OCT collimator lens 516 which may be used in some embodiments of the present invention is a F3.2 Biconvex doublet lens. Such a lens has a thick crown glass section which reduces the curvature radii of the lens surfaces and consequently improves colour performance. In some example embodiments, the collimator lens has 10 mm focal length with 100 micron depth of focus which allows for good mechanical focal stability. In some embodiments the OCT collimator lens provides an exit beam which has a 3.1 mm diameter collimated beam (exit pupil diameter) with <¼ wave (root mean square, rms) wave front error.

Figure 7:
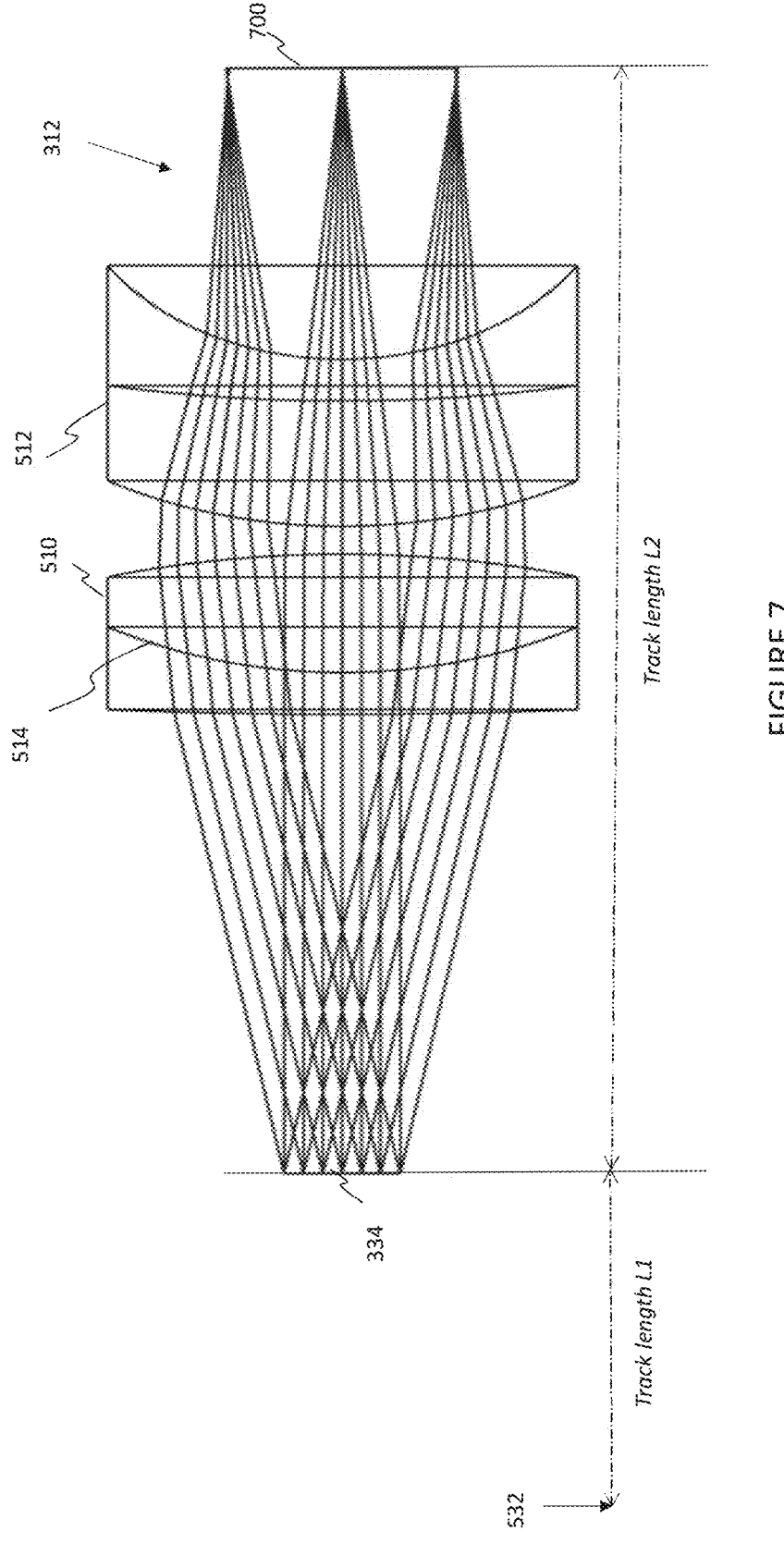
FIG. 7 shows schematically an example of an objective lens assembly for a MEMS scanning mirror assembly according to some embodiments of the present invention.

FIG. 7 shows an example of an OCT objective lens assembly 510, 512 in which an OCT beam 312 comprises light 312*a* at a range of wavelengths, for example, a range of wavelengths over a near-infrared part of the optical spectrum.

The OCT light is reflected from the reflective surface 334 of the scanning mirror assembly is focused first by the OCT objective lens 510, and then by field lens 512 before emerging as a telecentric beam 312*b*. A plurality of angle dependant telecentric beams $312b_{1,2,3}$ are shown in FIG. 7 focused on telecentric image plane 700, where each beam $312b_{1,2,3}$ represents where OCT beam 312*b* emerges at a particular scan angle, in other words, the telecentric exit beams $312b_1$, $312b_2$, $312b_3$ are sequential beams generated as a B-scan progresses.

The OCT beam 312 deflected from the mirror surface passes, in other words, through an OCT objective lens assembly 510 (which also comprises field lens 512 in some embodiments) designed so that all scan angles of the light 312*b* which forms the OCT beam 312, which are shown schematically as OCT exit beams $312b_1$, $312b_2$, and $312b_3$ in FIG. 7, exit normal to the intermediate image plane and are therefore telecentric.

In some embodiments, all air to glass interface surfaces such as 514 are convex to eliminate back reflection artefacts in the OCT image. The OCT objective lens assembly illustrated in FIG. 7 accordingly converts an angular input OCT scanning or probe beam 312*a* reflected from the MEMS scanning mirror surface 334 to a telecentric OCT scanning or probe beam 312*b* (or rather one of beams $312b_{1,2,3}$), which is then output into free-space in some embodiments. The telecentric OCT scanning or probe beam 312*b* is in some embodiments first focused using a focusing lens assembly 314 before it is lifted by folding mirror 316 towards beam splitter 318 as shown in FIGS. 3A and 3B. Alternatively, for example, the telecentric OCT scanning or probe beam 312*b* may pass in free-space directly to fold mirror 316 where it is reflected towards beam splitter 318.

The focusing lens assembly 314 acts as an optical interface for the telecentric OCT beam 312*b* to the microscope objective lens 210. The scanning mirror assembly could in some embodiments be used without a focusing lens assembly 314 but this would require the sample to be placed at the intermediate image plane 700 at which the telecentric OCT beam 312*b* is focused on when it emerges from the scanning mirror assembly. So in order to use the OCT scanner 206 without the focusing lens assembly, the sample would need to be somehow placed at the intermediate image plane 700. As shown in the OCT scanner example embodiment of FIGS. 3A, 3B and 4 for example, a lens is required in order to optically couple to the microscope objective lens 210 or alternatively, the objective lens 210 would need a much shorter focal length. Such a short focal length would not be conducive to surgical applications. However, in some embodiments of the present invention, the OCT scanner may omit a focusing lens assembly 314 if it is used for another type of application. For example, an OCT scanner 206 used for eye imaging, especially animal eye imaging, may not require a focusing lens 314.

In some example embodiments of the OCT scanner adapter 206 used in a microscope for surgery, the focusing lens assembly 314 is fixed and set at the proper back focal length to collimate and expand an incident telecentric OCT beam 312*b* to have a 10.6 mm collimated beam diameter at exit. As the OCT beam 312 is collimated on exiting the focusing assembly, it will focus at the focal plane of the microscope objective lens 310 as do the microscope optics.

Alternatively, by adjusting the location of the focusing lens assembly 314 relative to the intermediate image plane, the object distance is effectively being adjusted. This results in the focus location of the microscope objective lens 310 being changed accordingly for the OCT scan whereas the focus location remains fixed for the microscope optics.

A benefit of having a focusing lens assembly 314 in some embodiments of the OCT scanner, such as that of the example embodiments illustrated in FIGS. 3A, 3B and 4, is that if the surgeon moves an eyeball around during a surgical procedure, the OCT scanning system can keep the OCT focused at a designated anatomical feature using an appropriate autofocusing technique known in the art.

Another benefit of embodiments of the OCT scanner 206 which include a focusing lens assembly 314 is that it may be used in some situations even if the microscope optics are setup improperly by a user of the microscope 200, for example, by a surgeon or assistant. For example, if the microscope is non-parfocal, in other words if the oculars of the microscope are set to infinity for users with corrected eyesight via contacts or glasses, the microscope optics focus at the focal plane of the microscope objective lens. If the microscope oculars are not set to accommodate the refractive error of a microscope user's eyesight, then some users may move the whole microscope, for example using handles 204*a,b* as shown in FIGS. 2A, 2B, to adjust or accommodate the refractive error in their eyesight. However, this movement of the microscope optics results in a scanned tissue sample or other scanned object of interest (for example, the eye under surgery) no longer being positioned at the actual focal plane of the microscope objective lens 210 provided by the OCT scanner system 206. In other words, if the microscope is improperly used then the focus of the OCT beam 312 may need to be adjusted accordingly to compensate using a focusing lens assembly such as focusing lens assembly 314.

In some embodiments, the OCT objective lens 510 shown in FIG. 7 is a F2.7 Biconvex doublet lens. The objective lens 510 is coupled with a F19 Positive/Negative Meniscus doublet field lens 512 to turn the scanned collimated OCT beam 312 reflected from the surface 334 of the MEMS scanning mirror into an intermediate telecentric image plane shown in FIG. 7. The OCT returned light beam passes via the OCT field lens, then the OCT objective lens, and is then reflected again via the reflective surface 334 of the MEMS mirror along the OCT output arm 518 via the OCT collimating lens 516 (see also FIG. 5A) into an interferometer assembly (see the SD-OCT system 100 of FIG. 1).

In some embodiments, and as shown in the example embodiments of FIGS. 5A and 7, all air to glass interface surfaces such as surface 514 of the objective lens assembly 510 and the collimating lens 516 for the outward OCT beam 312 and returned OCT beam are convex to eliminate back reflection artefacts in the OCT image.

In some embodiments, the total track length L within the scanning mirror assembly optical block is the sum of the length L1 from the end face 530 of the optical fibre 308a at the optical fibre ferrule 532 to the reflective surface 334 of the scanning mirror and L2, the track length on from the surface 334 to the telecentric image plane 700 as shown in FIG. 5A. The total track length L=L1 plus L2 is preferably less than 40 mm.

In some embodiments, the optical path difference OPD at the sample being scanned has an OPD curvature greater than 100 mm.

In some embodiments, the OCT scanning or probe beam is telecentric to better than 0.03 degrees incident angle.

In some embodiments, focusing system 314 provides a mechanism for the OCT beam 312 to be adjusted so that the OCT focal plane can be controlled within a +30 mm range to align with the microscope optical channel focal plane.

In some embodiments, the MEMS OCT scanner has a lateral X-Y profile where X is less than 42 mm and Y is less than 35 mm as FIG. 5A shows schematically which allows the OCT scanner system housing to laterally fit within the lateral housing profile of the microscope optics carrier footprint. This is advantageous as it reduces obstructions in the sterile field for surgical applications. In some embodiments of the optical block implementing the scanning mirror assembly 310, the optical block dimensions are laterally a width, X, of around or equal to 40.6 mm and a depth, Y, of around or equal to 34.5 mm with a track length L of about 40 mm or less.

In some embodiments, the scanning mirror assembly further comprises an optical angular displacement measurement system 156 for determining the angle of tilt of the reflective surface relative to incident light comprising at least: a point light source, a collimator lens assembly for collimating light from the point light source to form a collimated mirror position measuring light beam which is incident at the reflective surface; and a position sensitive detector, wherein the reflective surface is configured to reflect the incident collimated light beam in the first optical plane to form a reflected position measuring light beam which travels towards the position sensitive detector.

In some embodiments of the scanning mirror assembly 310 described hereinabove and with reference to FIGS. 5A and 5B of the drawings, a closed loop control of the position of the reflective surface of the MEMS mirror is provided by the position sensitive detector being configured to provide angular displacement measurement information to a controller configured to control an angle of tilt of the reflective mirror surface relative to an illuminating light beam. In some embodiments, the closed loop control uses a PID feedback loop to adjust the drive voltages to the MEMS based on position and also dampens the ringing artefacts caused by fast directional changes.

Advantageously, in some embodiments, where the scanning mirror assembly comprises a scanning mirror assembly 310 in OCT scanning apparatus 206, an input beam comprises an OCT probe beam 312 which is reflected through optical components along an OCT probe beam arm of the scanning mirror assembly towards a sample or similar object of interest 116. The scanning mirror assembly 310 is configured to output the OCT probe beam 312 as a telecentric OCT probe beam towards a focal plane 154 at the sample and the optical path length from the optical source 102 of the OCT probe beam to the sample focal image plane 154 is configured to be equivalent to that followed by a reference OCT beam from the same OCT optical source 112 along a reference arm 103 of a connected interferometer OCT system 100 for 2D scanning of the sample area 116.

In some embodiments, the MEMS scanning mirror assembly 310 disclosed herein is provided as an optical block 310 in an OCT scanner adapter 206 for a surgical microscope 200 which forms part of a connected OCT system 100. Such an OCT scanner adapter 206 preferably has at least a lateral footprint X within or equal to the footprint of the surgical microscope housing and preferably has a length or depth footprint also within the footprint of the microscope. The OCT system 100 outputs an interference signal comprising the OCT scan data 146 to the image processor 148 of the OCT system 100. The image processor 148 then processes the interference signal 146, for example, it may perform a signal transform such as a Fourier transform which allows an OCT image showing internal scanned structures within the scanned area to be displayed in an image on a display 152.1 This image can be generated in real-time in some embodiments so as to guide to a surgeon and/or guide other parties on one or more suitable displays 152 in some embodiments.

In some embodiments of the OCT scanner adapter 206, the OCT scanner adapter 206 is configured to be fixed to the undercarriage of a housing of microscope optics of a surgical microscope, wherein the OCT scanner adapter 206 adds less than 40 mm, preferably less than 36 mm, to the stack height of the surgical microscope.

In some embodiments of the OCT scanner adapter 206, the OCT scanner adapter 206 is configured to be fixed to an undercarriage of the microscope optics housing and aligns an objective lens 114, 210 of the OCT scanner adapter 206 with an optical channel of the microscope optics when the lateral footprint of the housing 208 of the OCT scanner adapter 206 sits within the lateral footprint of the housing 202 of the surgical microscope 200.

In this manner, a surgical microscope, for example, a surgical microscope 200 such as that shown in FIGS. 2A and 2B comprising microscope optics, a housing 202 containing the microscope optics, and an OCT scanner adapter 206 can be provided according to the present invention where the OCT scanner adapter 206 includes a scanning mirror assembly according to the present invention, for example, such as that shown by way of example in FIGS. 5A and 3B. The OCT scanner adapter 206 may be configured to output image data which is later input into an image processor of an OCT system such as the OCT system shown in FIG. 1.

The image processor 148 shown in the SD-OCT system 100 of FIG. 1 is configured to receive OCT scan image data output via the spectrometer 136. Any suitable apparatus may be used as a platform for the image processor 148. In some embodiments, the apparatus may comprises a general computer system on which image processing algorithms are executed using one or more processor(s) or processing circuitry, see for example FIG. 12 described later below. The image data output by the spectrometer 136 is subjected to at least a Fourier transform by the image processing system 148 and the output of the image processing system 148 may be further processed, for example, to dewarp the Fourier transformed OCT scan images as shown schematically in FIG. 1.

Figure 8B:
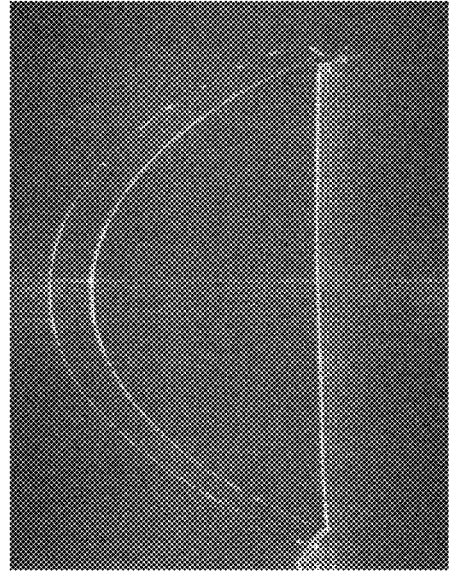
FIG. 8B shows the OCT image of FIG. 8A without the CCR image data.
Figure 8A:
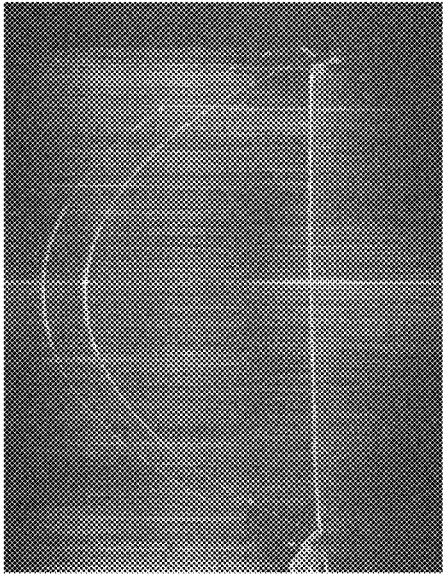
FIG. 8A shows an example of a OCT image of a contact lens and layered phantom CCR image data.

FIGS. 8A and 8B show respectively an OCT image which may, for example, be generated using an embodiment of the SD-OCT system 100 of FIG. 1, for example, by using an embodiment of the OCT scanner attached as an accessory to a surgical microscope 200 such as that shown schematically in FIGS. 2A and 2B. In some embodiments, the OCT scanner adapter 206 of FIG. 2 may comprises an OCT scanner adapter including the optical components described in more detail in FIGS. 3A, 3B, 4, 5A, 5B, 6, and 7.

FIG. 8A shows an example of a typical OCT image of a contact lens and layered tape phantom. The complex conjugate, CC, image artefacts appears as highly blurred streaks in the OCT scan image due to dispersion effects. FIG. 8B shows the results of processing the image using an image processor such as that shown as image processor 148 in FIG. 1 which is configured to implement an example embodiment of a computer-implemented image processing method 900 for removing complex conjugate image data from image data in real-time using dispersion according to the present invention.

The OCT image in FIG. 8B has had the removal of complex conjugate image artefacts. The OCT image shown in FIG. 8B has been derived by processing the OCT image data output, for example, from an OCT scanner adapter 206 such as that shown in FIG. 2A, using an embodiment of an iterative image processing algorithm to remove complex conjugate artefacts according to the present invention, and the resulting image in FIG. 8B shows similar image quality to that shown in FIG. 8A but with complex conjugate image artefacts removed.

The disclosed embodiments of the image processing algorithm seek to improve on known techniques to prevent complex conjugate artefacts remaining in OCT scan images generated from spectral data output by a SC-OCT system such as that shown in FIG. 1. Only the real-part of the spectrum is detected by the spectrometer 136 in the SD-OCT system 100 shown in FIG. 1 and as a result, to avoid complex conjugate mirror terms overlapping with sample structures in an OCT image only half the available depth range can be used for generating the OCT scan images of a sample unless there is some removal of CC mirror artefacts from the OCT image before this is displayed.

To improve the removal of CC image artefacts from the OCT scan images at a speed which allows live OCT scan images to be generated, example embodiments of the present invention also comprise a computer-implemented method of using dispersion to remove CC image artefacts from the OCT scan images.

It is know that a dispersion mismatch between the probe arm 105 and reference arm 103 in an OCT interferometer system 100 will cause a wavelength dependent phase shift in the spectral interference fringes between the combined light returned from the reference and probe arms 103, 105. Various techniques are also known in the art which use the dispersion mismatch between the probe and reference arms in spectral domain, SD, OCT systems to compensate for this phase shift.

Some embodiments of the present invention can improve such known techniques by providing an algorithm which iteratively suppresses complex conjugate artefacts and consequentially increases the imaging range in OCT scans, for example, OCT scans generated by the SD OCT system 100 of FIG. 1. The disclosed embodiments of the algorithm adjust the threshold above which frequency components from each artefact are removed in each iteration, which enables more CCR artefacts to be suppressed in each iteration, and allows a cleaner OCT scan to be generated more quickly.

Some embodiments of the algorithm according to the present invention allow real-time OCT image data such as that output from the spectrometer 136 in FIG. 1 to be numerically processed to suppress CCR artefacts in the resulting live OCT scan images. Each iteration of the algorithm which acts on an OCT scan detects multiple signal frequency components above a frequency detection threshold adjusted for that iteration of the algorithm. In other words, multiple iterations of the algorithm are performed to remove CCR artefacts in the OCT scan data for each OCT A-scan, with the frequency detection threshold being adjusted in each iteration for that OCT A-scan. This allows a cleaner, more stable OCT scan image to be obtained more quickly to generate OCT B and C scans, and may preserve more tomograph data than an algorithm which fixes the detection threshold for each scan as well as improve the time taken to generate each cleaner OCT scan image. In some embodiments, the computer-implemented image processing method for removing complex conjugate image data from OCT image data can be performed in real-time as the algorithm is relatively fast, allowing B scan images to be generated in 30 milliseconds or less.

In some embodiments, the image processing acts on a live stream of OCT scan images and is sufficiently fast to reduce the delay in presenting the CCR cleaned live stream images to less than 60 ms, but this may be as low as 30 ms in some embodiments.

Figure 9:
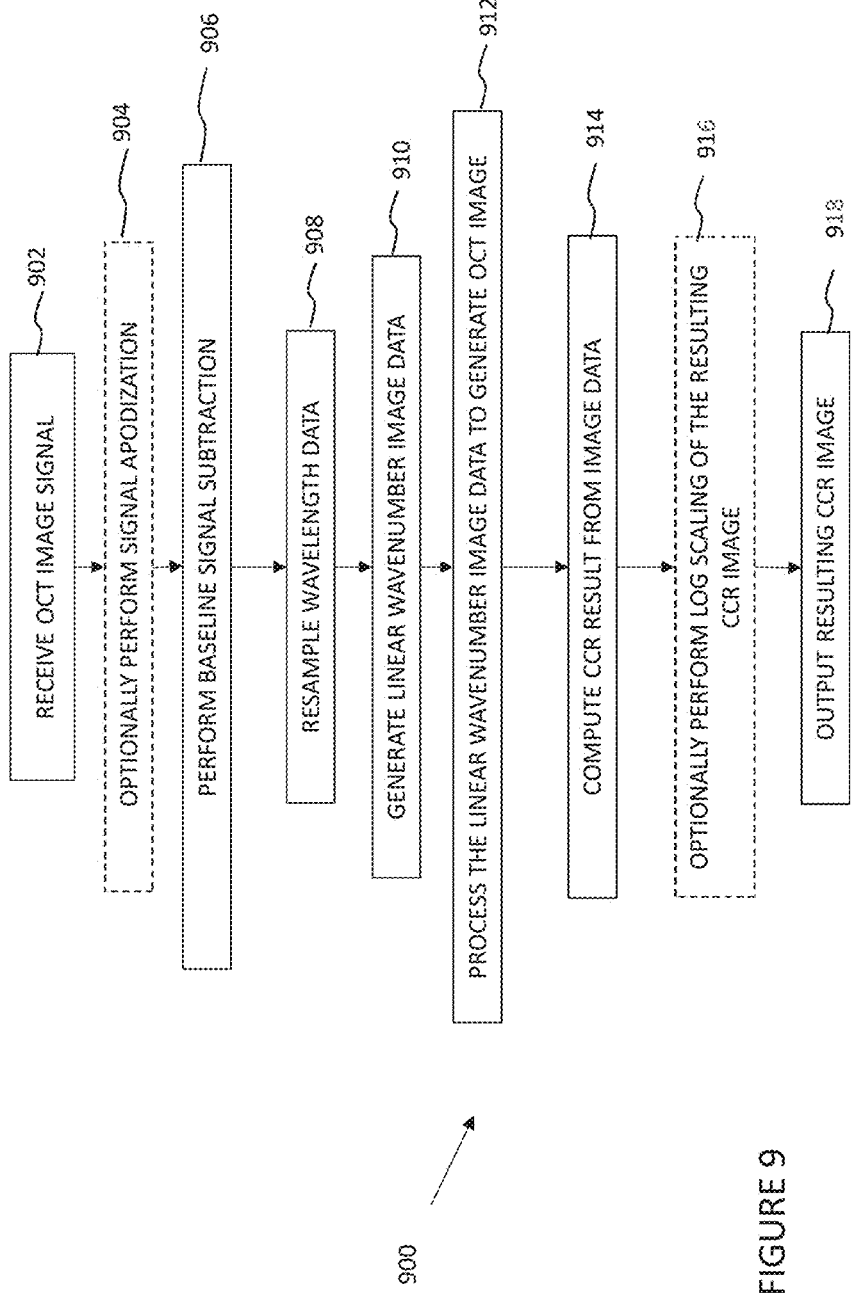
FIG. 9 shows an example of an image processing method for removing complex conjugate image data from image data according to some embodiments of the present invention.

FIG. 9 shows an example embodiment of the computer-implemented image processing method 900 for removing complex conjugate image data from image data comprising an OCT scan, the method 900 comprising at least the following at the image processing apparatus 148: receiving an image signal comprising image data including complex conjugate image data 902, performing a baseline signal subtraction 906, resampling wavelength data to generate linear wavenumber image data (908, 910), processing the linear wavenumber image data using an algorithm according to an embodiment of the present invention to generate a complex conjugate resolved, CCR, image result, in other words, to remove complex conjugate artefacts to below a threshold level from the OCT scan image. At least one iteration, and preferably two or more, of the image processing algorithm is performed in 912 on each OCT scan to generate image data comprising a complex conjugate resolved image in 914. The CCR image data may comprise phase and/or magnitude data and in some embodiments log-scaling 916 of the OCT scan image data may be performed to allow for a more visually meaningful/impactful representation of the OCT scan over a wider range of frequencies when the CCR scan image data is output to a suitable display such as display 150 in FIG. 1.

The In some embodiments, the method 900 may be performed in real time, for example, OCT scan images may be generated in less than 30 milliseconds using some embodiments of the present invention. The computed image data from the CCR results which are displayed may comprise magnitude and/or phase data of the CCR resulting image in some embodiments. In other words, while the magnitude data is generally used in OCT, it is possible to use the phase data, which is also present in the result from CCR processing or to use a synthesis of the two (magnitude and phase) when generating the image data from the CCR result in some embodiments.

In some embodiments, the linear wavenumber image data used to generate a complex conjugate resolution result may be generated by performing a plurality of iterations of a complex conjugate resolved, CCR, image processing algorithm according to an embodiment of the present invention, for example, of the CCR algorithm shown in FIG. 10 or 11. FIG. 11 shows more detail of two iterations of the algorithm for simplicity, in which a real OCT scan signal, R0, 1102 comprising a current signal amplitude over time is input to the image processing apparatus 148.

Figure 11A:
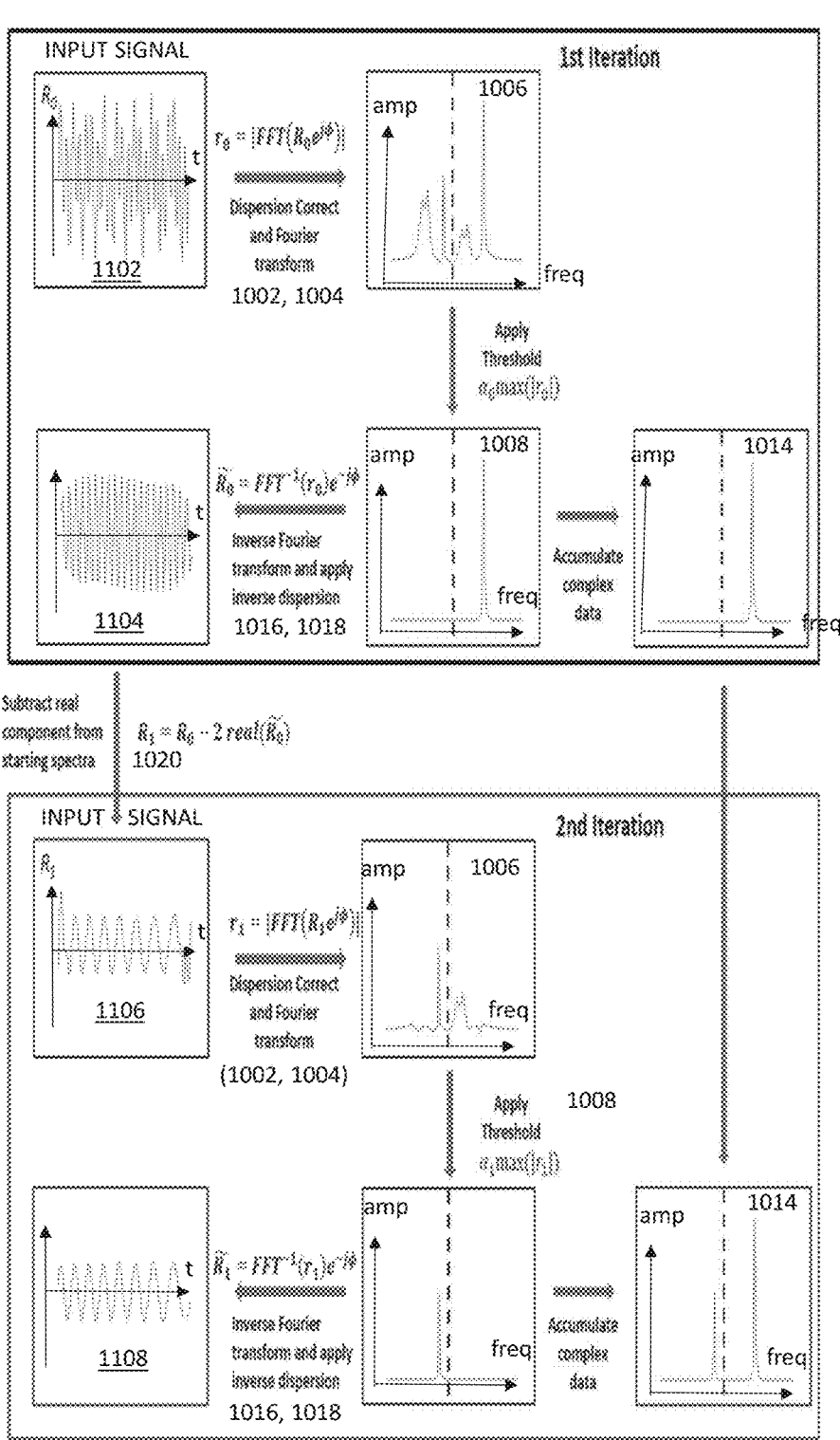
FIGS. 11A and 11B show schematically more details of two examples of the algorithm of FIG. 10.
Figure 11B:
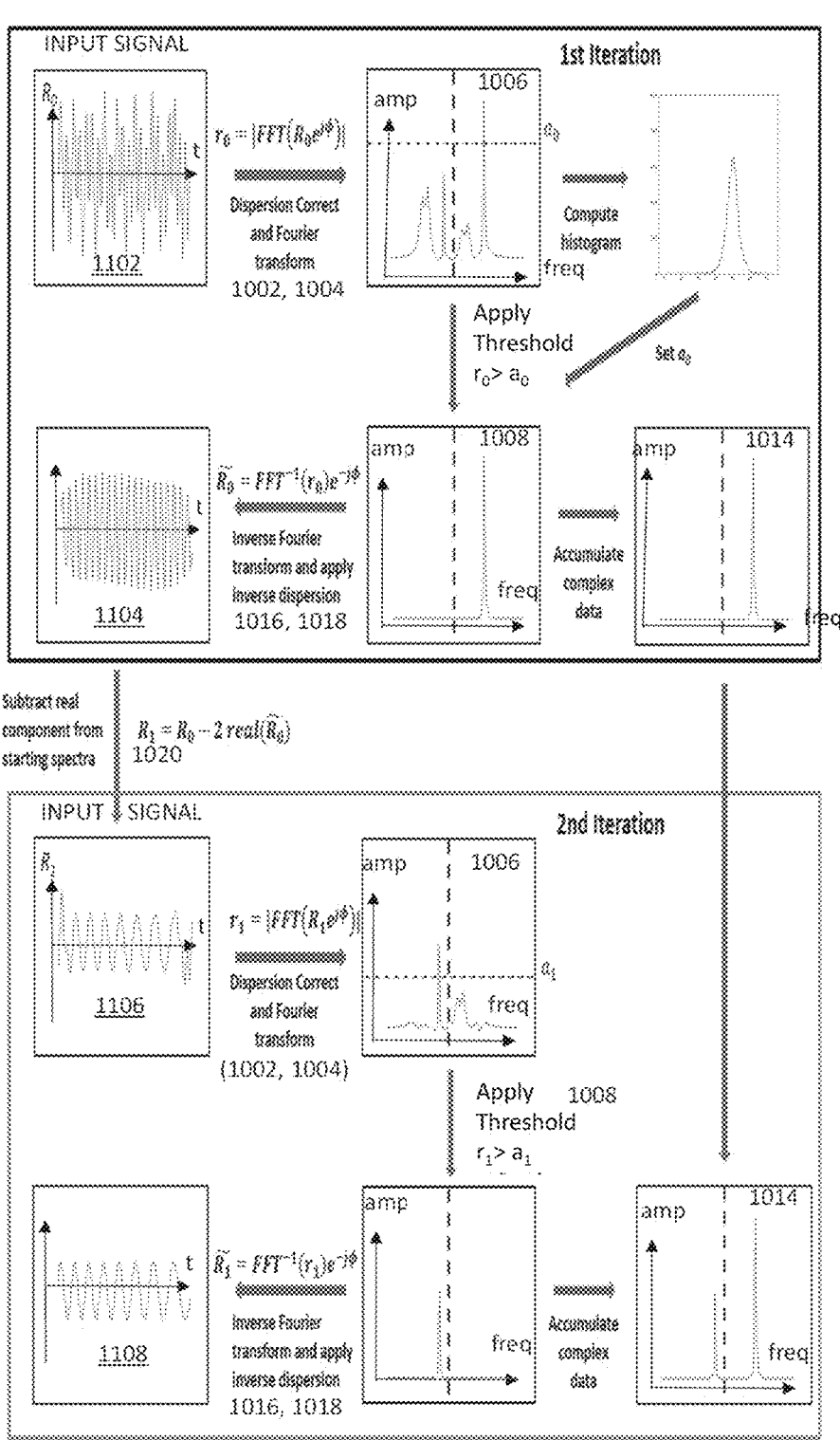

In order to generate CCR OCT images, in other words OCT scan images which are free from CCR artefacts from the real OCT scan signal output by the SD-scanning system 100 of FIG. 1 for example, some embodiments of the present invention perform an OCT processing procedure comprising an embodiment of method 900 comprising acquiring an OCT signal, performing signal apodization (optional), performing adaptive DC, direct current, subtraction, to remove a baseline current signal from the acquired OCT scan current signal output by the SD-OCT system 100, resampling wavelength data to be linear in wavenumber, and executing a CCR image processing algorithm 1000 according to and embodiment of the present invention, for example an algorithm 1000 such as that shown schematically in FIGS. 10 and 11A and 11B.

Turning briefly to FIG. 11A the image processing apparatus 148 processes the input signal 1102 to correct for dispersion and applies a suitable transform such as a Fourier or Fast Fourier transform or similar technique to generate frequency-amplitude information. Next, by applying a suitable detection threshold for the OCT frequency scan data, it is possible to selectively store only signal frequencies which have an amplitude above a threshold, which is schematically shown in FIG. 11 by "Apply Threshold aomax ($|r_0$)". This cleans the frequency signals (see 1008 in FIGS. 10 and 11) and enable the extraction of complex frequency signal data for generating the OCT scan image for storage in 1014. An inverse transform and inverse dispersion is then performed (see 1016, 1018 in FIG. 10) which generates a much cleaner signal in 1104 than originally input in 1102.

The real component of the cleaner signal is subtracted from the starting spectra in 1020 and the algorithm 1000 is then repeated for a second iteration as shown in FIG. 11A.

FIG. 11B shows how the initial threshold may be determined using a histogram of the frequency distribution of the Fourier transform and the threshold is then dynamically adjusted in each subsequent iteration of the algorithm in the manner shown in FIG. 11A.

Returning to FIG. 10, a flow-chart is shown to schematically illustrate a method implementing an example embodiment of algorithm 1000. As illustrated in FIG. 10, the computer-implemented method can be described in pseudo code as comprising:

apply dispersion correction to resampled wavelength data of the acquired OCT signal 1002;

compute a signal transform, for example, a Fast Fourier transform (FFT), of the dispersion corrected signal 1004;

compute magnitude of FFT result 1006;

compute an adaptive storage threshold 1008 for a current iteration of the algorithm 1000 (for example, based on an empirically derived formula) to determine if the FFT result is to be stored;

store values of FFT result in 1014 if the result of 1008 is determined to have a magnitude which exceeds the adaptive storage threshold 1010;

set FFT result to zero if magnitude does not exceed threshold 1012;

compute inverse FFT of stored values 1016;

apply inverse dispersion correction 1018; and extract real component and subtract result from starting spectrum 1020.

Some embodiments of algorithm 1000 may use an empirically derived or other type of formula to compute the variable threshold which for storing the FFT result. However, some other embodiments may derived the variable storage threshold differently. For example, the variable storage threshold may be derived from dynamic image properties such as the image intensity distribution or other image properties in some embodiments.

Although the embodiments shown in the drawings and described herein refer to a Fast Fourier Transform of the input signal from the spectrometer, it will be apparent to anyone of ordinary skill in the art that another suitable signal transform may be used instead in other embodiments of the present invention.

By repeating the above steps of the algorithm a number of times, for example, at least twice more, so that the algorithm is iterated at least a total of three times, it is possible to produce OCT image in which there may be no perceptible CC image data in some embodiments, for example, as shown in FIG. 11, after the Inverse FT and an inverse dispersion has been applied, a much clean signal is shown in 1110

The algorithm further comprises assessing if the real component of the signal transform complex-valued image is free from any complex conjugate image artefacts in 1022. If not, then another iteration is performed. If the signal transform resulting image is free from conjugate image effects the algorithm ends in 1024.

Optionally, however, instead of performing another iteration of the algorithm, if there is any remaining iterative residue signal in the last iteration, in other words, if there is any residual CC image data this can be added to the final output signal in some embodiments in 1026.

The computed CCR image may be computed to provide magnitude and/or phase data for of the CCR resulting image in some embodiments.

The method may 900 may also comprises in some embodiments performing log scaling of the resulting CCR image to help visualise the data which may have a range that spans several orders of magnitude.

Some embodiments of the algorithm shown in FIG. 10 comprise: applying a dispersion correction 1002; performing a fast Fourier transform, FFT, or similar complex signal transform on linear wavenumber image signal data 1004, computing the magnitude of a result of performing the FFT on the linear wavenumber image signal data 1006; computing a variable threshold 1008 for each iteration of the algorithm, for each FFT result value having a magnitude which does not match a condition for storing based on the threshold for the current iteration, setting the FFT result to zero 1012, for each FFT result value having a magnitude which matches the condition for storing based the threshold for the current iteration, storing the FFT result 1014, computing the inverse FFT for all stored FFT results 1016, applying an inverse dispersion correction 1018; and extracting the real image component and subtracting the result from starting image spectrum data 1020.

In some embodiments, a condition for storing the FFT result comprises matching or exceeding the computed adaptive storage threshold, in other words matching the current iteration's threshold for storing an FFT result or exceeding the computed storage threshold which has been set for that iteration of the algorithm.

By performing the same algorithm for image data generated by each A scan for example that the OCT scanner system 100 generates using an OCT scanning mirror system such as that shown in the OCT scanner adapter 206OCT scanner adapter 206 of FIGS. 2A and 2B, and then stacking the A scans, B scan image data can be generated which is free or almost free of any perceptible CC image data in some embodiments. This in turn may allow volumetric images to be obtained which are free or almost free of CC image artefacts.

Some embodiments of the method 900 iterate the CCR algorithm a number of times to extract a real image component and subtract the CCR result of each iteration from the starting image spectrum data for that iteration until the stored FFT result values comprise a complex-valued image free from any noticeably conjugate image artefacts in 1022.

In some embodiments of the method 900 which uses the CCR algorithm 1000, the algorithm comprises performing signal apodization 904. The signal apodization may use a processing parameter set by a user to condition the input OCT signal to have zero values at each end. This helps reduce possible edge artefacts when performing the FFT in subsequent steps.

In some embodiments, the computed variable storage threshold for the OCT FFT result is based on an empirically derived formula.

Alternatively, or in addition, in some embodiments, the computed variable storage threshold for storing the OCT FFT result may comprise in the first iteration an adaptive storage threshold which is adapted based on dynamic image properties such as intensity distribution or other properties for the current image being processed. For example, a histogram may be used in some example embodiments to set the initial threshold. This may reduce the need for recalibration of the scanning system.

In some embodiments of the method 900, the method is implemented in hardware, for example, by using a graphics processing unit capable of processing an image in less than 30 milliseconds.

In some embodiments, the image data is OCT image data, for example, OCT image data obtained using an OCT scanning mirror adapter for a microscope such as that shown in FIGS. 2A and 2B described herein and the method further comprises: outputting an OCT image (920) based on the received OCT image data with the complex conjugate image data removed (918). The output OCT image (922) may be displayed ideally with no perceivable complex conjugate image in some embodiments.

FIGS. 11A and 11B show schematically examples of the iterative CCR algorithm of FIG. 10 in which the dashed lines indicate the zero frequency location on the post-FFT graphs.

FIG. 11A shows a real image signal $r_0$ having its dispersion corrected and then being Fourier transformed, for example, using a fast Fourier transform, in a first iteration of the algorithm. The variable storage threshold in the first iteration a0max(|r0|) in FIG. 11A and is given by is r0>a0 in FIG. 11B described later below for the result being stored is then applied. Here, one embodiment of the threshold calculation is shown where the threshold varies per iteration and is based on a fraction of the maximum image value in each iteration. However, other embodiments may use a predetermined threshold or may use other image properties such as the intensity distribution or other signal properties in the current image to determine an appropriate threshold dynamically. If the result is above the threshold for storage, the complex conjugate image resolved data (shown as accumulate complex data in FIGS. 11A and 11B) is accumulated in a suitable storage media or memory. If not then the CC image data is discarded.

Next, an inverse Fourier transform such as a fast Fourier transform is performed and an inverse dispersion is applied to the data and the real components are subtracted from the starting spectra. The result is a new input signal to the algorithm, R1, on which dispersion correction is performed and a Fourier transform applied. The result is then compared to the storage threshold which is variable for each iteration of the algorithm in some embodiments. If the result is above the threshold then the complex conjugate resolved data is added to the stored conjugate resolved data found in the first iteration. If not, the data is not stored. After the comparison, the inverse Fourier transform and inverse dispersion correction is applied and the real component can be subtracted from the starting spectra for that iteration. The next iteration, shown in FIGS. 11A and 11B as the $2^{nd}$ iteration then begins with a new threshold for storing the spectra shown a1max (|r1|) in FIG. 11A and as r1>a1 in FIG. 11b.

The embodiment of the algorithm of FIG. 10 shown schematically in FIG. 11A differs in FIG. 11B. The first iteration of the algorithm according to the embodiment shown in FIG. 11B sets the first threshold for storing the complex data based on a histogram of the frequencies obtained in 1006 from the Fourier transform of the input signal. The thresholds $a_0$ and an can be obtained, based on histogram of light intensity vs. frequency for example of the scan image being processed, by:

$$a_n = a_0 - n * (a_0 - a_N) / N$$

where $$a_0 = \begin{cases} a_{min}, & Q_4 < Q_{tmin} \\ a_{max} - (Q_{tmax} - Q_4)da, & Q_{tmin} < Q_4 < Q_{tmax} \\ a_{max}, & Q_4 > Q_{tmax} \end{cases}$$

and $$da = \frac{(a_{max} - a_{min})}{(Q_{tmax} - Q_{tmin})}$$

and where $a_{min}$=Min starting threshold
$a_{max}$=Max starting threshold
$Q_N$=Final iterative threshold
$Q_{tmin}$=Min Q4 threshold
$Q_{tmax}$=Max Q4 threshold
$Q_4$=Upper quartile count This allows the processing parameters to be based on properties of the original image in the first iteration. This allows optimally chosen threshold levels to be applied before the iterative CCR processing is started. In other words, the optimal threshold for the first iteration is selected in advance based on the optical properties of that image. This dynamic adjustment is advantageous as it allows different scan illumination settings to be taken into account automatically.

In some embodiments, the method 900 and the algorithm are executed by an image processing unit 148 of an optical coherence tomography, OCT, apparatus configured to perform real-time OCT such as the spectral-domain OCT system 100 shown in FIG. 1. The system 100 may comprise in some embodiments, an illumination arm 101 including at least an optical light source 103, a reference arm 103, an OCT probe arm 105 via which an OCT probe beam is emitted; and a data arm 107 via which returned OCT light passes to be processed by an image processor 148, for example, an image processor 148 configured to perform an embodiment of method 900.

In some embodiments of the OCT apparatus 100, dispersion between the reference arm 103 and probe arm 105 is configured to be above a minimum design threshold for separation of a complex conjugate image from a OCT image output for display. A dispersive component can be provided in one of the reference arm or the probe arm, or even both, but this may negate the difference in dispersion between the reference and probe arms and so is less desirable.

In some embodiments, at least one dispersive component in the reference arm comprises a dispersive optical fibre.

In some embodiments, at least one dispersive component in the reference arm comprises, a dispersive glass window. The physical path length of either the reference arm is shortened to compensate for the dispersive window or the physical path length of an opposite OCT probe arm is lengthened to compensate for the dispersive window.

In some embodiments, at least one dispersive component in the reference arm comprises one or more dispersive retroreflectors and the amount of dispersion is determined by the optical path length through the dispersive retroreflectors.

If the OCT system has at least one dispersive optical component provided in the OCT probe arm (105), this may also comprise a dispersive optical fibre. Alternatively or instead, dispersion may be introduced in the probe arm using a dispersive dichroic mirror and/or a dispersive OCT objective lens 510 and/or a dispersive OCT field lens 512 in some embodiments.

Figure 12:
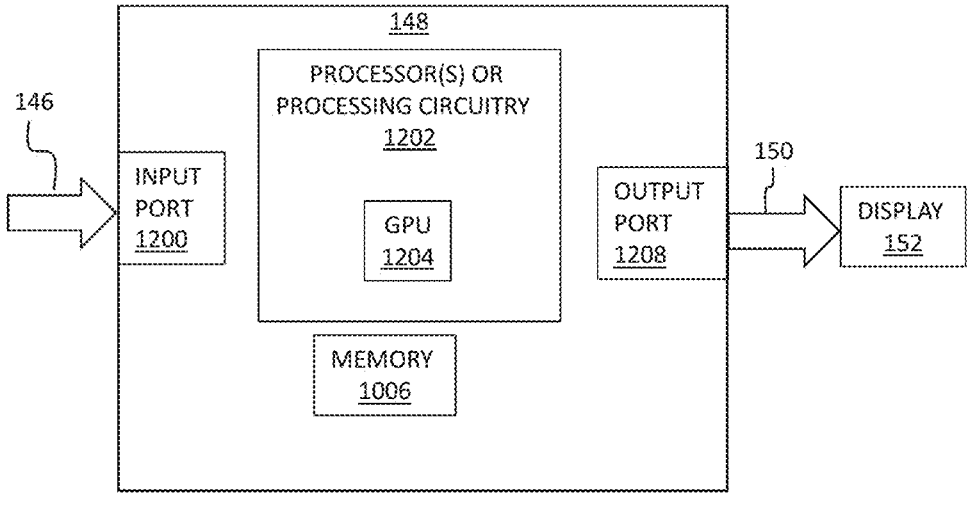
FIG. 12 shows schematically an image processing apparatus configured to implement a method for removing CCR image data from an OCT image according to some embodiments of the present invention.

FIG. 12 shows schematically an image processor 148 according to an embodiment of the present invention which comprises an input port for receiving or acquiring OCT image data such as the image data 146 shown in FIG. 1 which is output via the interferometer coupler 104 of the OCT system 100. The image processor 148 shown in FIG. 12 comprises an input port 1200, one or more processor(s) or processing circuitry (1202) comprising a graphics processing unit 1204 for processing the input OCT signal data by performing method 900 and/or executing the algorithm 1000. The resulting complex conjugate free image data is then output via output port 1208 and the output data 150 may then be displayed on suitable display apparatus. The image processing unit 148 shown in FIG. 12 also comprises suitable memory 1006 for storing image data.

The method 900 may be implemented in some embodiments using a computer program product comprising computer code which when loaded from memory 1006 and executed on one or more processors or processing circuitry 1202, 1205 of an apparatus such as the image processing apparatus 148 show in FIG. 12 is configured to cause the apparatus to implement the method 900.

Examples Using Bulk Glass Differential Dispersion in the interferometer

Some embodiments of the present invention use a bulk glass differential dispersion interferometer design to support extended depth imaging in optical coherence tomography. These embodiments may be used in conjunction with the computational methods described above with reference to FIGS. 8A, 8B, 9, 10, 11A, 11B, 13, and 14 of the accompanying drawings. The interferometer designs disclosed herein may be used in some embodiments in the OCT scanning system 100 of FIG. 1. The OCT scanning system of FIG. 1 may comprise an OCT scanner adapter 206 for a surgical microscope in some embodiments which incorporate features described according to the embodiments disclosed herein and/or as illustrated in FIG. 2A, 2B, 3A, 3B, 4, 5A, 5B, 6, or 7.

In OCT, CCR requires a minimum amount of differential dispersion to be present between the sample path and reference path of the system interferometer.

In the case of OCT systems where the light source consists of a broadband, short coherence length yet spatially coherent super luminescence diode, the dispersion in the system is a result of chromatic or wavelength dependent velocity differences of the light passing through the optical paths of the system and is termed the Group Velocity Dispersion or GVD which is quantitatively defined by RP Photonics, as the derivative of the inverse group velocity with respect to angular frequency as represented in the following equation:

$$GVD(\lambda) = \frac{\lambda^3}{2\pi c^2} \frac{\partial^2 n(\lambda)}{\partial \lambda^2}$$

where:
c=vacuum velocity of light
λ=wavelength
n=index of refraction

The group velocity dispersion (GVD) can also be defined as the group delay dispersion (GDD) per unit length.

The chromatic dispersion can be calculated from the solid-state material properties of the optical glasses that comprise the OCT system via one of three industry standard dispersion formulae given below:

Sellmeier Dispersion Formula:

$$n^2(\lambda) = 1 + \frac{B_1 \lambda^2}{\lambda^2 - C_1} + \frac{B_2 \lambda^2}{\lambda^2 - C_2} + \frac{B_3 \lambda^2}{\lambda^2 - C_3}$$

Schott Dispersion Formula:

$$n^2 = a_0 + a_1 \lambda^2 + a_2 \lambda^{-2} + a_3 \lambda^{-4} + a_4 \lambda^{-6} + a_5 \lambda^{-8}$$

Conrady Dispersion Formula:

$$n\lambda = n_0 + A/\lambda + B/(\lambda^{3.5})$$

The specific coefficients of each equation are supplied by the glass manufacturer from the measured glass melt properties data.

The high dispersion required for the Complex Conjugate Resolution is anti-thetical to typical optical designs across the visible spectrum as most transparent materials strive for low second-order dispersion resulting in flat dispersion curve in the NIR spectral range. For CCR candidate materials the derivative of the dispersion curve in the NIR spectral range should be similar to that of optical glasses in the short or ultra-violet wavelength range. Such a material would be transparent at IR wavelengths with high dispersion at NIR wavelengths meaning the material would be used outside the normal design range and as such dispersion data is not compiled by the glass manufactures and therefore, must be independently calculated.

Embodiments of the present invention can use, instead of optical design glasses (for example, the lens used in the embodiments of the OCT scanner adapter 206 and/or the OCT system 100 disclosed herein), filter glasses in the IR wavelengths to improve the ability of the image processing system 148 for a SD-OCT system 100 to better remove complex conjugate artefacts and generate complex conjugate resolved images with a better resolution and extended depth range.

FIG. 14 of the accompanying drawings shows an example of a method of determining a required group velocity delay, GVD, for the filter glass materials according to the disclosed embodiments using Sellmeier coefficients. A similar method may be used where a different dispersion formula is used in other embodiments to determine a desired GVD.

In FIG. 14, the Sellmeier dispersion equation for the target glass index of refraction as a function of wavelength is first solved in S1402, the coefficient of the GVD i.e. ($\lambda^3/2\pi c^2$)

at 850 nm). These were considered suitable for OCT light centred on 850 nm with a bandwidth of 100 nm or thereabouts, this is not the wavelength of light which will be used in some embodiments of the present invention, which uses light in the near-infrared spectrum.

Examples of parameter values for glass and fibre characteristics are shown below in table 1:

TABLE 1

Example parameters for highly dispersive glass
PARAMETERS FOR DISPERSIVE GLASS/DISPERSIVE FIBRE

| GLASS | REFRACTIVE INDEX (N) @850 nm | GROUP INDEX (NG) @850 nm | GVD (fs$^2$/mm) | Transparency (% T @850 nm) | Manufacturer |
|---|---|---|---|---|---|
| BK7 | 1.5098 | 1.5249 | 40.13 | 99.8 | SCHOTT |
| N-ZK7 | 1.5013 | 1.5167 | 41.82 | 98.8 | SCHOTT |
| IRG27 | 2.5129 | 2.7268 | 1120.75 | 95.7 | SCHOTT_IRG |
| 630HP | 1.5040 | 1.5190 | 45100 | For short fibres, ~99.8 or better | COHERENT |
| 780HI | 1.4591 | 1.4711 | 38000 | For short fibres, ~99.8 or better | CORNING | where c=vacuum velocity of light, is then computed in S1404, the second derivative of the index vs wavelength i.e., $\delta^2 n/\delta\lambda^2$ is then computed in S1406, the GVD coefficient found in S1404 is then multiplied by the second derivative value found in S1406 to determine the GVD of the glass in S1408. The GVD computation of S1404-S1408 is then repeated for each 20 nm wavelength increment over the OCT light bandwidth, which is centered on 850 nm in some embodiments, and which may have a bandwidth range of 100 nm about that central wavelength in S1410. The average GVD over the bandwidth range covered by S1410 is then determined in S1412, and the group dispersion delay, GDD, is then determined in S1414 based on the average GVD value and the glass optical path length of the glass in the interferometer system.

Any suitable apparatus may be used to perform the method 1400, for example, the apparatus shown in FIG. 12 of the accompanying drawings.

From experimentation, an empirically determined GDD value between 31,000 (fs2) and 46,000 (fs2) was determined to give the best result for CCR.

Figure 16:
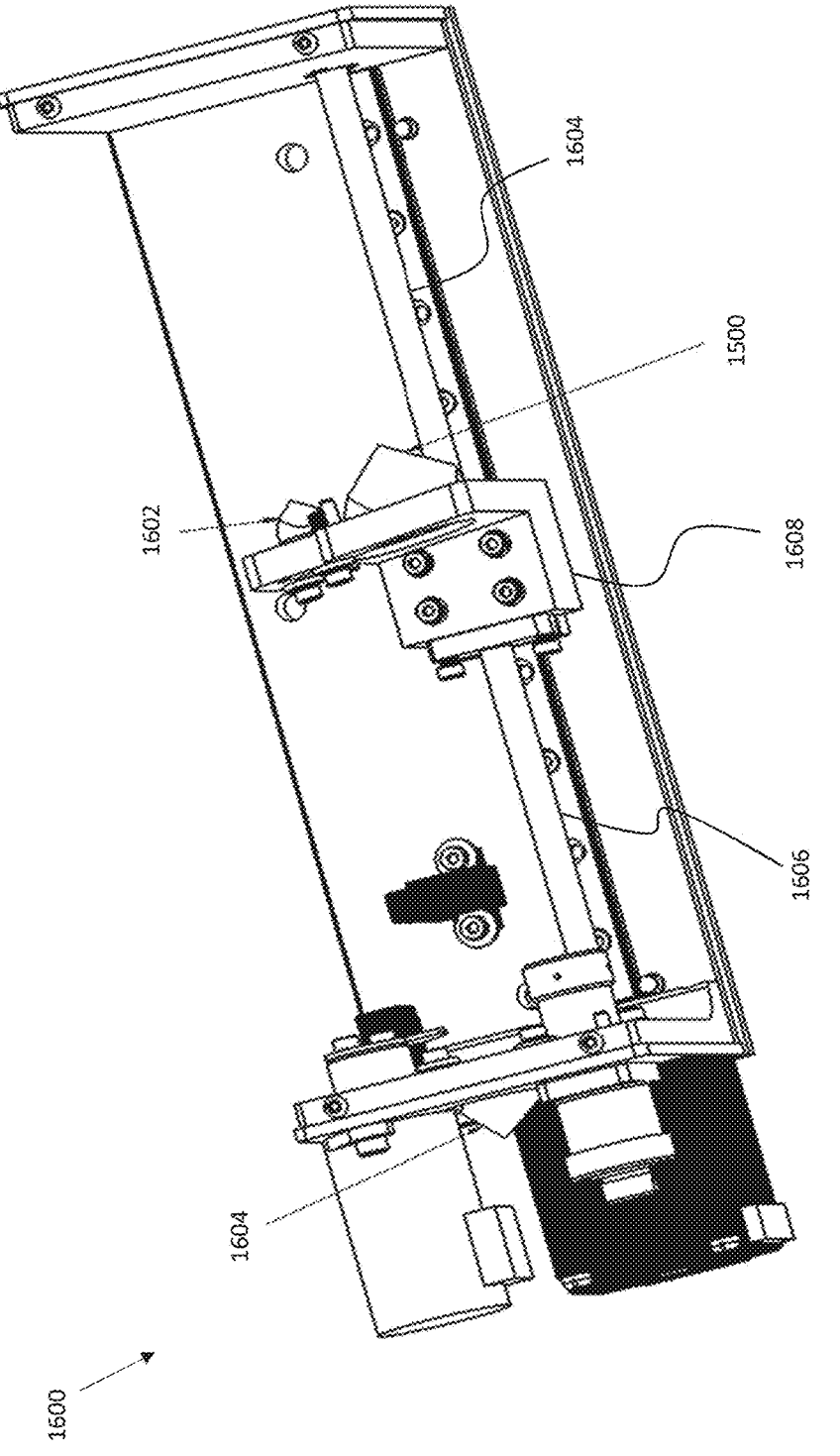
FIG. 16 shows an example of a reference arm assembly according some embodiments of the present invention.

Some embodiments of the present invention replace one of the existing optical components of the path length adjustable OCT reference assembly shown as reference arm 103 in the OCT system 100 of FIG. 1 to provide a retroreflector system such as is shown in FIG. 16 of the drawings (described later below).

The reference assembly in reference arm 103 comprises in some embodiments of the present invention a retroreflector with a longest retroreflector optical path length of 32.4 mm.

Based on a median GDD value of roughly 38,500 (fs$^2$) and dividing by the optical path length of 32.4 mm, this means that a target GVD value for the filter glass material of 1,190 (fs$^2$/mm) would be required in the retroreflector design according to an embodiment of the present invention.

The method 1400 outlined above was used to determine a set of ideal parameters for the glass material for OCT light having a central wavelength of 850 nm, for example, a set of parameters comprising at least a glass refractive index n at 850 nm, a group refractive index ng for light at 850 nm, a GVD, and a transparency (expressed as a % transparency The values in Table 1 are by way of example. They are illustrative of suitable optical characteristics for hybrid fibres or highly dispersive fibre which may be used in various example embodiments of an interferometer system where the reference arm optical fibre length is 6 m for a nominal centre wavelength of 850 nm.

The OCT beam spectrum preferably lies in the infra-red spectrum from around 700 nm to 1000 μm, and may be confined to the near-infra red spectrum 750 nm to 3 μm in some embodiments.

Here the group refractive index (ng) is defined by the following, where A is the wavelength of the OCT light:

$$n_g = \frac{c}{v_g} = n(\lambda) - \lambda\frac{\partial n(\lambda)}{\partial \lambda}$$

The only glass material that had a sufficient GVD and acceptable light absorption properties across the OCT bandwidth with these properties was a Schott glass designated as IRG27 (see the bottom row of the table above). Based on the calculations, the GVD of IRG27 glass was equal to 1120.75 (fs$^2$/mm) and combined with the optical path length of 32.4 mm results in a total GDD value of 36,312 (fs$^2$) which is below the target median value but above the minimum acceptable GDD value.

Figures 15A, 15B:
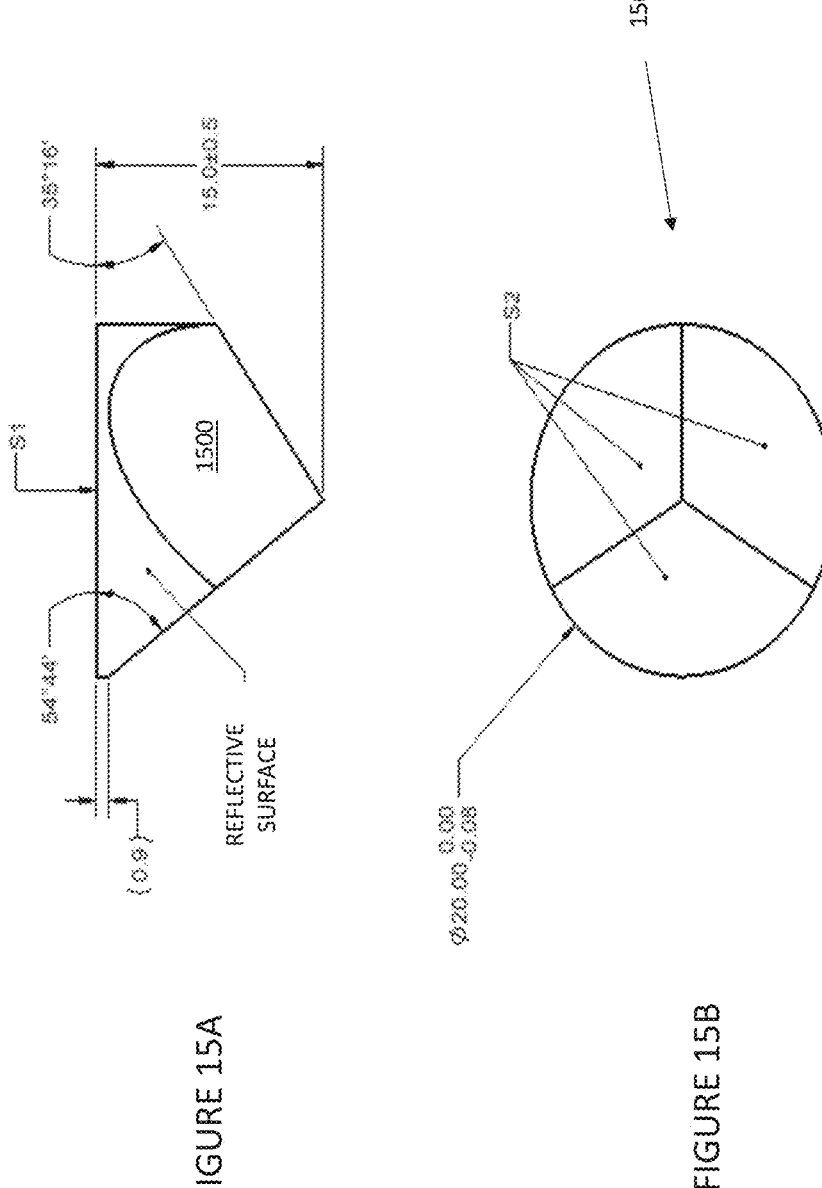
FIGS. 15A and 15B show schematically different views of a retroreflector according some embodiments of the present invention.

FIGS. 15A and 15B shows schematically an example physical or mechanical design for the a retroreflector, such as a retroreflector made from IRG27 glass or having equivalent optical characteristics such the same or similar refractive index, group index, GVD, and optical transparency.

FIG. 15A shows a side-view of the retroreflector which has a conical design comprising three different reflective surfaces S2, as shown in the plan view of FIG. 15B. FIG. 15A shows an example of the dimensions of the retroreflector reflective surfaces S2 relative to the hypothetical surface S1 which would be the "base" of the cone (see also the element 1500 labelled in FIG. 16). The angles and dimensions (shown in mm) are by way of example only as would be appreciated by someone of ordinary skill in the art.

FIG. 16 shows an example embodiment of an automated path length opto-mechanical assembly 1600 which comprises an embodiment of a high dispersion retroreflector 1500 according to an embodiment of the present invention. Some embodiments of the automated path length opto-mechanical assembly 1600 are configured for use in a reference arm 103 of an OCT system such as the OCT system 100 shown in FIG. 1 or any of the embodiments of the OCT system 100 disclosed herein.

In FIG. 16, the assembly 1600 includes an adjustable glass retroreflector 1602, for example, comprising glass having the characteristics of the BK7 glass material manufactured by SCHOTT or any suitable optically equivalent glass (see the parameters such as glass should preferably match in Table 1 above). A fixed glass retroreflector 1604 comprising the same glass material as the adjustable glass retroreflector 1602 is provided at one length of the adjustable section of path length 1606 shown in FIG. 16. The high dispersion retroreflector 1500 shown in FIG. 2 is also adjustable along with retroreflector 1602 both attached to the mount 1608. By moving the location of the mount 1608 along the track 1606, the optical path length in the reference arm 103 can be adjusted to match the optical path length of the sample arm 105. The amount of dispersion in the high dispersion retroreflector is sufficient to achieve a desired level of complex conjugate artefact removal from the signal output by the interferometer. The CCR removal may be performed on, for example in the signal 146 output by the spectrometer 136 shown in FIG. 1, when the OCT interference pattern signal is processed by an image processor 148. The processing may include a complex conjugate resolution method according to any one of the embodiments disclosed herein, for example, the method 1000 described above with reference to FIGS. 9 to 13 of the drawings and/or as shown schematically being implemented using an iterative algorithm as shown in FIGS. 11A and 11B of the drawings.

In some embodiments, the high-dispersion retroreflector 1500 may comprising filter glass transparent at least in near infra-red, IR, wavelengths and configured to cause differential dispersion of incident broadband low-coherent light in at least near infra-red, NIR wavelengths.

In some embodiments, the retroreflector is transparent over the same wavelength range differential dispersion occurs in, but in other embodiments, it may be transparent over a different range to the range of wavelengths over which differential dispersion occurs in.

The median group delay dispersion of the filter glass may range from 38000 (fs2) to 40000 (fs2) in some embodiments and the median group dispersion velocity of the filter glass may have a value in a range from 1100 fs2/mm to 1280 fs2/mm.

In some embodiments the highly dispersive retroreflector 1500 comprises glass having one of the following characteristics for incident light with a spectrum centred on 850 nm, where the glass has a refractive index of 2.5129 for light with a wavelength of 850 nm, a group index of 2.7268 (ng) for light with a wavelength of 850 nm, a group velocity delay of 1120.75 fs2/mm, and a transparency of 95.7% for light with a wavelength of 850 nm.

The retroreflector 1500 may have a cone shaped exterior, wherein the interior of the cone comprises at least three mirrored facets collectively configured to perform retroreflection of incident light.

In some embodiments of the present invention, the bulk glass differential dispersion interferometer assembly 1600 is provided for extended depth imaging in optical coherence tomography, OCT. The interferometer assembly 1600 may comprise an automated path length opto-mechanical assembly which includes a first, fixed, retroreflector 1604 located at one end of the optical-path, a second, adjustable, retroreflector 1602 co-located with a high-dispersion retroreflector 1500 on a mount 1608 configured to run along a track or guide rail 1608. By moving the mount 1608, the retroreflectors 1500 and 1602 are moveable and this then forms an adjustable optical-path in the interferometer assembly 1600. The high-dispersion retroreflector 1500 comprises filter glass in some embodiments. The filter glass may be transparent at infra-red, IR, wavelengths and configured to cause differential dispersion at least at near infra-red, NIR wavelengths between broadband low-coherent incident light, for example, the returned OCT light and the returned OCT reference light described herein above in the OCT system of FIG. 1.

In some embodiments where the interferometer assembly is located with a probe arm 105 of an OCT scanning system 100 the high-dispersion retroreflector 1500 is configured to cause differential dispersion at near infra-red, NIR wavelengths between broadband low-coherent incident light returned from a reference arm 103 and a probe arm 105 of the OCT scanning system 100. The OCT scanning system is a spectral-domain OCT system in some embodiments with an interferometer configured to output OCT scan interference signals which are then processed complex conjugate resolution of the incident OCT light on a tissue sample such as that shown as tissue sample 116 in FIG. 1.

In some embodiments, a median group delay dispersion of the filter glass material may have a value in a range from 38000 (fs2) to 40000 (fs2). The median group dispersion velocity of the filter glass material may have a value in a range from 1100 fs2/mm to 1280 fs2/mm.

In some embodiments of the assembly 1600, where the high-dispersion retroreflector 1500 comprises glass having the following characteristics for incident light with a spectrum centred on 850 nm: a refractive index of 2.5129 for light with a wavelength of 850 nm; a group refractive index of 2.7268 (ng) for light with a wavelength of 850 nm; a group velocity delay of 1120.75 fs2/mm; and a transparency of 95.7% for light with a wavelength of 850 nm, for example, the high-dispersion retro-reflector may comprise IRG27 glass as manufactured by Schott_IRG. The fixed and moveable retroreflectors 1604 and 1602 respectively may each glass having the following characteristics for incident light with a spectrum centred on 850 nm: a refractive index of 1.5098 for light with a wavelength of 850 nm; a group index of 1.5249 (ng) for light with a wavelength of 850 nm; a group velocity delay of 40.13 fs2/mm; and a transparency of 99.8% for light with a wavelength of 850 nm. In some embodiments, the first and second retroreflector may comprise BK7 glass as manufactured by Schott for example. In some embodiments of the assembly, high-dispersion retroreflector 1500 has a cone shaped exterior, wherein the interior of the cone comprises at least three mirrored facets collectively configured to perform retro-reflection of incident light.

Some embodiments of the assembly 1600 may be used by an optical coherence tomography, OCT, apparatus 100 configured to perform real-time OCT, the apparatus comprising an illumination arm 101 including at least an optical light source 102 for OCT, a reference arm 103, an OCT probe arm 105 via which an OCT probe beam is emitted and a data arm 107 via which returned OCT light passes to be processed by an image processor 148, and at least one dispersive retroreflector in the reference arm 103 or OCT probe arm 105.

In some embodiments, the dispersion between the reference and probe arms is variable and set above a minimum threshold for separation of a complex conjugate image from a OCT image output for display.

In some embodiments, the OCT apparatus further comprises at least one additional dispersive component provided in one of the reference arm or the OCT probe arm.

In some embodiments, the at least one additional dispersive component is located in the reference arm and comprises a dispersive optical fibre.

In some embodiments, at least one additional dispersive component is located in the reference arm and comprises a dispersive glass window, wherein either a physical path length of the reference arm is configured to compensate for the dispersive widow or the physical path length of an opposite OCT probe arm is lengthened to compensate for the dispersive widow.

In some embodiments, the OCT apparatus comprises a bulk glass differential dispersion interferometer assembly 1600 for extended depth imaging in optical coherence tomography, OCT, the interferometer assembly comprising an automated path length opto-mechanical assembly 1600.

In some embodiments, the OCT apparatus 100 includes an OCT scanner adapter 206 according to any of the embodiments disclosed herein.

In some embodiments, the at least one dispersive optical component is provided in the OCT probe arm (105) comprise one or more of a dispersive optical fibre, a dispersive dichroic mirror, a dispersive OCT objective lens (510), and a dispersive OCT field lens (512).

Examples Using Hybrid Fibre Based Differential Dispersion in the Interferometer

Some embodiments of the present invention use hybrid fiber based differential dispersion in the interferometer instead or in addition to using bulk glass differential dispersion in the interferometer design to support extended depth imaging in optical coherence tomography. These embodiments may be used in conjunction with the computational methods described above with reference to FIGS. 8A, 8B, 9, 10, 11A, 11B, 13, and 14 of the accompanying drawings. The interferometer designs disclosed herein may be used in some embodiments in the OCT scanning system 100 of FIG. 1. The OCT scanning system of FIG. 1 may comprise an OCT scanner adapter 206 for a surgical microscope in some embodiments which incorporate features described according to the embodiments disclosed herein and/or as illustrated in FIG. 2A, 2B, 3A, 3B, 4, 5A, 5B, 6, or 7.

As mentioned above, in Optical Coherence Tomography, Complex Conjugate Resolution requires a minimum amount of differential dispersion to be present between the sample path and reference path of the system interferometer. Optical coherence tomography (OCT) is an imaging modality that uses the principles of low coherence interferometry to generate three-dimensional images of a sample. OCT systems such as the system 100 shown in FIG. 1 comprise a broadband light source 102 for the OCT scanning light, a reference arm 103, and sample optical arm 105, also referred to herein as a probe or scanning arm for example, and a detection arm 107 comprising as shown in the embodiment of FIG. 1, a spectrometer 136. Alternatively, in the disclosed embodiments of the OCT system 100 that do not require a spectrometer, a photodiode detector may be used instead.

Interference patterns of light reflected from the reference and sample arms 103, 105 are measured at the detector 136 and electronically processed using suitable apparatus such as the image processor 148 shown in FIG. 1 to generate a tomogram showing the relative positions of reflectors or structures causing back-scatting of the incident OCT light in the sample (see 116 in FIG. 1, examples of reflectors or structures when the same is an eye are also shown in FIG. 1). Scanning the OCT beam in the probe or sample arm using the scanning mirror assembly such as that disclosed here as scanning mirror assembly 310 allows interrogation of different spatial locations, thus allowing for the construction of a 3D image of the sample, in other words a volumetric scan maybe generated from multiple B-scans.

Signal processing of the OCT signal requires several steps, one of which is a Fourier transform of the detected interference signal. Because the measured signal is real-valued, however, taking a Fourier transform results in a complex signal with identical positive and negative frequency components. This mirroring of data is known as the complex conjugate artefact and restricts the useable imaging range by half of what is theoretically possible. Techniques to remove or suppress the conjugate artefact are known as complex conjugate resolution (CCR) methods and can result in an immediate doubling of the imaging range in OCT.

Some embodiments of the present invention may use as bulk filter glass retroreflector in the reference arm to improve the efficiency of CCR methods disclosed here. In addition or instead, in some embodiments, a hybrid fibre may be designed to improve the efficiency of CC artefact removal.

Known techniques may require expensive and complicated optical components that must be added to the OCT system and require multiple image acquisitions before they can generate the necessary phase information to remove the conjugate image. This slows imaging time, causing g a reduction in system performance and is also very susceptible to motion in the sample, particularly when imaging live subjects.

As some embodiments of the OCT system 100 disclosed herein seek to provide B-scans and preferably volumetric scans in real-time whilst surgical procedures are being conducted, it is advantageous if a faster technique can be used to present an OCT image without the CCR image artefacts. Removal of the CCR artefacts may also allow an increase in the depth resolution (in other words the resolution along the Z-axis) of any OCT B-scan or volumetric images which are obtained.

The disclosed embodiments include a method for determining a plurality of single mode optical fibre types one or more of which have with a different fibre core diameter, the plurality of single mode fibres collectively modify the chromatic dispersion along the to a predetermined amount to support CCR as part of the OCT interferometer reference assembly.

In Optical Coherence Tomography, Complex Conjugate Resolution requires a minimum amount of differential dispersion to be present between the sample path and reference path of the system interferometer.

In the case of OCT systems where the light source consists of a broadband, short coherence length yet spatially coherent super luminescence diode, the dispersion in the system is a result of chromatic or wavelength dependent velocity differences of the light passing through the optical paths of the system and is termed the Group Velocity Dispersion or GVD which is quantitatively defined by RP Photonics, as the derivative of the inverse group velocity with respect to angular frequency as represented in the following equation:

$$GVD(\lambda) = \frac{\lambda^3}{2\pi c^2} \frac{\partial^2 n(\lambda)}{\partial \lambda^2}$$

where c=vacuum velocity of light, λ=wavelength, and n=index of refraction

The group velocity dispersion (GVD) can also be defined as the group delay dispersion (GDD) per unit length. For waveguides such as single mode optical fibers, the Dispersion Parameter is related to the GVD as shown in the equation below:

$$D_\lambda = \frac{\partial}{\partial \lambda} \frac{1}{v_g} = -\frac{2\pi c}{\lambda^2} \cdot GVD:$$

and is expressed in units of ps/(nm km). Unit conversion calculators are well known in the art, for example, there is one provided by RP photonics and accessible from their web-site www.rp-photonics.com can be used to covert the bulk glass GVD values into the proper units for optical fibers.

The high dispersion required for the Complex Conjugate Resolution is antithetical to typical optical fiber designs that strive to minimize the chromatic dispersion of the fiber for a given wavelength.

However, dispersion can be increased in single mode optical fiber by decreasing the fiber core diameter relative to the central wavelength sufficiently to increase the chromatic dispersion by the desired amount. Given that common to the industry, fiber core diameters of optical fiber come in discrete increments which do not independently render the desired chromatic dispersion for a given length of fiber.

Therefore, a combination of optical fiber types with the appropriate core diameters to render the desired GDD value must be determined quantitatively. FIG. 17 shows a version of the method of FIG. 18 in which given a target GVD value and required fibre length S1702, the method 1400 may be used and its output in S1412 adapted to obtain the GDD from the average GVD value and fibre length in S1704 (similarly to S1414) or the output can be used instead to obtain the optical fiber dispersion parameter by converting the average GVD value obtained to the GDD in S1706.

FIG. 18 shows schematically in more detail a computer-implemented method which may be used to calculate the quantities of each fiber type required in some embodiments of the present invention. The method 1800 comprises calculating the target GVD for the required optical path length of fiber in S1802, converting the target GVD value to a target Optical Fiber Dispersion Parameter for the central wavelength of 850 nm of the OCT illuminating light in S1804, determining fiber types that bound the target Optical Fiber Dispersion Parameter in S1806, obtaining the optical fiber dispersion parameter from the GVD for the central wavelength of 850 nm in S1808, and using this to calculate the length of each fiber type required meet the target GDD while maintaining the required optical path length in S1810.

It was empirically determined through experimentation that an additional GDD value between 31,000 (fs$^2$) and 46,000 (fs$^2$) would be required for the best result of CCR in the system as mentioned above.

In some embodiments of the present invention, the optical fibre component of the optical path length adjustable OCT reference assembly 1600 comprises a hybrid fibre, for example, a hybrid optical fibre which over its length has the above GDD value. Using a hybrid optical fibre with the above GDD value allows the alignment stability of the reference assembly to be retained. In particular given the operation of the OCT interferometer, the optical path length of the optical fibre is a fixed parameter and therefore the optical fibre dispersion parameter must be sufficient to provide the desired GDD based on the fixed fibre length.

Figures 19A, 19B:
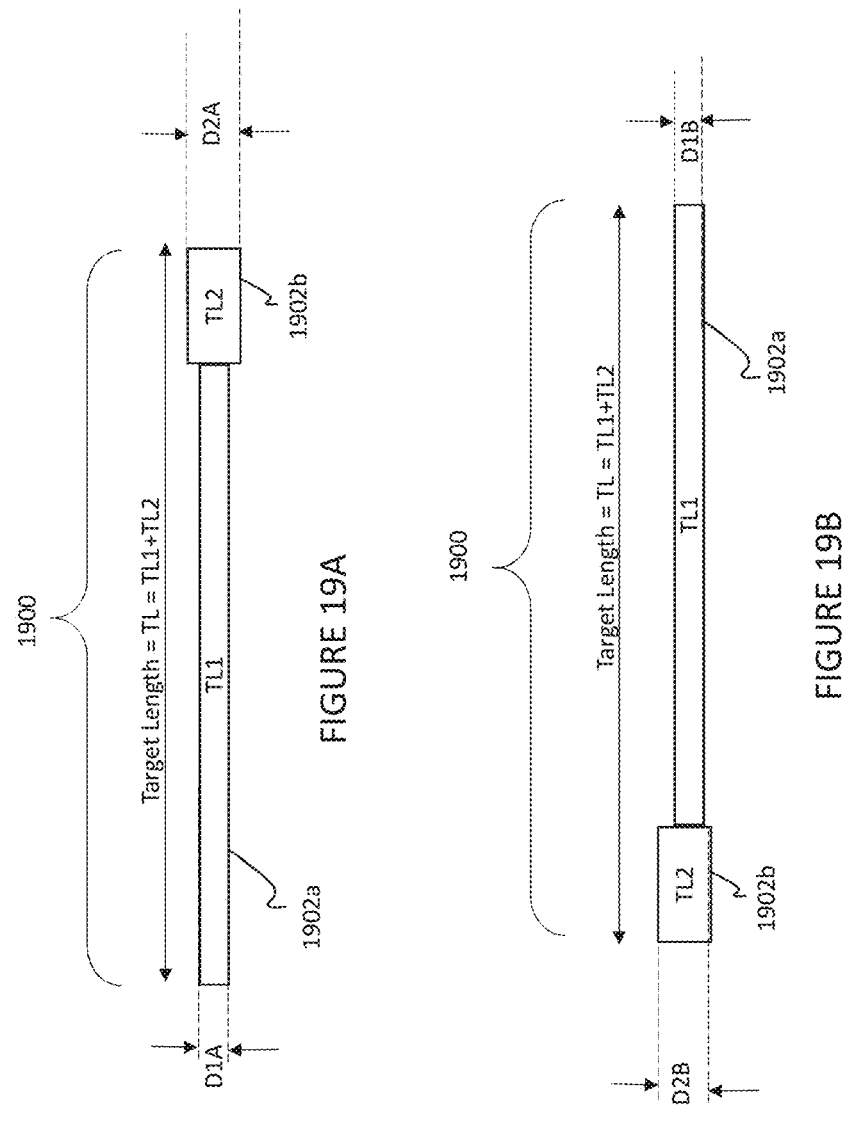
FIGS. 19A and 19B show schematically a hybrid optical fibre according to some embodiments of the present invention.

FIGS. 19A and 19B show to alternative ways of providing a hybrid fibre 1900 based on two individual signal mode fibres 1902a,b by way of example only, covering a target fibre length TL. In FIG. 19A, one fibre component of the hybrid fibre has a diameter D1A and length TL1, and the other fibre component has a diameter or numerical aperture of D2A and length TL2, give a collective length of TL=TL1+TL2 and a collective GDD which matches the target GDD to provide more effective removal of the CC image artefacts in the resulting OCT scans. FIG. 19B shows how an arrangement with the optical fibres in different order may also be used in some embodiments.

Through the process outlined above, two fibre types were identified a combination of which rendered the required chromatic dispersion while maintaining the overall optical fibre path length. The successful combination consists of TL1 a 5 m length of Coherent 630-HP fibre and TL2=a 1 m length of Corning HI780 fibre. The two fibre section are then fusion spliced together to create a single 6 m fibre length, in other words TL=6, with the desired chromatic dispersion in some embodiments of the reference arm optical assembly 103.

A highly dispersive single-mode hybrid optical fibre is located in one of a reference arm or a probe arm of an optical interferometer, for example, such as the optical interferometer comprising an OCT system 100 as shown in FIG. 1 in some embodiments of the present invention. The hybrid fibre comprises at least two optical fibres, at least one optical fibre having a different core diameter and different dispersive characteristics to at least one other optical fibre. The at least two optical fibres are end-to-end fused to form a hybrid optical fibre. Each optical fibre of the at least two optical fibres is fused to at least one other of the at least two optical fibres. Each one of the at least two optical fibres has a length, for example, TL1 or TL2 as shown in FIG. 19A or 19B, based on the core diameter of that optical fibre relative to a central wavelength of a light beam passing through the hybrid optical fibre and a target GDD per unit length of hybrid optical fibre. The hybrid fibre adds an additional GDD value compared to an optical fibre in the other one of the reference arm or probe arm of the optical interferometer.

In some embodiments, using the dispersion component optical fibres in the reference arm can be also make power balancing with the probe beam easier when the reference beam and probe beam are later combined. If instead the dispersion elements were located in the probe arm, additional compensation in reference arm may be needed in some embodiments to improve the balance of the returned reference beam power and OCT beam power.

In some embodiments of the hybrid optical fibre 1900, the additional GDD value is between 31,000 (fs$^2$) and 46,000 (fs$^2$).

In some embodiments of the hybrid optical fibre 1900, at least one type of optical fibre 1902a has a different length TL1 to a length TL2 of at least one other type of optical fibre 1902b in the hybrid optical fibre 1900.

The lengths TL1, TL2 of each respective component optical fibre 1902a,b is determined in some embodiments by calculating a target group velocity delay, GVD, for the predetermined length of hybrid optical fibre, converting the target GVD to a target optical fibre dispersion parameter, OFDP, for the central wavelength of light that passes through the hybrid optical fibre, determining at least two optical fibre types each having a OFDP bounding the target OFDP, converting the OFDP of each determined type of optical fibre to the GVD for the central wavelength, and determine, for each respective one of the determined types of optical fibre, based on the GVD of that respective fibre at the central wavelength, a length of fibre, such that collectively the optical fibres, when fused end to end, provide an optical path which matches the predetermined optical path length of the hybrid optical fibre.

In some embodiments, the hybrid optical fibre 1900 comprises at least one length of a coherent 630-HP fibre and at least one length of a Corning HI780 fibre, wherein at least one end of a length of the coherent 630-HP fibre is fused to an end of a length of the Corning H1780 fibre.

In some embodiments of the optical interferometer such as the OCT system 100 disclosed herein, the hybrid fibre is located in a reference arm 103 of the optical interferometer and introduces a differential dispersion in the reference arm 103 compared to the returned OCT imaging light obtained by scanning a sample using OCT apparatus according to any of the disclosed embodiments.

In some embodiments, the hybrid fibre 1900 is configured to introduce a predetermined level of chromatic dispersion in the reference arm 103 of the optical interferometer, for example, of the OCT system 100 to remove complex conjugate image data from the OCT image output by the OCT apparatus.

In some embodiments, the hybrid optical fibre 1900 is located in a reference arm of an optical interferometer configured to output OCT imaging data from an OCT apparatus and has a length of 6 meters five meters of which comprise coherent 630-HP fibre or a fibre having a similar optical characteristics and one meter of which comprises Corning HI780 fibre or a fibre having similar optical characteristics. Other glass with equivalent characteristics may be used in some embodiments such as would be apparent to anyone of ordinary skill in the art, for example see the characteristics and parameters of these fibres in Table 1.

Examples Using a High Dispersion Custom Drawn Single Mode Fibre

Some embodiments of the present invention use an interferometer design in which instead of fusing end-to-end two more single mode optical fibres to form a hybrid fibre, a high dispersion custom drawn single mode fiber is used as part of the OCT interferometer reference arm.

Some embodiments of the present invention use a the highly dispersion optical fiber to provide differential dispersion in an interferometer to support extended depth imaging in optical coherence tomography. These embodiments may be used in conjunction with the computational methods described above with reference to FIGS. 8A, 8B, 9, 10, 11A, 11B, 13, and 14 of the accompanying drawings and may be used also in some embodiments with bulk glass retroreflectors to further increase the amount of differential dispersion provided. The interferometer designs disclosed herein may be used in some embodiments in the OCT scanning system 100 of FIG. 1. The OCT scanning system of FIG. 1 may comprise an OCT scanner adapter 206 for a surgical microscope in some embodiments which incorporate features described according to the embodiments disclosed herein and/or as illustrated in FIG. 2A, 2B, 3A, 3B, 4, 5A, 5B, 6, or 7.

To maintain single mode propagation through the optical fiber with the desired dispersion parameter a suitable bulk glass material with the proper GDD value must be determined quantitatively, this can be done using the methods describe above with reference to FIGS. 14, 17, and 18 of the drawings.

Whilst several glass materials that had a sufficient GVD were determined using the above methods to find a optical fiber dispersion parameter which allows the desired GDD based on the fixed fiber length for the path length adjustable OCT reference assembly shown as reference assembly 1600 for example and as described herein above.

However, due to the manufacturing process of drawing bulk glass into optical fiber, only one candidate material was found which could over the optical path length TL of the reference assembly 1600 provide the required dispersion. This comprised, based on the above calculations, a high-dispersion fibre having a GVD which was found to match that of Schott N-ZK7 glass, although other types of glass having the same refractive index, group refractive index, GVD, and transparency indicated in Table 1 above could be used instead. Example values of these characteristics include a GVD of 41,816 (fs$^2$/m) at 850 nm, which converts to a Dispersion Parameter of −109 ps/(nm km) @850 nm. If the optical path length in the reference assembly of the high-dispersion fibre is taken to be 6 meters of fiber, this will result in the reference arm optical fibre path having a total GDD value of 250 (ps$^2$) along its length. Whilst this is below a target median value it is acceptably above the minimum acceptable GDD value.

Some embodiments of the present invention accordingly comprise a highly dispersive single-mode optical fibre comprising drawn bulk filter glass.

In some embodiments, the highly dispersive single-mode optical fibre comprises bulk filter glass which has an optical fibre dispersion parameter associated with a group delay dispersion, GDD, value between 31,000 fs$^2$ and 46,000 fs$^2$ for a given wavelength of 860 nm with a bandwidth of 100 nm based on glass dispersion coefficients as measured using a Sellmeier method.

In some embodiments, the highly dispersive single-mode optical fibre is located in a reference arm of an optical interferometer configured to output OCT imaging data from an OCT apparatus.

In some embodiments, the optical fibre comprises drawn bulk Schott N-ZK7 filter glass or drawn bulk filter glass having similar refractive index, group refractive index, GVD, and transparency characteristics as set out in Table 1 above.

The highly-dispersive optical fibre may be selected by determining for a given fibre length, the GDD or GDD, for example by using a computer-implemented method for determining a group velocity delay, GVD, of a highly dispersive single-mode optical fibre comprising bulk drawn filter glass in some embodiments where the method comprises, based on input comprising at least a target group dispersion delay, GDD, value and optical path length along the optical fibre, determining a target GVD value, solving the Sellmeier dispersion equation for the filter glass index of refraction as a function of wavelength for that wavelength interval, and iteratively determining, for each wavelength interval of a plurality of incremental wavelength intervals within a predetermined bandwidth: an average GVD for that wavelength interval by determining a coefficient of the GVD as a function of wavelength (804), determining second derivative of index of refraction with respect to wavelength, and multiplying the coefficient of the GVD as a function of wavelength by the second derivative of the index of refraction with respect to wavelength, and averaging the determined GVD over the bandwidth to determine the average GVD over the bandwidth.

In some embodiments, the method further comprises: computing a GDD from the average GVD value and fiber length.

In some embodiments, the method further comprises converting the determined average GVD over the bandwidth into an optical fiber dispersion parameter.

In some embodiments, the highly dispersive optical fibre is used in an optical OCT interferometer assembly in a detector arm of an OCT assembly such as OCT system 100 in FIG. 1.

In some embodiments, the OCT interferometer assembly may comprise: a OCT detector assembly, for example a spectrometer such as spectrometer 136 shown in the example OCT system 100 of FIG. 1, a sample arm configured to guide OCT probe beam light from the OCT assembly returned from a scanned object towards the OCT detector assembly, and an adjustable optical path length OCT system reference assembly comprising a fixed optical-path length highly dispersive single-mode optical fibre comprising bulk drawn filter glass, wherein the reference assembly is configured in the reference arm of the OCT detector assembly.

In some embodiments, the interference patterns of the returned reference and OCT beams at the detector assembly are subjected to a Fourier transform, and wherein the chromatic dispersion along the reference beam optical path in the highly dispersive single-mode filter glass optical fibre OCT system reference arm is sufficient for complex conjugate artefacts to be removed from a Fourier transform of an interference signal output by the OCT interferometer by using a complex conjugate resolution, CCR, method based.

In some embodiments, dispersion along the filter glass optical fibre is sufficient to allow the CCR method to be remove the complex conjugate artefacts from an OCT B-scan or volumetric scan in real-time.

In some embodiments, based on the fixed fibre length of the single-mode optical fibre comprising the filter glass, the optical fibre dispersion parameter is configured to provide a group delay dispersion, GDD, value between 31,000 fs2 and 46,000 fs2, where the GDD may be determined using a suitable method such as one of the methods disclosed herein with reference to FIGS. 14 to 18 of the accompanying drawings.

In some embodiments, the filter glass comprises Schott N-ZK7 filter glass or a filter glass with an equivalent refractive index, group refractive index, GVD, and transparency characteristics, such as characteristics with the parameter values set out in Table 1 above.

In some embodiments, the determined dispersion parameter of the optical fibre comprising the filter glass is about −109 ps/(nm km) at a 850 nm wavelength.

In some embodiments, the optical path length of the optical fibre is about 6 meters and the GDD is about 250 ps2.

The above embodiments may be combined with other disclosed embodiments of the same or another aspect of the present invention in any suitable manner apparent to someone of ordinary skill in the art.

The highly dispersive single-mode optical fibre comprising drawn bulk filter glass of some embodiments may be configured as an optical fibre in a reference arm of an interferometer in some embodiments such as in the OCT scanning system 100 of FIG. 1. This may assist with the depth to which B and volumetric scans can be resolved to in live OCT scan streaming using the OCT scanning system, for example by allowing faster techniques to be used for complex conjugate resolution of the scan images.

The terminology used herein is for the purpose of describing particular aspects only and is not intended to be limiting of the disclosure. As used herein, the singular forms "a," "an," and "the" are intended to include the plural forms as well, unless the context clearly indicates otherwise.

As used herein the term "and/or" includes any and all combinations of one or more of the associated listed items and may be abbreviated as "/".

It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope 200 comprising an SD-OCT scanner system 100 which uses an OCT scanner adapter 206 to generate OCT A-scans and B-scans using the image processing techniques disclosed herein such as that as are described in connection with one or more of the FIGS. 1 to 12. Alternatively, microscope 200 may be part of or connected to a OCT system 100 as described in connection with one or more of the FIGS. 1 to 12.

Figure 13:
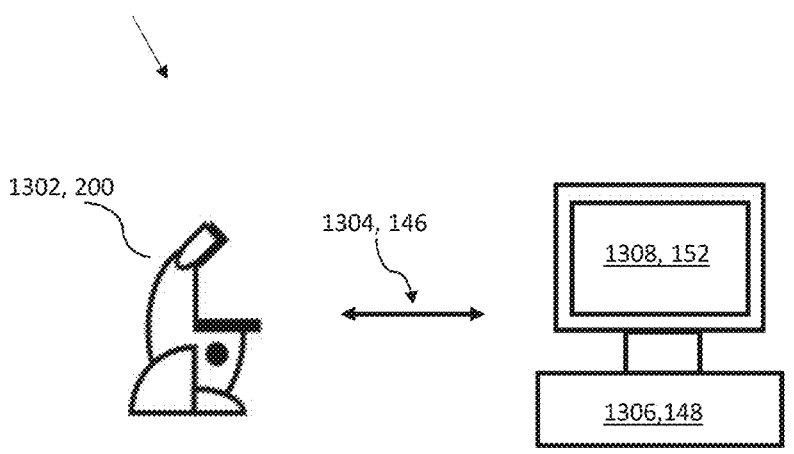
FIG. 13 shows schematically an example of a system according to an embodiment of the present invention.

FIG. 13 shows a schematic illustration of a system 1300 configured to perform an embodiment of a computer-implemented image processing method 900 such as described herein. The system 1300 comprises a microscope 1302, 200 and a computer system 1306 comprising a display 1308. The microscope 1302, 200 configured to take images and is connected to the computer system 1306. The connection may comprise in some embodiments for example, a suitable data connection via port 212 in FIGS. 2B, 3A 3B, and 4 illustrates schematically. The computer system 1306 may comprise image processing apparatus 148 in some embodiments. Computer stem 1306 is configured to execute at least a part of a method described herein such as an embodiment of method 900 which comprising using an embodiment of algorithm 1000. The computer system 1306, 148 may be configured to execute a machine learning algorithm in some embodiments.

The computer system 1306, 148 and microscope 200 may be separate entities but can also be integrated together in one common housing such as housing 202 in some embodiments. The computer system 1306, 148 may be part of a central processing system of the microscope 200 and/or the computer system 1306, 148 may be part of a subcomponent of the microscope 200, such as a sensor, an actor, a camera or an illumination unit, etc. of the microscope 200, or of the OCT scanner adapter microscope accessory shown as 206 in some of the accompanying drawings.

The computer system 1306, 148 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers).

The computer system 1306, 148 may comprise any circuit or combination of circuits. In one embodiment, the computer system 1306, 148 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 1306, 148 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 1306, 148 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system X20 may also include a display device, one or more speakers, and a keyboard and/or controller, which can include a mouse, trackball, touch screen, voice-recognition device, or any other device that permits a system user to input information into and receive information from the computer system 1306, 148.

Some or all of the method steps disclosed herein may be executed by (or using) a hardware apparatus, like for example, a processor, a microprocessor, a programmable computer or an electronic circuit. In some embodiments, some, one or more of the method steps may be executed by such an apparatus.

Depending on certain implementation requirements, embodiments of the present invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the present invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the present invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the present invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

It is to be understood that the present disclosure is not limited to the aspects described above and illustrated in the drawings; rather, the skilled person will recognize that many changes and modifications may be made within the scope of the present disclosure. In the drawings and specification, there have been disclosed aspects for purposes of illustration.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A bulk filter glass differential dispersion interferometer assembly for extended depth imaging in optical coherence tomography (OCT), the interferometer assembly comprising:

a first retroreflector that is fixedly located at one end of an optical-path; and a second retroreflector and a high-dispersion retroreflector co-located on a mount, wherein the mount is moveable along the optical-path to form an adjustable optical-path between the first retroreflector and the second retroreflector in the interferometer assembly, wherein the high-dispersion retroreflector comprises a filter glass transparent at infra-red (IR) wavelengths and configured to cause differential dispersion at NIR wavelengths between broadband low-coherent incident light.

2. The interferometer assembly of claim 1, comprising a probe arm of an OCT scanning system, wherein the high-dispersion retroreflector is configured to cause the differential dispersion at the NIR wavelengths between the broadband low-coherent incident light returned from a reference arm and the probe arm of the OCT system.

3. The interferometer assembly of claim 2, wherein the interferometer assembly is configured to output light for a complex conjugate resolution of incident OCT light.

4. The interferometer assembly of claim 1, wherein a median group delay dispersion of the filter glass material ranges from 38000 ($fs^2$) to 40000 ($fs^2$).

5. The interferometer assembly of claim 1, wherein a median group velocity dispersion of the filter glass material is a value in a range from 1100 $fs^2$/mm to 1280 $fs^2$/mm.

6. The interferometer assembly of claim 1, wherein the filter glass of the high-dispersion retroreflector comprises one of the following characteristics for incident light with a spectrum centred on 850 nm:

a refractive index of 2.5129 for light with a wavelength of 850 nm;

a group index of 2.7268 (ng) for light with a wavelength of 850 nm;

a group velocity delay of 1120.75 fs2/mm; and a transparency of 95.7% for light with a wavelength of 850 nm.

7. The interferometer assembly of claim 6, wherein the first retroreflector and the second retroreflector comprise glass having the following characteristics for the incident light with the spectrum centred on 850 nm:

a refractive index of 1.5098 for light with a wavelength of 850 nm;

a group index of 1.5249 (ng) for light with a wavelength of 850 nm;

a group velocity dispersion of 40.13 $fs^2$/mm; and a transparency of 99.8% for light with a wavelength of 850 nm.

8. The interferometer assembly of claim 1, wherein the high-dispersion retroreflector has a cone-shaped exterior, wherein an interior of the cone-shaped exterior comprises at least three mirrored facets collectively configured to perform retroreflection of incident light.

9. An OCT apparatus configured to perform real-time OCT, the OCT apparatus comprising:

an illumination arm including at least an optical light source for OCT;

a reference arm;

an OCT probe arm via which an OCT probe beam is emitted;

a data arm via which returned OCT light passes to be processed by an image processor; and an interferometer assembly according to claim 6 in the reference arm or the OCT probe arm.

\* \* \* \* \*